(12) United States Patent
Gass

(10) Patent No.: US 10,981,238 B2
(45) Date of Patent: Apr. 20, 2021

(54) ACTUATORS FOR POWER TOOL SAFETY SYSTEMS

(71) Applicant: SawStop Holding LLC, Tualatin, OR (US)

(72) Inventor: Stephen F. Gass, West Linn, OR (US)

(73) Assignee: SawStop Holding LLC, Tualatin, OR (US)

( * ) Notice: Subject to any disclaimer, the term of this patent is extended or adjusted under 35 U.S.C. 154(b) by 0 days.

(21) Appl. No.: 16/544,608

(22) Filed: Aug. 19, 2019

(65) Prior Publication Data

US 2019/0366454 A1     Dec. 5, 2019

Related U.S. Application Data

(63) Continuation of application No. 13/393,919, filed on Mar. 2, 2012, now Pat. No. 10,384,281, which is a
(Continued)

(51) Int. Cl.
| | |
|---|---|
| *B23D 47/10* | (2006.01) |
| *B23D 59/00* | (2006.01) |
| *B27G 19/02* | (2006.01) |
| *B27B 5/38* | (2006.01) |
| *F15B 15/19* | (2006.01) |

(52) U.S. Cl.
CPC ........... *B23D 47/10* (2013.01); *B23D 59/001* (2013.01); *B27G 19/02* (2013.01); *F15B 15/19* (2013.01); *B27B 5/38* (2013.01)

(58) Field of Classification Search
CPC .......... B23D 47/10; F15B 20/00; F15B 15/19; F15B 11/06; F15B 2211/875; F15B 2211/8643
See application file for complete search history.

(56) References Cited

U.S. PATENT DOCUMENTS

| | | | |
|---|---|---|---|
| 2,903,848 A | | 9/1959 | Mayhew et al. |
| 3,579,889 A | * | 5/1971 | Pallich .................... A22B 3/02 |
| | | | 42/1.12 |

(Continued)

FOREIGN PATENT DOCUMENTS

| | | |
|---|---|---|
| DE | 19609771 A1 | 6/1998 |
| EP | 2483025 B1 | 1/2019 |

(Continued)

OTHER PUBLICATIONS

Active Safety System on a Table Saw, Jan Nieberle & Sebastian Hauer, 1997 Workplace Bavaria.
(Continued)

*Primary Examiner* — Sean M Michalski

(57) ABSTRACT

Fast-acting and low-inertia actuators useable in various applications where a high force must be applied very quickly are disclosed. Power tools with detection systems configured to detect a dangerous condition between a person and a cutting tool are disclosed. In power tools, for example in a woodworking machine, a fast-acting and low-inertial actuator as disclosed herein can be used to retract a blade upon detection of a dangerous condition by a detection system. The actuator includes a charge of pressurized fluid and one or more electromagnets to selectively retain or release the pressurized fluid.

2 Claims, 46 Drawing Sheets

Related U.S. Application Data continuation of application No. PCT/US2010/002634, filed on Sep. 29, 2010.

(60) Provisional application No. 61/278,111, filed on Oct. 2, 2009, provisional application No. 61/464,940, filed on Mar. 11, 2011.

(56) References Cited

U.S. PATENT DOCUMENTS

| | | | |
|---|---|---|---|
| 3,776,097 A * | 12/1973 | Rooks | B27B 5/04 409/205 |
| 3,800,645 A | 4/1974 | Alcock et al. | |
| 3,894,460 A | 7/1975 | Lumn | |
| 3,978,747 A * | 9/1976 | Lyon | B23D 45/12 83/18 |
| 4,133,237 A * | 1/1979 | Lewin | B23D 47/025 83/468.3 |
| 4,169,403 A * | 10/1979 | Hanson | F42B 33/062 102/293 |
| 4,432,819 A * | 2/1984 | Carter | C06C 7/02 102/202 |
| 4,433,570 A * | 2/1984 | Brown | G01N 3/307 73/12.04 |
| 4,615,260 A | 10/1986 | Takagi et al. | |
| 4,757,629 A * | 7/1988 | Austin | F41A 19/59 42/84 |
| 5,520,114 A * | 5/1996 | Guimard | F42D 1/055 102/206 |
| 5,750,918 A * | 5/1998 | Mangolds | F41H 13/0006 102/213 |
| 5,804,758 A * | 9/1998 | Marsaud | B60R 21/26 102/288 |
| 6,922,153 B2 | 7/2005 | Pierga et al. | |
| 6,994,004 B2 * | 2/2006 | Gass | B27B 5/38 83/477.1 |
| 7,100,483 B2 | 9/2006 | Gass et al. | |
| 7,228,772 B2 * | 6/2007 | Gass | B23D 47/08 144/382 |
| 7,350,445 B2 * | 4/2008 | Gass | B27B 5/38 188/73.34 |
| 7,628,101 B1 * | 12/2009 | Knapp | B23D 45/067 83/471.2 |
| 7,640,837 B2 * | 1/2010 | Gass | B23D 59/001 83/58 |
| 7,698,975 B2 | 4/2010 | Peot et al. | |
| 7,739,934 B2 * | 6/2010 | Tetelbaum | B23Q 11/0082 83/58 |
| 7,827,889 B2 | 11/2010 | Carrier | |
| 8,074,546 B1 | 12/2011 | Knapp et al. | |
| 2004/0226800 A1 * | 11/2004 | Pierga | B23D 59/001 192/129 R |
| 2005/0029864 A1 | 2/2005 | Bauer et al. | |
| 2005/0166736 A1 * | 8/2005 | Gass | B27G 19/02 83/477.2 |
| 2005/0236183 A1 * | 10/2005 | Grove | E21B 43/119 175/4.6 |
| 2006/0032352 A1 * | 2/2006 | Gass | B23D 47/10 83/58 |
| 2010/0206145 A1 | 8/2010 | Tetelbaum et al. | |
| 2011/0079124 A1 | 4/2011 | Carrier | |
| 2012/0059315 A1 * | 3/2012 | Manassa | A61M 5/204 604/68 |
| 2014/0260852 A1 * | 9/2014 | Laliberte | B27G 19/02 83/58 |
| 2016/0121512 A1 * | 5/2016 | He | G01M 13/00 73/865.6 |
| 2016/0319989 A1 * | 11/2016 | Ramaswamy | B23D 59/002 |
| 2017/0225351 A1 * | 8/2017 | Butler | B27B 5/222 |
| 2017/0334087 A1 * | 11/2017 | Gass | B27G 21/00 |

FOREIGN PATENT DOCUMENTS

| | | |
|---|---|---|
| WO | WO 01/26064 A2 | 4/2001 |
| WO | WO 03/006213 A2 | 1/2003 |
| WO | WO 11/040957 A1 | 4/2011 |

OTHER PUBLICATIONS

Elmshorn Student Wins for the Seconds Time at Jugend Forscht, Hamburg Morning News, May 5, 1997.
DeWalt DW746 Manual, 2000.

* cited by examiner

SECTION A-A

SECTION A-A

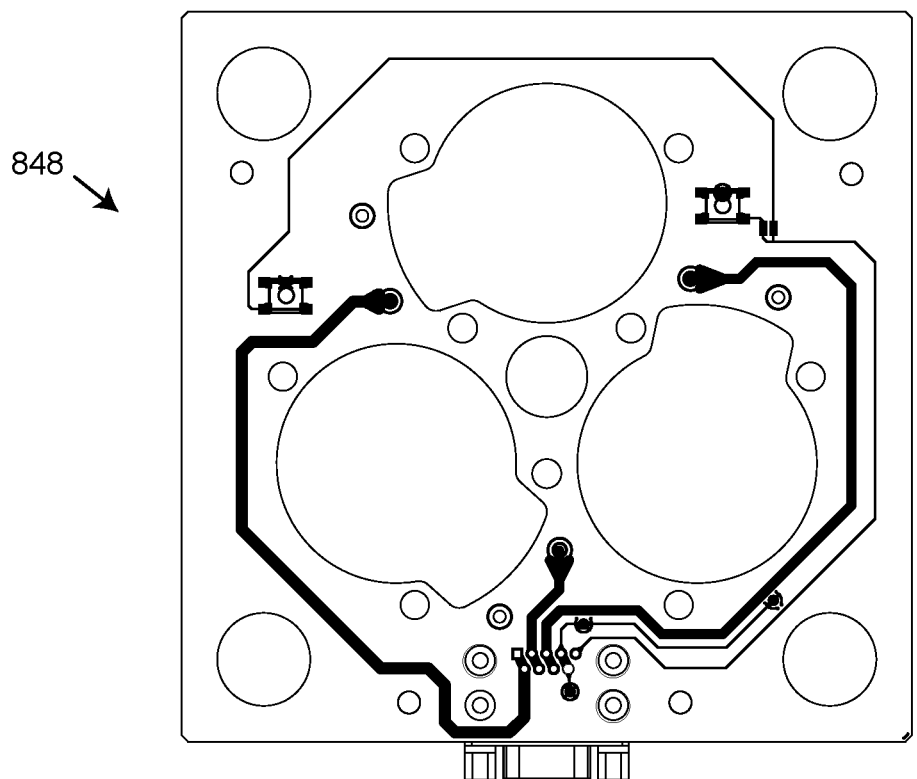
Fig. 44
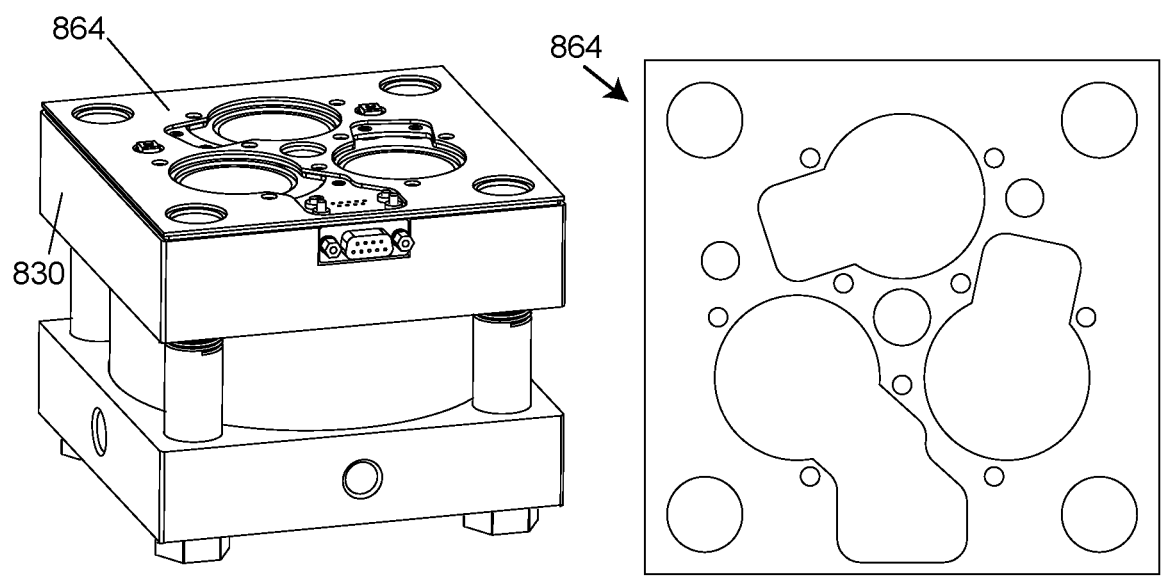
Fig. 45
Fig. 46

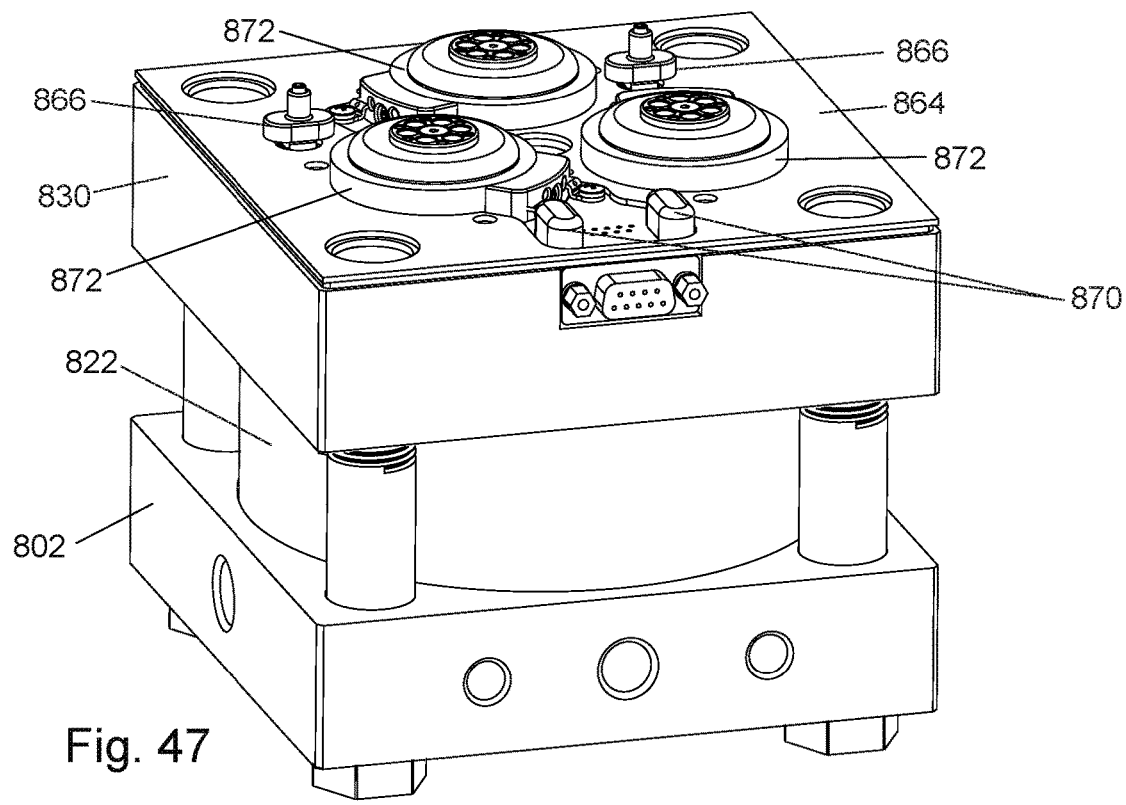
Fig. 47
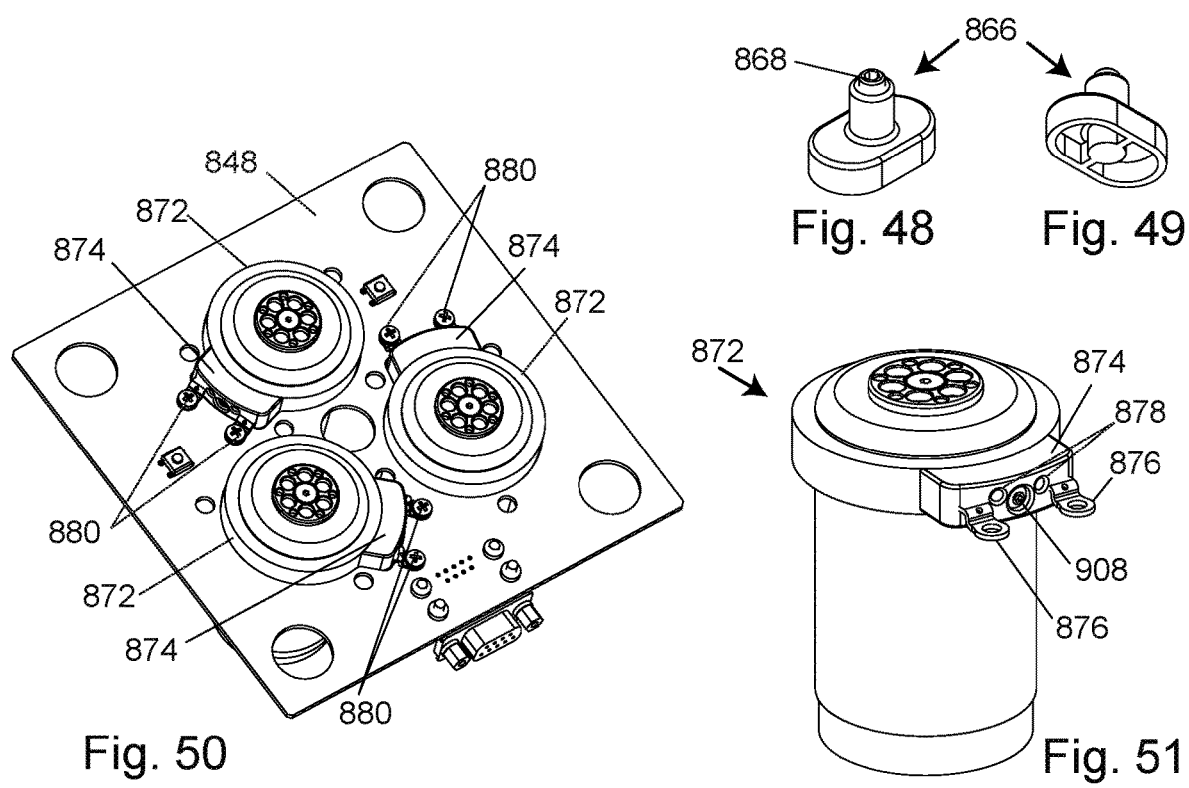
Fig. 48    Fig. 49
Fig. 50    Fig. 51

Section A-A

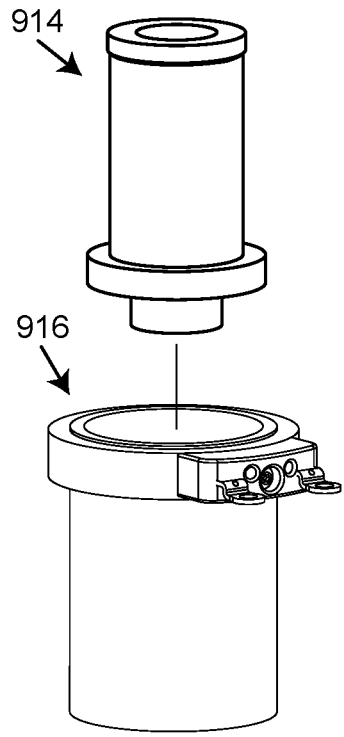
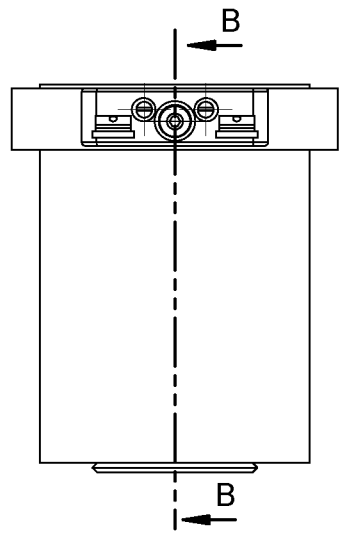
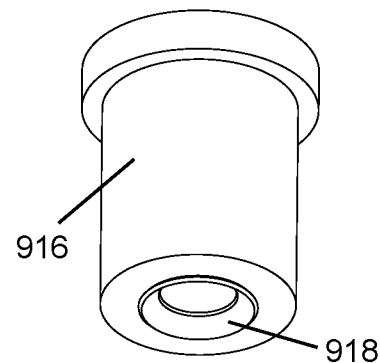
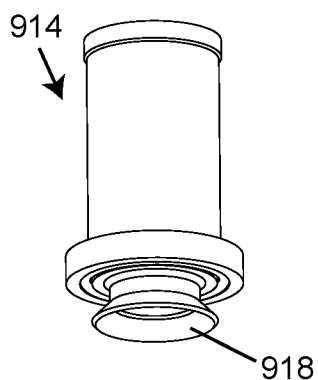
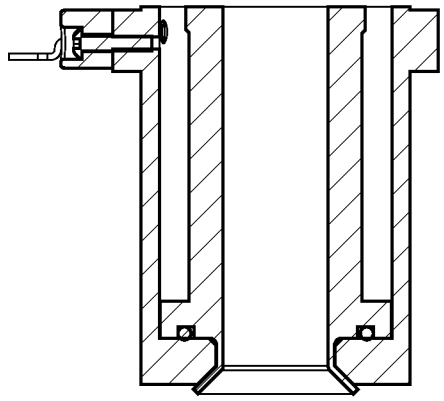
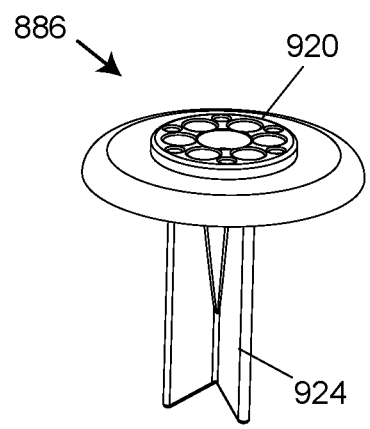
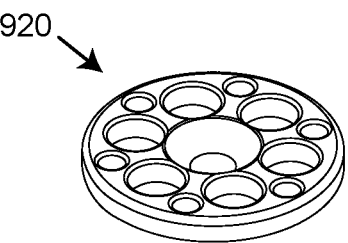
Fig. 56
Fig. 57
Fig. 58
Fig. 59
Section B-B
Fig. 60
Fig. 61
Fig. 62

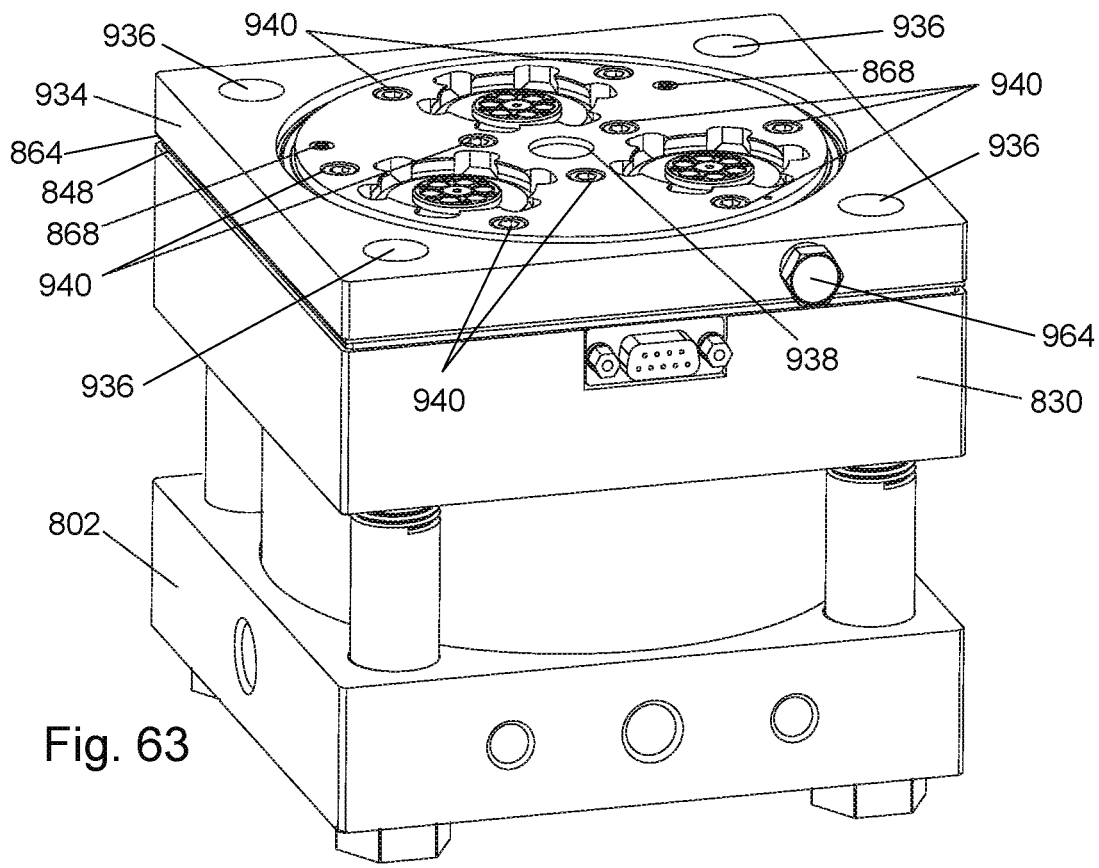
Fig. 63
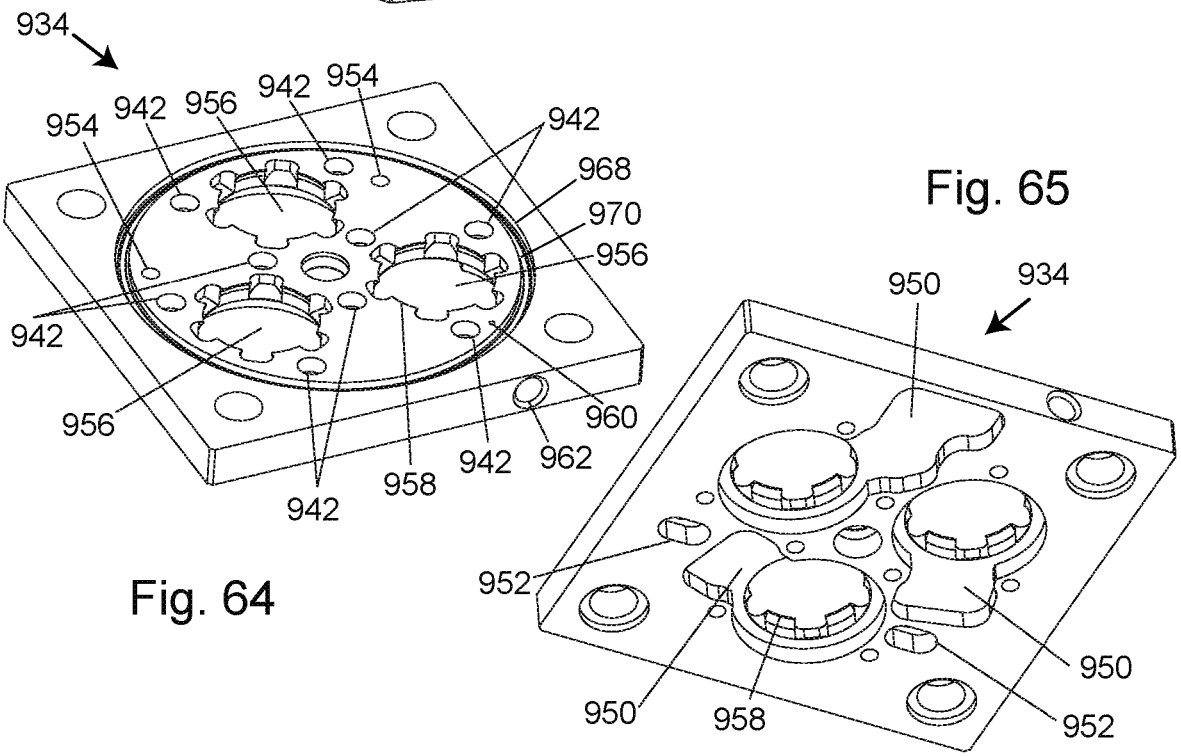
Fig. 64
Fig. 65

ACTUATORS FOR POWER TOOL SAFETY SYSTEMS

CROSS-REFERENCE TO RELATED APPLICATIONS

This application is a continuation of U.S. patent application Ser. No. 13/393,919, filed Mar. 2, 2102, which is a continuation of International Application No. PCT/US10/02634, filed Sep. 29, 2010, which claims the benefit of and priority from U.S. Provisional Patent Application Ser. No. 61/278,111, filed Oct. 2, 2009. This application also claims the benefit of and priority from U.S. Provisional Patent Application Ser. No. 61/464,940, filed Mar. 11, 2011. All these applications are incorporated herein by reference.

TECHNICAL FIELD

The present disclosure relates to fast-acting and low-inertia actuators. More specifically, the disclosure relates to fast-acting and low-inertia actuators useable in various applications where a high force must be applied very quickly.

BACKGROUND ART

Safety systems for power tools are disclosed in International Application Number PCT/US00/26812, filed Sep. 29, 2000, and published as International Publication Number WO 01/26064 A2 on Apr. 12, 2001, the disclosure of which is hereby incorporated by reference. That application claims priority to a number of priority documents, including U.S. Provisional Patent Application Ser. No. 60/157,340, filed Oct. 1, 1999. The safety systems disclosed in that application include a detection system adapted to detect a dangerous condition between a person and a working portion of a machine, such as accidental contact with the working portion, and a reaction system associated with the detection system to cause a predetermined action to take place relative to the working portion upon detection of the dangerous condition by the detection system. The reaction system may be a retraction system to retract the working portion. Machines equipped with safety systems are also disclosed.

Retraction systems for use in power equipment are also disclosed in U.S. Pat. No. 7,509,899, filed Aug. 13, 2001 and issued Mar. 31, 2009, and that patent is also hereby incorporated by reference. The retraction systems disclosed in that patent are configured to retract a cutting tool at least partially away from a cutting region upon detection of a dangerous condition by a detection system.

Power tool safety mechanisms are also disclosed in International Application Number PCT/US02/21790, filed Jul. 11, 2002, and published as International Publication Number WO 03/006213 A2 on Jan. 23, 2003. That application claims priority to a number of priority documents, including U.S. Provisional Patent Application Ser. No. 60/304,614, filed Jul. 11, 2001. That application discloses a sensing mechanism for detecting user contact with an active portion of a power tool, and a system to rapidly displace the active portion away from a user extremity, or alternatively, to rapidly urge an extremity of the user away from the active portion of the power tool.

Other retraction systems for power tools are disclosed in U.S. Pat. No. 6,922,153, filed May 13, 2003 and issuing on Jul. 26, 2005. That patent discloses using a pyrotechnic and propellant to pivot a saw blade down or using a flywheel to do so.

A pyrotechnic drop mechanism for power tools is disclosed in U.S. Pat. No. 7,628,101, filed Oct. 30, 2006 and issued Dec. 8, 2009. That patent discloses using a pyrotechnic to move a piston and retract a saw blade.

At least as early as Mar. 19, 2010, a German company called Altendorf posted on the Internet an article describing a hand detection sensor for use on wood processing machinery. That system uses a near-infrared sensor that purportedly can tell the difference between human skin and wood and other materials. Upon detection of human skin, a deflector or shutter stops the user's hand from reaching the saw blade.

German patent document DE 196 09 771 A1, with a publication date of Jun. 4, 1998, describes a safety system for a circular saw bench in which a Theremin oscillator purportedly detects the proximity of a hand to a blade and a pneumatic cylinder then retracts the blade.

BRIEF DISCLOSURE

Fast-acting and low-inertia actuators are useable in safety systems for power tools such as table saws, sliding table saws, jointers, up-cut saws and other similar machinery. For example, the actuator may be used to retract a blade or other cutting tool quickly to protect the user against serious injury if a dangerous or triggering condition is detected, such as contact with or proximity to the blade or cutting tool by the user's body. The actuator may include a moveable and resettable piston mechanically linked to the cutting tool so that upon actuation of the actuator, the piston moves to retract the blade or other cutting tool. In certain embodiments of the actuators described herein, forces on the order of thousands of pounds (thousands to tens of thousands of Newtons) can be applied within around 600 microseconds.

Generally, the embodiments of fast-acting, low-inertia actuators described herein include a chamber of pressurized fluid (such as air) that is closed by a cap. The cap may be a piston head or a separate component. The cap is held in place by an electromagnet. When the electromagnet is turned off, the cap is released, allowing the pressurized fluid to escape and apply a force. The force of the escaping fluid may be used, for example, to move a piston and the movement of the piston may perform a task, such as retracting a blade in a table saw. In order to achieve the desired speed and performance, the actuator must be designed to hold fluid at high pressure, the cap that opens to release the pressurized fluid must have low inertia relative to the force applied to it by the pressurized fluid while remaining sufficiently strong and rigid to close the chamber and withstand the pressure within the chamber, the electromagnet must be sufficiently strong to retain the cap against the pressure of the fluid within the chamber, and the electromagnet must be designed to turn off quickly without residual magnetism slowing the movement of the cap, or in other words, the magnetic field produced by the electromagnet must terminate quickly. Fast-acting, low-inertia actuators and implementations of those actuators are illustrated in the attached figures.

A power tool as disclosed herein may include a cutting tool for cutting workpieces, a motor configured to drive the cutting tool, a detection system configured to detect a dangerous condition between a person and the cutting tool, support structure associated with the cutting tool and configured to allow the cutting tool to retract, and an actuator linked to the support structure and adapted to retract the cutting tool upon detection of the dangerous condition by the detection system, where the actuator includes a charge of pressurized fluid.

BRIEF DESCRIPTION OF DRAWINGS

FIG. 44 also shows a circuit board.
FIG. 45 shows an actuator body with a foam layer.
FIG. 46 shows a foam layer.
FIG. 47 shows an actuator with three electromagnets.
FIG. 48 shows a plunger.
FIG. 49 also shows a plunger.
FIG. 50 shows a circuit board with three electromagnets.
FIG. 51 shows, an electromagnet.
FIG. 56 shows an electromagnet housing and insert.
FIG. 57 shows an electromagnet insert.
FIG. 58 shows an electromagnet.
FIG. 59 shows a cross-sectional view of the electromagnet of FIG. 58.
FIG. 60 shows an electromagnet.
FIG. 61 shows a cap.
FIG. 62 shows a contact disk.
FIG. 63 shows an actuator.
FIG. 64 shows a cap retainer.
FIG. 65 also shows a cap retainer.
FIG. 75 shows a piston head.
FIG. 76 shows a knob.

DETAILED DESCRIPTION AND BEST MODE(S) OF THE DISCLOSURE

Figure 1:
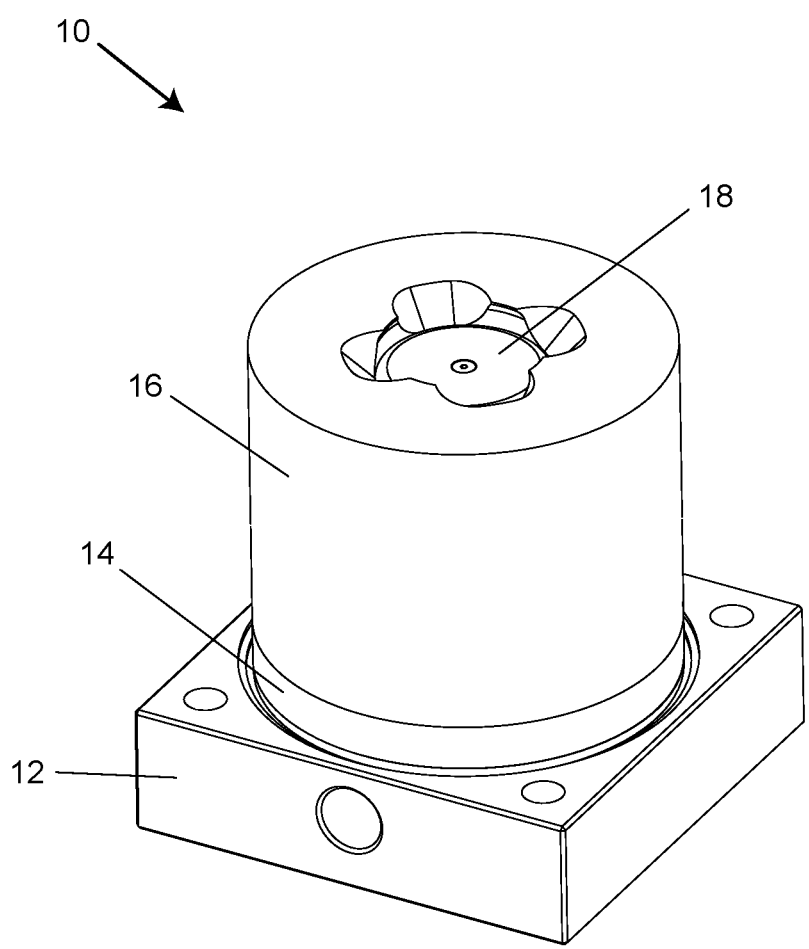
FIG. 1 shows a fast-acting, low-inertia actuator.
Figure 2:
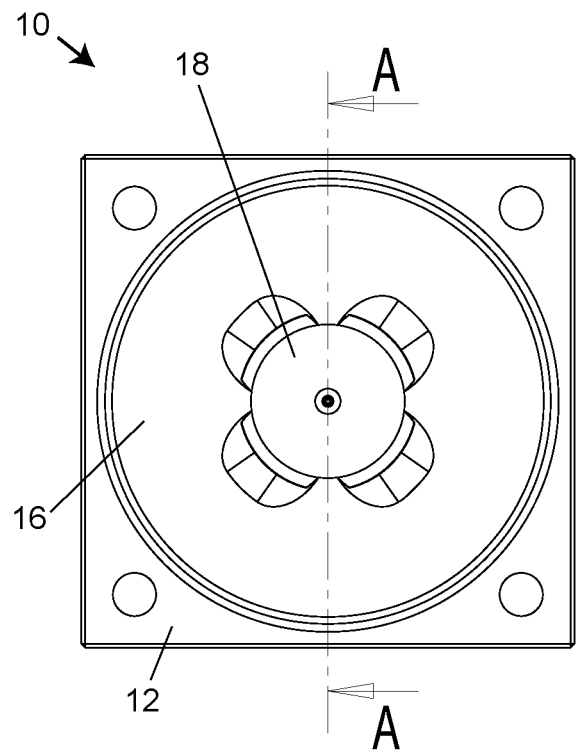
FIG. 2 shows a top view of the actuator of FIG. 1.
Figure 3:
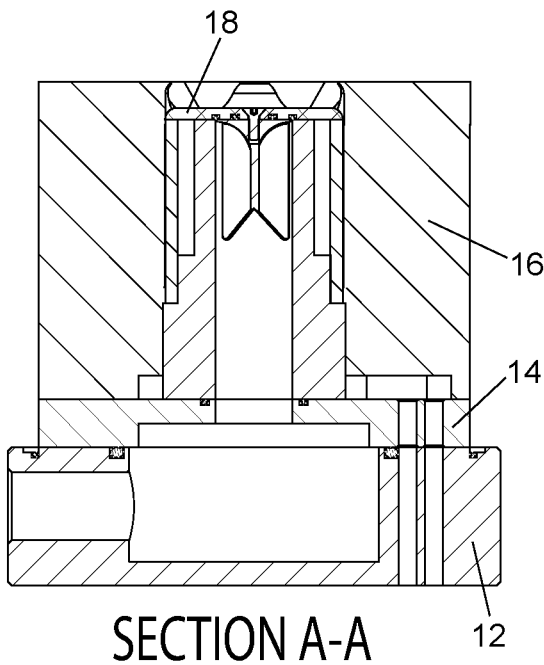
FIG. 3 shows a sectional view of the actuator of FIG. 1 with a cap closed.
Figure 4:
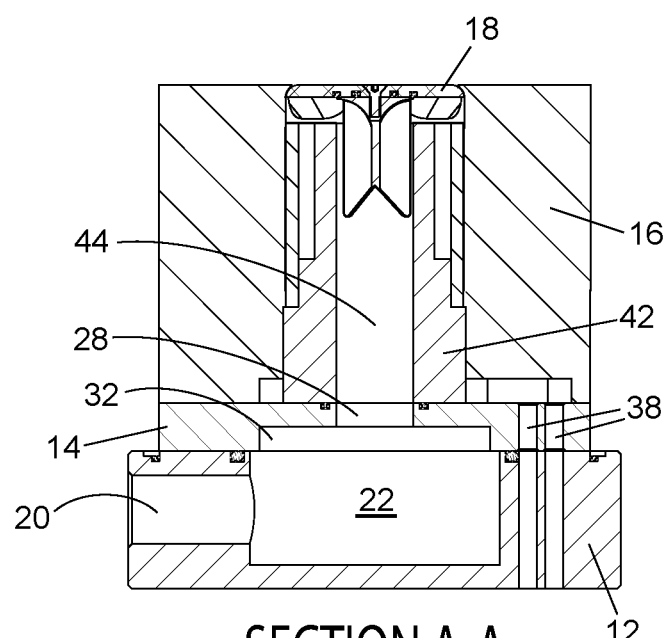
FIG. 4 shows a sectional view of the actuator of FIG. 1 with a cap open.

FIGS. 1 and 2 show an actuator 10 which has a base 12, a conversion plate 14, a magnet keeper 16, and a cap 18. Cross-sectional views of actuator 10, taken along the line A-A in FIG. 2, are shown in FIGS. 3 and 4. FIG. 3 shows a cross-sectional view with the cap closing a chamber, and FIG. 4 shows a cross-sectional view with the cap raised and the chamber open.

Figure 5:
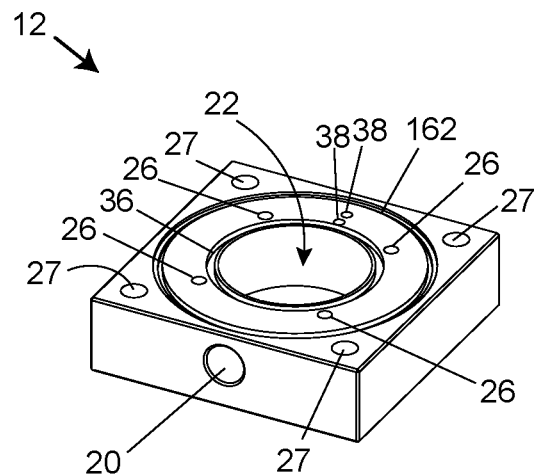
FIG. 5 shows a base of the actuator of FIG. 1.

Base 12 includes a hole or channel 20 through what may be thought of as the front side of the base, as shown in FIG. 5. Channel 20 opens into a cylindrical fluid or air chamber 22 in the center of the base. Hole 20 serves as an inlet through which air is pumped into the air chamber by an air compressor. The top of the air chamber is open and is surrounded by four holes 26 which will be used to attach the base to the rest of the assembly. Base 12 also includes four holes 27 which may be used to attach a cylinder to the base, as will be described below.

Figure 6:
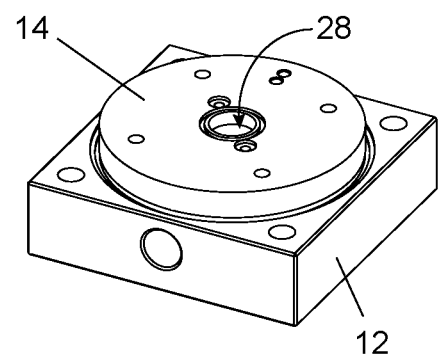
FIG. 6 shows a base and a conversion plate of the actuator of FIG. 1.
Figure 7:
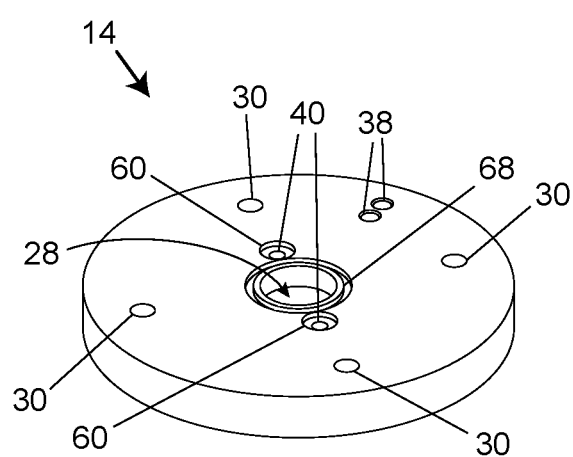
FIG. 7 shows the top of a conversion plate.
Figure 8:
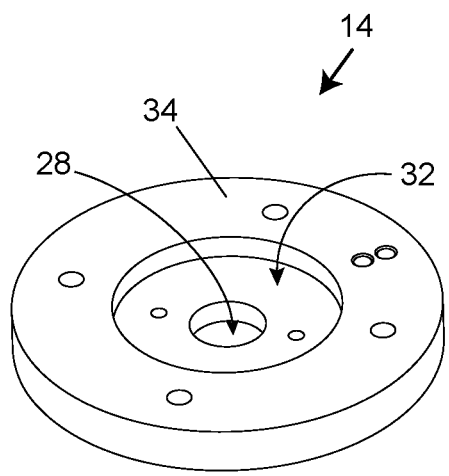
FIG. 8 shows the bottom of a conversion plate.

A conversion plate 14, shown in FIGS. 6-8, fits over base 12 and helps enclose the air chamber. The conversion plate has a hole 28 in the center and four holes 30 that line up with holes 26 in the base. The bottom of the conversion plate has a cylindrical recessed area 32 that is positioned over air chamber 22 in the base but has a slightly smaller diameter than air chamber 22, as shown in FIG. 4. Recessed area 32 is surrounded by flat surface 34. A large o-ring fits into a circular groove 36 in the base and extends around air chamber 22. When the conversion plate is attached to the base, the o-ring in groove 36 contacts flat surface 34 of the conversion plate and seals air chamber 22 at the interface. Two small holes 38 are drilled through both the base and conversion plate outside of the air chamber and are used to pass electrical wires to and from the interior of the actuator, as will be described below.

Figure 9:
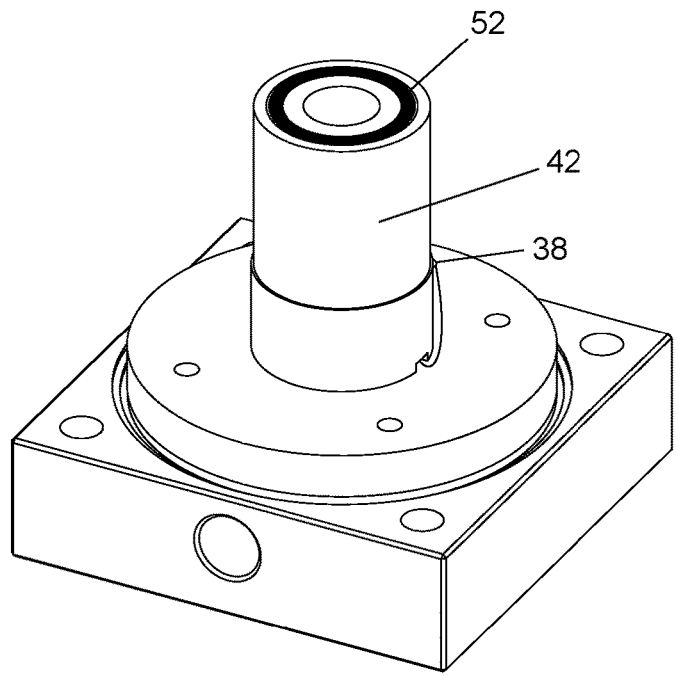
FIG. 9 shows a base, conversion plate, and electromagnet of the actuator of FIG. 1.
Figure 10:
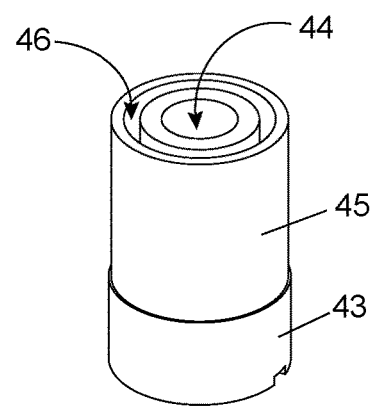
FIG. 10 shows part of an electromagnet.
Figure 11:
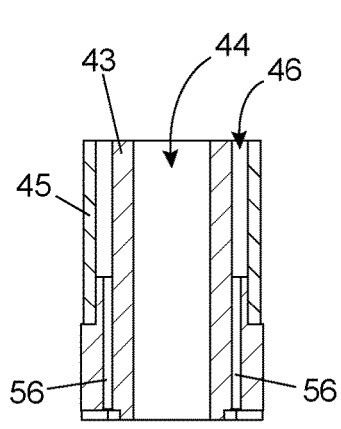
FIG. 11 shows a cross-section of parts of an electromagnet.

Conversion plate 14 also has two small holes 40 closely surrounding the center hole 28. These two holes are used to mount an electromagnet 42, as shown in FIG. 9. Electromagnet 42 is composed of a first steel cylinder 43 with a hole 44 through the center, as shown in FIGS. 10 and 11. A second steel cylinder 45 is positioned concentrically over and around the upper portion of first cylinder 43 and is sized to create a gap or space 46 between the outer surface of the first cylinder and the inner surface of the second cylinder. Second steel cylinder 45 can be held in place by a press, fit, threads, welding, gluing, screws, etc.

Figure 12:
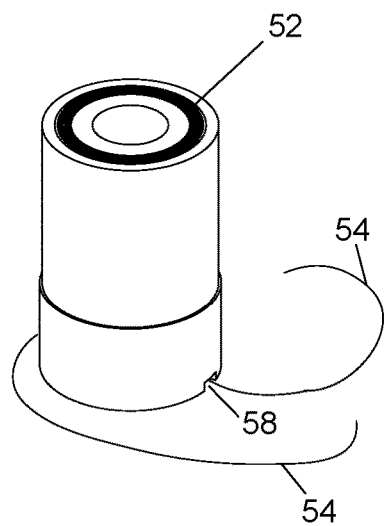
FIG. 12 shows an electromagnet.
Figure 13:
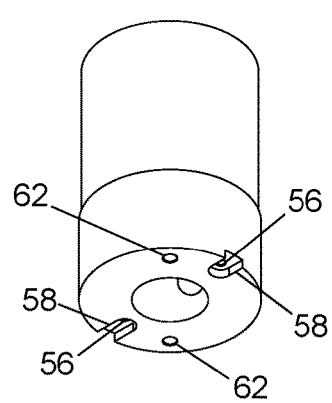
FIG. 13 shows the bottom of an electromagnet.

A coil 52 of copper wire is wound around the upper portion of first cylinder 43 and second cylinder 45 is placed over the coil so the coil fills gap 46, as shown in FIGS. 9 and 12. The copper wire forming coil 52 has two ends 54 and those ends thread down through holes 56 in first cylinder 43 and out the bottom of each side of the electromagnet, one end through each hole. There is a recessed area 58 at the bottom of the electromagnet below each hole to leave space for the wire to exit the bottom of the electromagnet. The wires are routed around the outside of electromagnet 42 and through holes 38 in the conversion plate and base so they may be connected to an electric circuit to control the electromagnet.

Two screws extend up through holes 40 in the conversion plate into threaded holes 62 in the bottom of the electromagnet to attach the electromagnet to the conversion plate. Screw holes 40 are encircled by grooves 60 on the top of the conversion plate, and an o-ring fits into each groove to seal the air chamber. Similarly, groove 68 encircles hole 28 and another o-ring fits into that groove to further seal the air chamber at the interface between the conversion plate and the electromagnet.

Figure 14:
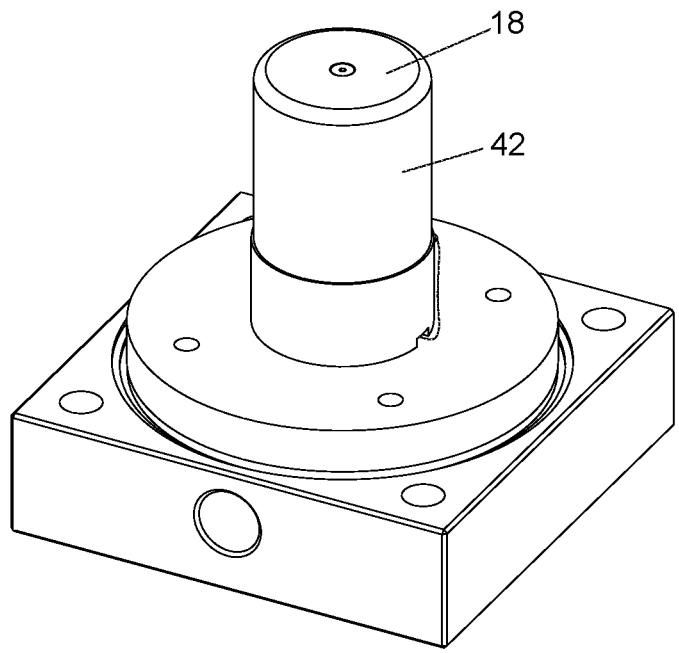
FIG. 14 shows a base, conversion, plate, electromagnet and cap of the actuator of FIG. 1.
Figure 15:
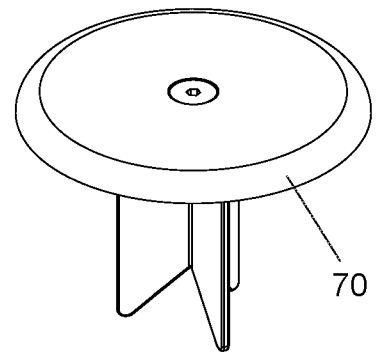
FIG. 15 shows a cap.
Figure 16:
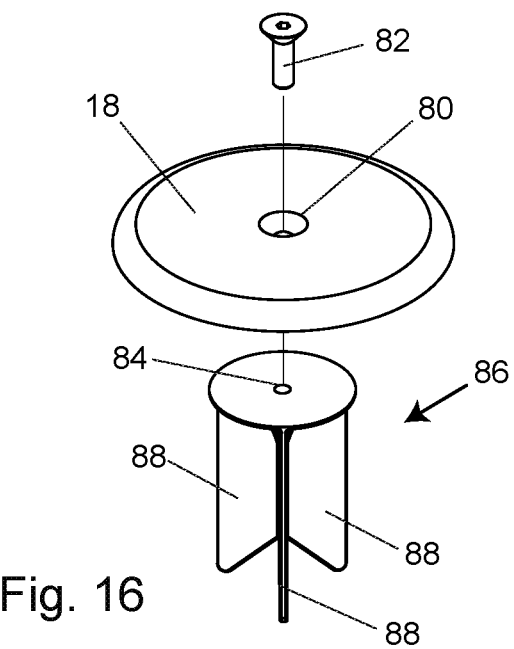
FIG. 16 shows an exploded view of a cap.

Hole 44 through first cylinder 43 is an extension of air chamber 22 in base plate 12, as shown in FIG. 4, and hole 44 extends up through the center of electromagnet 42. As shown in FIG. 14, cap 18 is positioned on top of the electromagnet and covers hole 44. When the electromagnet is turned on, the cap is magnetically attracted to the electromagnet and seals air chamber 22 and hole 44. Cap 18 a flat, somewhat thin, circular piece of steel with a rounded edge 70 around the perimeter that slopes downward so that the bottom surface of the cap has a larger diameter than the top, as shown in FIG. 15. A hole 80 is in the center of the cap, and a screw 82 passes through the hole and into a corresponding hole 84 in the center of a guide 86 to attach the guide to the bottom surface of the cap, as shown in FIG. 16. In the depicted embodiment, the guide is a plastic part with a flat, round top surface and with hole 84 in the center. Three flat, long fins 88 extend down below the top. The fins help keep the cap from tilting when it moves up or down and they are long enough that about three-quarters of the length of the fins remains in hole 44 when the cap is fully raised. The fins are arranged so their outer edges are vertical and separated by 120 degrees. The bottom of each fin is cut at an angle so that the outside edge is longer than the inside edge. This minimizes the weight of the guide.

Figure 17:
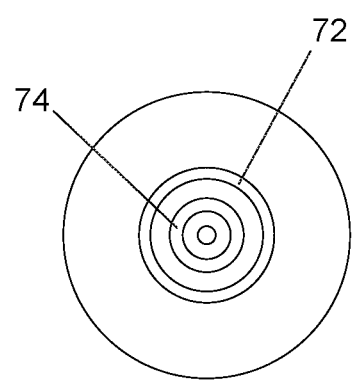
FIG. 17 shows grooves in the bottom of a cap.

The bottom of the cap has two circular grooves 72 and 74, as shown in FIG. 17, and those grooves are concentric with the center of the cap. O-rings are fitted into the grooves and the o-ring in outer groove 72 seals against first cylinder 43 of the electromagnet when the cap is down. The o-ring in inner groove 74 seals against the top of guide 86 around hole 80 in the center of the cap. The top of the guide is of a diameter such that it overlaps the o-ring in outer groove 72 over approximately half of the width of the o-ring to hold the o-ring in place. Guide 86 is used to keep the cap aligned with hole 44 so that as the cap moves up and down, the o-ring in groove 72 will always align with the edge of hole 44 so that the air chamber can be sealed reliably.

A magnet keeper 16, shown in FIGS. 18-21, fits over the electromagnet and conversion plate. The magnet keeper is a generally cylindrical housing with a hole 90 through the top center. Hole 90 is large enough to fit over cap 18 with sufficient clearance for the cap to move up and down. A shallow cutout 92 on the bottom of the magnet keeper, which is concentric with but has a slightly larger diameter than hole 90, allows some room around the bottom of the magnet for the two ends 54 of the wire from the electromagnet. Cut out 92 joins another recessed area 94 which extends over the two holes 38 in the conversion plate and base plate through which the two ends of wire 54 are routed. The magnet keeper is mounted over the conversion plate and to the base plate by screws that extend up through holes 26 in the base and holes 30 in the conversion plate to thread into holes 96 in the magnet keeper.

Figure 18:
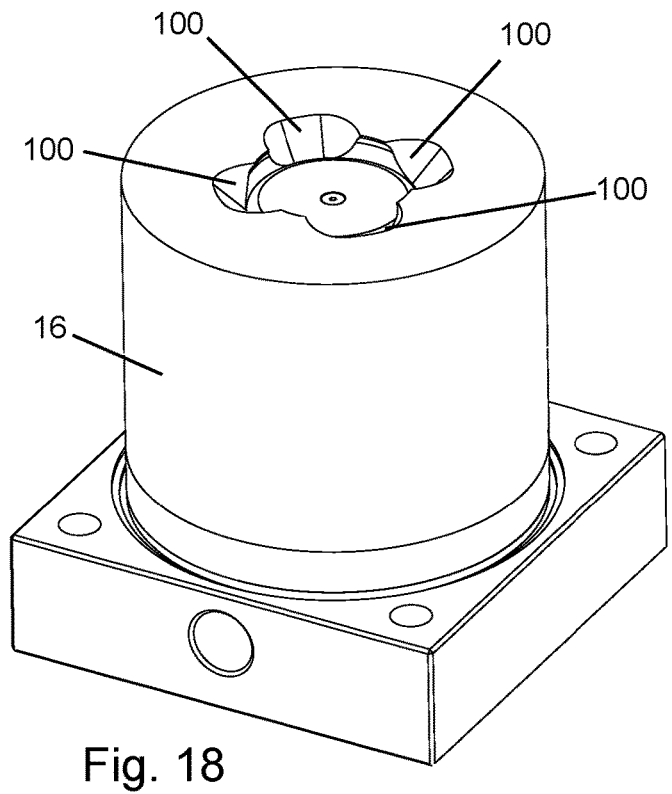
FIG. 18 shows an actuator.
Figure 19:
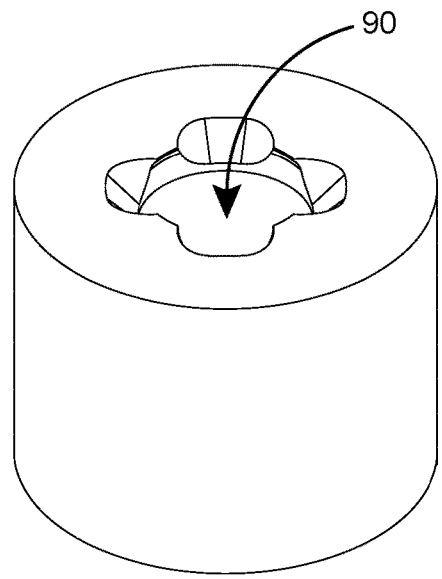
FIG. 19 shows a magnet keeper or housing.
Figure 20:
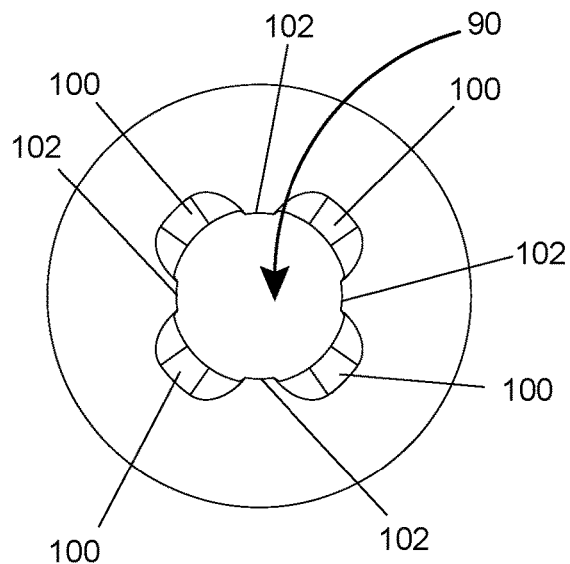
FIG. 20 shows a top view of a magnet keeper or housing.
Figure 21:
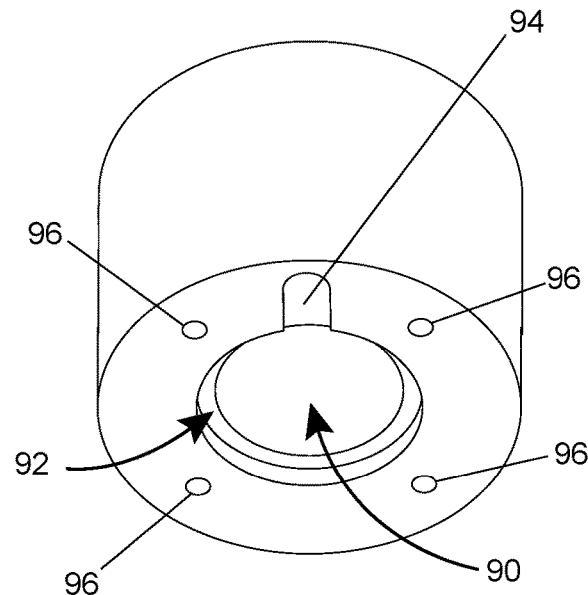
FIG. 21 shows a bottom view of a magnet keeper or housing.

As shown in FIGS. 18, 19 and 20, the top of the magnet keeper is designed to allow air from the air chamber to escape when the cap is released, while also providing abutments to stop the upward movement of the cap. Four equally spaced ducts or air outlets 100 are formed around hole 90. Air outlets 100 consist of cut outs with slanted bottoms and rounded corners that slant down and inward toward the perimeter of hole 90. Between the air outlets, the top surface of the magnet keeper extends towards the center with a decreasing thickness forming shoulders or fingers 102. The fingers 102 are curved underneath to match the curvature along the top edge of the cap. The four fingers 102 extend toward and slightly over the rounded edge of cap 18 to form abutments or catches to stop the upward movement of the cap. In this embodiment, fingers 102 allow the cap to move upward about one quarter of, an inch. The disclosed embodiment uses four channels and four fingers to help keep the cap from tilting when it abuts the fingers, although more or less fingers and channels could be used. When the cap is raised, the top surface of the cap is flush with the top surface of the magnet keeper.

Figure 22:
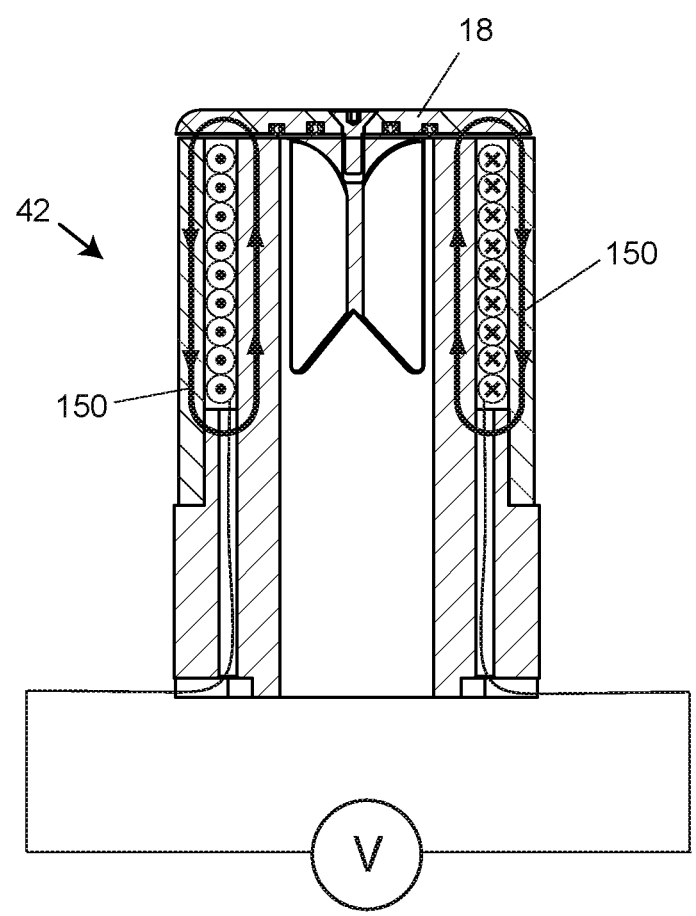
FIG. 22 shows a coil used in an electromagnet.

FIG. 22 shows a cross-sectional view of electromagnet 42 and helps illustrate how the electromagnet works to hold and release cap 18. In this figure, the wire loops forming coil 52 are represented by dots and Xs. In use, the coil is connected to a voltage source so that current flows in the wire and around the coil. The dots in FIG. 22 represent current flowing out from the page on the left side of the coil and the Xs represent current flowing into the page on the right side of the coil. That current flow creates a magnetic field that points up inside the coil, wraps around the top of the coil, and then comes back down on the outside of the coil. With the cap in place, the magnetic field is able to trace a looped path within metal creating a closed-loop magnetic circuit, as represented by arrows 150 in FIG. 22, which makes the magnetic field much stronger than if there were a non-metal gap that the magnetic field had to travel across to complete a loop.

Generally, an electromagnet creating as much holding force as possible is desired so that the air chamber can be pressurized as high as possible. However, physically larger electromagnets that create higher holding forces also release the cap slower because the residual magnetic field takes time to dissipate after the current passing through the coil is turned off. This is in part due to the inductance of the coil and to eddy currents generated in the metal supporting and surrounding the coil when the coil current is shut off. Accordingly, the electromagnet must be designed to achieve a desired balance of holding force and release time. Electromagnets creating approximately 50 to several 1000 lbs of force may be designed for different applications. In some of the applications described subsequently concerning table saws, one or more electromagnets, each having a diameter of approximately 2.5 inches, a coil having on the order of hundreds of loops, and an electric current on the order of 1 amp or less, is sufficient to generate a holding force on the order of hundreds of pounds each. Smaller electromagnets, however, will have smaller fluid outlets and thereby will be limited in the volume of pressurized fluid that can be released quickly to perform a task. Using multiple small electromagnets is one way to overcome that limitation because multiple electromagnets will have multiple outlets. For any size of electromagnet, using high resistance steel or other high resistance metal for the electromagnet causes eddy currents to dissipate more quickly due to the higher resistance, and thereby minimizes the time to release the cap. Also, to maximize the holding force of the electromagnet, sufficient electric current should be supplied to the coil to generate enough magnetic field to saturate the metal surrounding the coil. Additionally, electromagnets with double coils or multiple coils could be used.

In order to decrease the release time of cap 18, a current can be forced through the coil in the opposite direction for a brief amount of time to speed the decay of the dissipating magnetic field. The counteracting or "turn off" current is only applied for a brief amount of time because otherwise it will begin to re-magnetize the magnet with the magnetic field pointing in the opposite direction.

Figure 23:
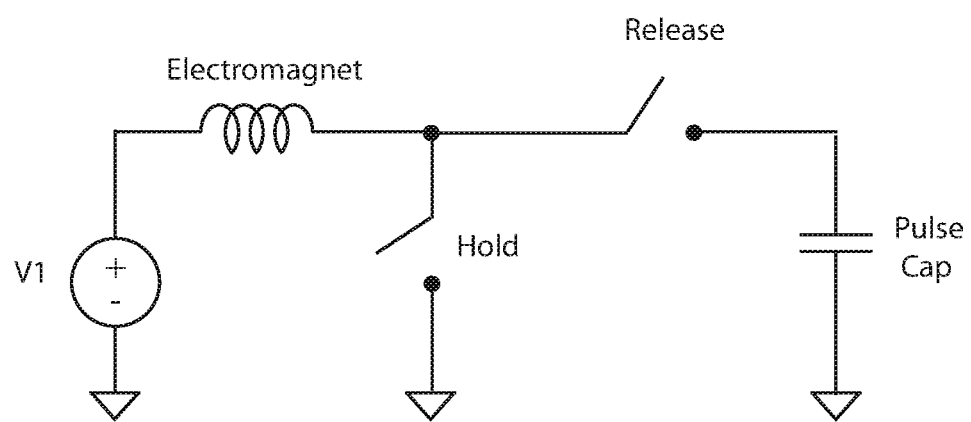
FIG. 23 shows a schematic circuit.

FIG. 23 shows conceptually how to energize the electromagnet and provide a current in the opposite direction to speed the decay of the dissipating magnetic field. In this figure, the electromagnet is represented as an inductor and V1 is the voltage source that supplies the current to the electromagnet. Closing the "Hold" switch turns the electromagnet on to hold cap 18 in place. Opening the "Hold" switch causes the magnetic field to dissipate and release cap 18. Closing the "Release" switch at the same time the "Hold" switch is opened connects a capacitor charged to a high voltage, labeled "Pulse Cap," to the electromagnet and provides a pulse of current in the opposite direction to speed the decay of the dissipating magnetic field to more quickly release cap 18. By way of example, 100 to 1,000 volts can be applied to cause the reverse current and induce large reverse eddy currents. Capacitances ranging from 1 microfarad to 100 microfarads are typical values for the capacitor, depending on the magnet and other factors.

In addition to reversing the current in the electromagnet, the magnetic field can also be more quickly dissipating by constructing the electromagnet core out of laminated strips of metal layered together such that there are a series of non-metallic interruptions in the inner and outer cylinders perpendicular to the direction of the current. The laminations interrupt the metal so that large eddy current loops cannot form.

Figure 24:
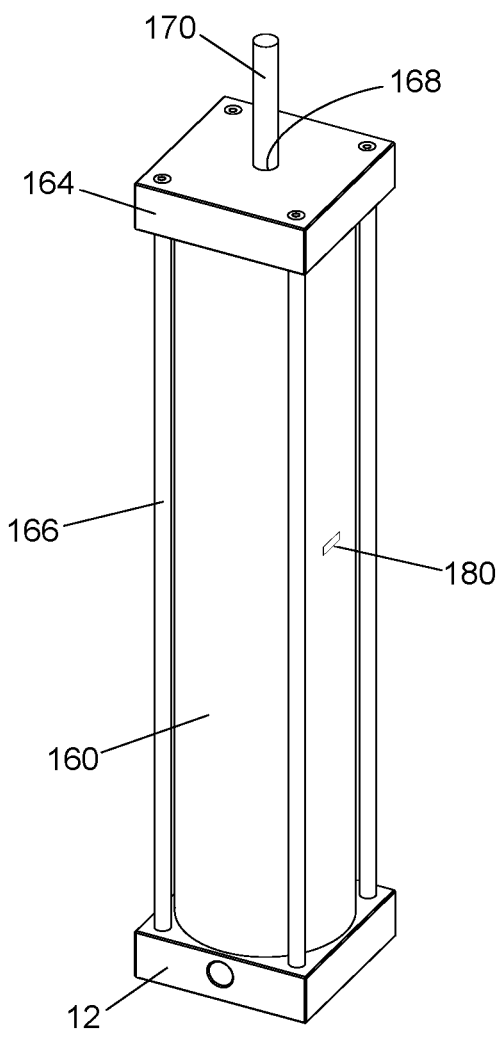
FIG. 24 shows a piston cylinder.
Figure 25:
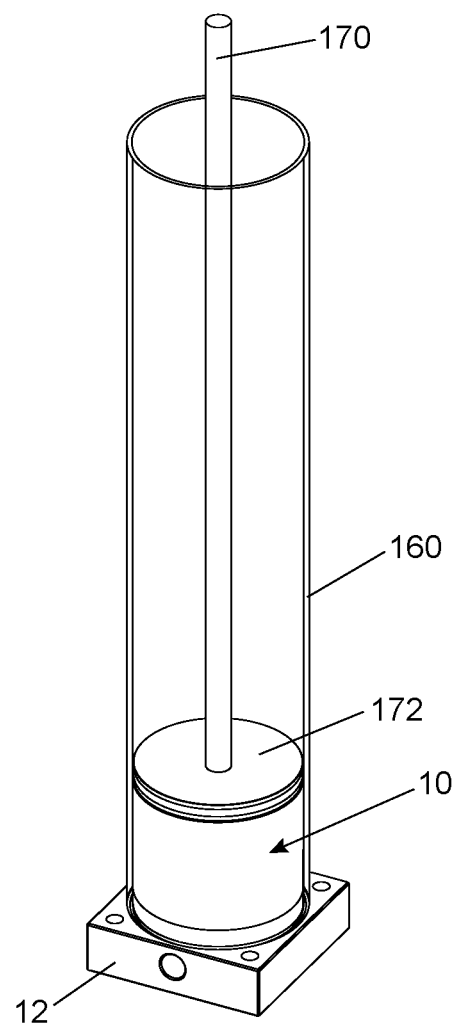
FIG. 25 shows a piston and actuator.

An actuator as described above may be used to quickly accelerate a piston. In FIGS. 24 and 25, actuator 10 is shown incorporated in a piston system where the base 12 of the actuator forms the base of the piston system. The bottom of a large cylinder 160 fits in a groove 162 on the top of base 12. The top of the cylinder fits into a similar groove in a cover 164 which covers the top of the cylinder. Four rods or long bolts, such as bolt 166, connect base 12 to cover 164 to hold cylinder 160 in place. The bolts pass through holes 27 in the base and thread into corresponding holes in the cover.

Figure 26:
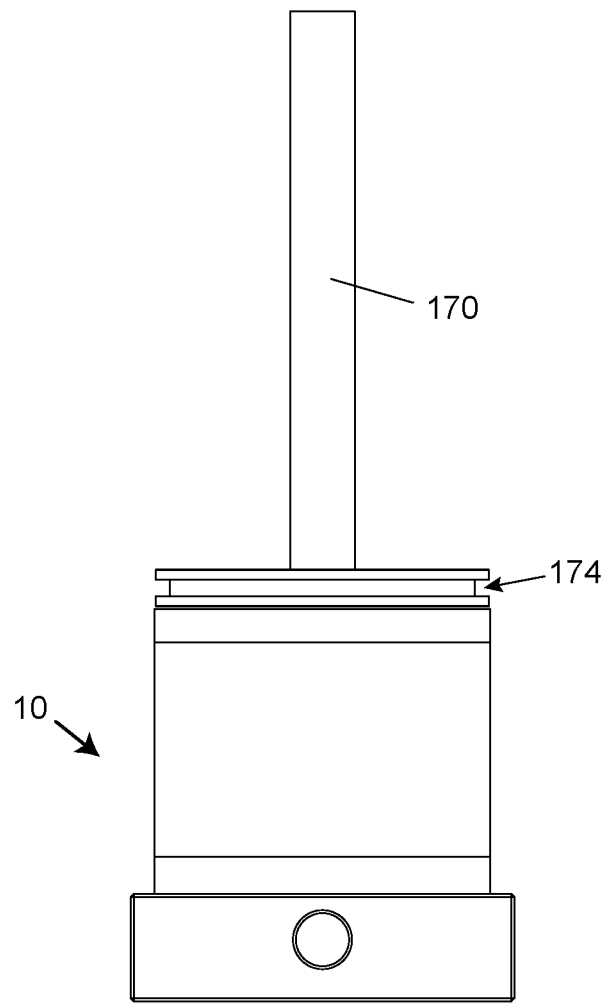
FIG. 26 shows a piston.

Cover 164 also includes a hole 168 through which a piston rod 170 extends. A piston head 172 is attached to the other end of rod 170 within cylinder 160. The piston head is a round, flat piece thick enough to be solid and resist warping. There is a groove 174 around the side of the piston head, as shown in FIG. 26, and an o-ring fits into the groove. The o-ring contacts the inner side of cylinder 160 to create a seal between the piston head, and the cylinder so that air or gas expanding under the piston head does not escape.

Figure 27:
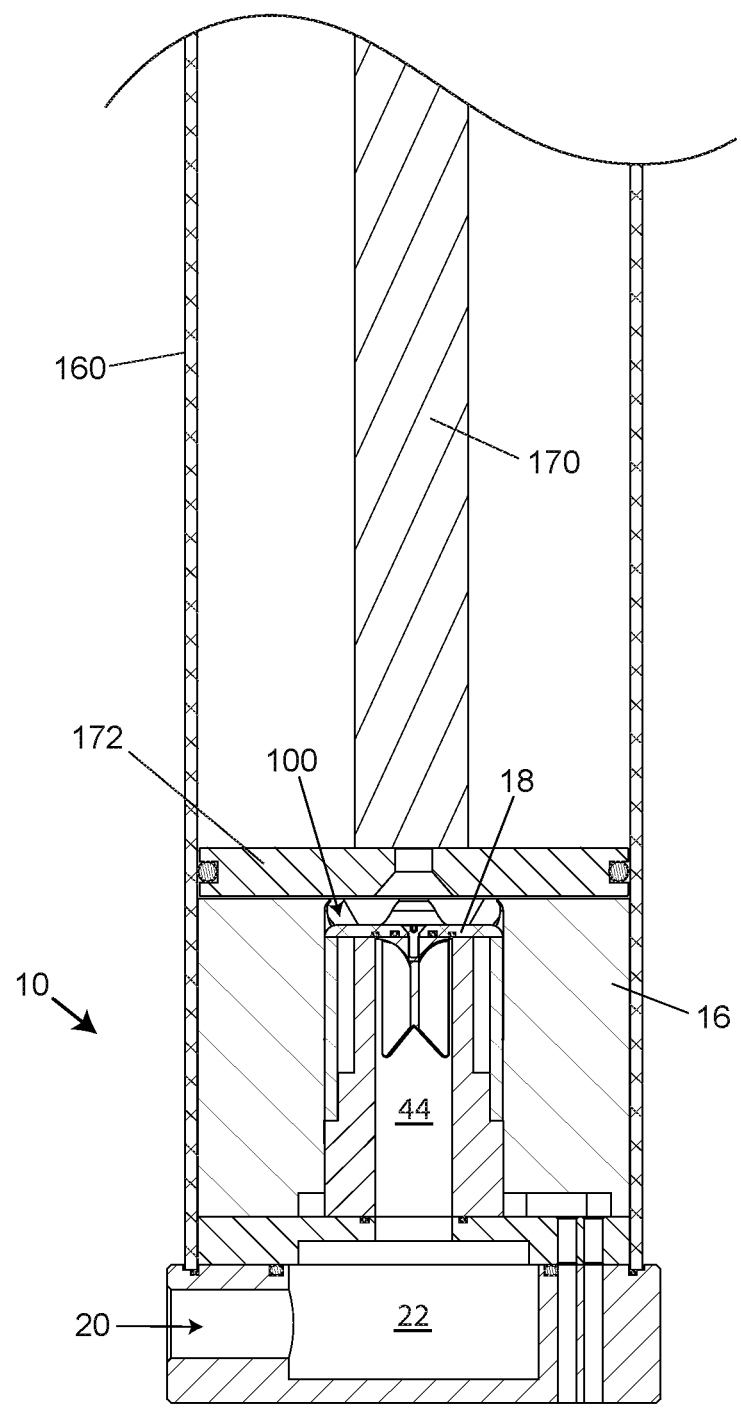
FIG. 27 shows a cross-sectional view of an actuator and piston.

FIG. 27 shows a cross-sectional view of actuator 10 and the piston system described above. In this figure, air chamber 22 and hole 44 are sealed by cap 18, and piston head 172 rests on the top of magnet keeper 16. To operate the piston, the electromagnet is turned on to seal chamber 22 and the chamber is filled with air through the inlet 20 at the front of the base of the actuator. This may be done with an air compressor that is followed by one or more boosters to get the air pressure up to the desired level. To fire the piston, the electromagnet is turned, off so that cap 18 moves upward releasing air from chamber 22 through outlets 100 at the top of the magnet keeper. The air expands under the piston head driving the piston upward. In an alternative embodiment, the piston head may include a portion that extends below the top surface of the magnet keeper and toward the cap (or the cap may include a portion that extends up toward the piston head) so that when the cap moves up, the cap strikes the piston head and imparts at least some of its energy to the piston head before the cap is stopped by the magnet keeper.

The volume of chamber 22 is sized according to the volume that is to be filled under the piston head once the air is released. This, in turn, will depend on the mass of the piston, the mass of the load the piston is to move and the velocity the piston is to acquire in a certain distance. A chamber filled with a charge of air at a desired pressure but which is too small will not be able to supply enough air to move a heavy load far enough for it to reach an expected velocity under the acceleration imparted to it by the expanding gas. The combined cross-sectional area of the four outlets through which the air is released is sized according to how fast the air is to be released since there is a limit as to how fast air can move and if the outlets are too small, the airflow will be restricted.

The idea of a charge of fluid stored locally or near the piston is significant when the actuator is used in a safety system for power equipment. A remote source of air cannot be relied upon in that situation because the relatively slow speed of sound in air of about 1 foot per millisecond means it would take too long for a remote charge of pressurized air to reach the piston and start it moving. A person could be seriously injured in the time it took for the remote charge of pressurized air to reach the piston. A charge of pressurized air near the piston provides the fastest response; one cannot achieve the same results with a remote charge. Charges of pressurized fluid may be located as close as possible to the piston and/or cutting tool. For example, pressurized charges may be located less than one meter or less than one half meter from the cutting tool. Charges of pressurized fluid may be located within a housing enclosing the structure supporting the cutting tool in a piece of power equipment, such as within the cabinet of a table saw.

Once the air is released and the piston is driven upward under the force of the expanding gas, the air in the volume in the cylinder above the piston will become pressurized and cause the piston to decelerate. The height of the cylinder is sized according to how far the piston is to be moved and how soon it is to decelerate. It is desirable to decelerate a piston that is moving fast so that it does not jolt and potentially damage other parts connected to the piston. Ideally, both the acceleration and the deceleration of the piston would be constant. The air above the piston forms an air spring which helps to decelerate the piston but the piston can be decelerated even more quickly and more evenly after the piston has reached a desired height by adding one or more pressure outlets to the side of cylinder 160, such as pressure outlet 180 shown in FIG. 24. The pressure outlets are pressure-sensitive valves that open to allow air below the piston head to be escape. They are positioned on the cylinder at a height just above the desired height the piston is to reach under the pressure of the expanding gas so that as soon as the piston passes the pressure outlets the air under the piston head is allowed to escape through the pressure outlets thus aiding the deceleration of the piston.

Figure 28:
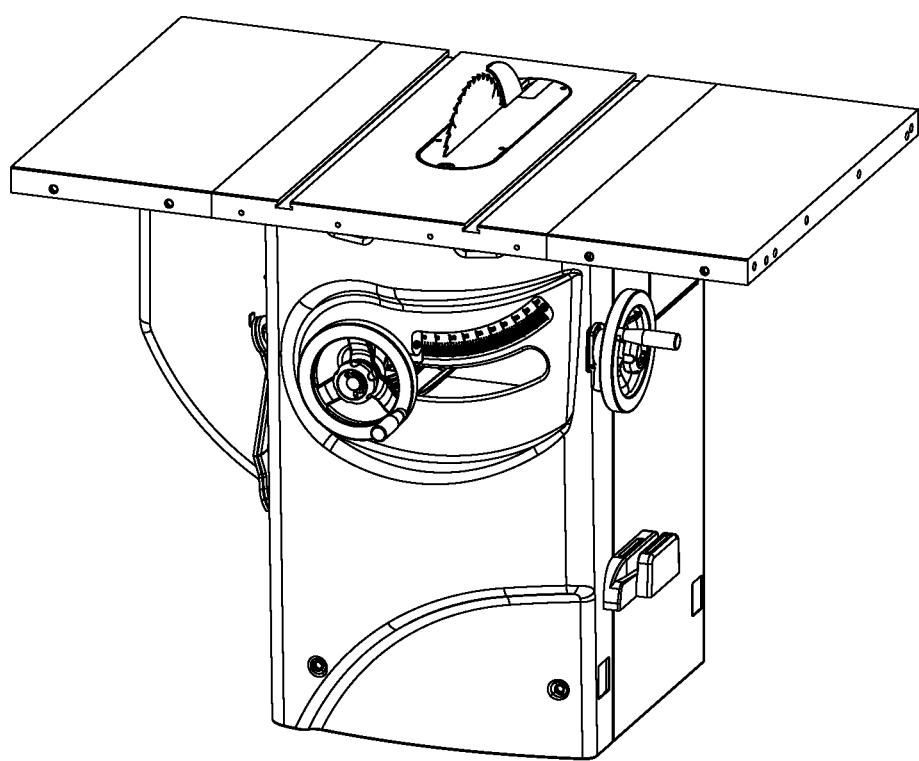
FIG. 28 shows a table saw.

An actuator and piston assembly as described above can be used in a safety system for various power tools, including a table saw. A table saw is a woodworking tool that includes a table and a circular blade that extends up through the table, as shown in FIG. 28. Table saws are described in U.S. Patent Publications 2007/01514330A1 and 2010/0050843A1 and in U.S. Pat. No. 7,707,920, which are incorporated herein by reference. A piece of wood, or other material to be cut, is placed on the table and pushed into contact with the spinning blade to make a cut. Unfortunately, it is common for users of table saw to accidentally contact the spinning blade and be seriously injured. To address these injuries, the saw or other power tool can be equipped with a system to detect contact with or dangerous proximity to the blade, as has been described in various patents, including but not limited to U.S. Pat. Nos. 7,055,417, 7,210,383, 7,284,467, and 7,600,455, all of which are incorporated herein by reference. Upon detection of such a dangerous condition, an actuator and piston assembly as described herein can be triggered to retract the blade quickly to mitigate any injury. A system to retract a blade is particularly applicable in machines where the blade or cutting tool has substantial inertia making it difficult to stop the blade quickly.

Figure 29:
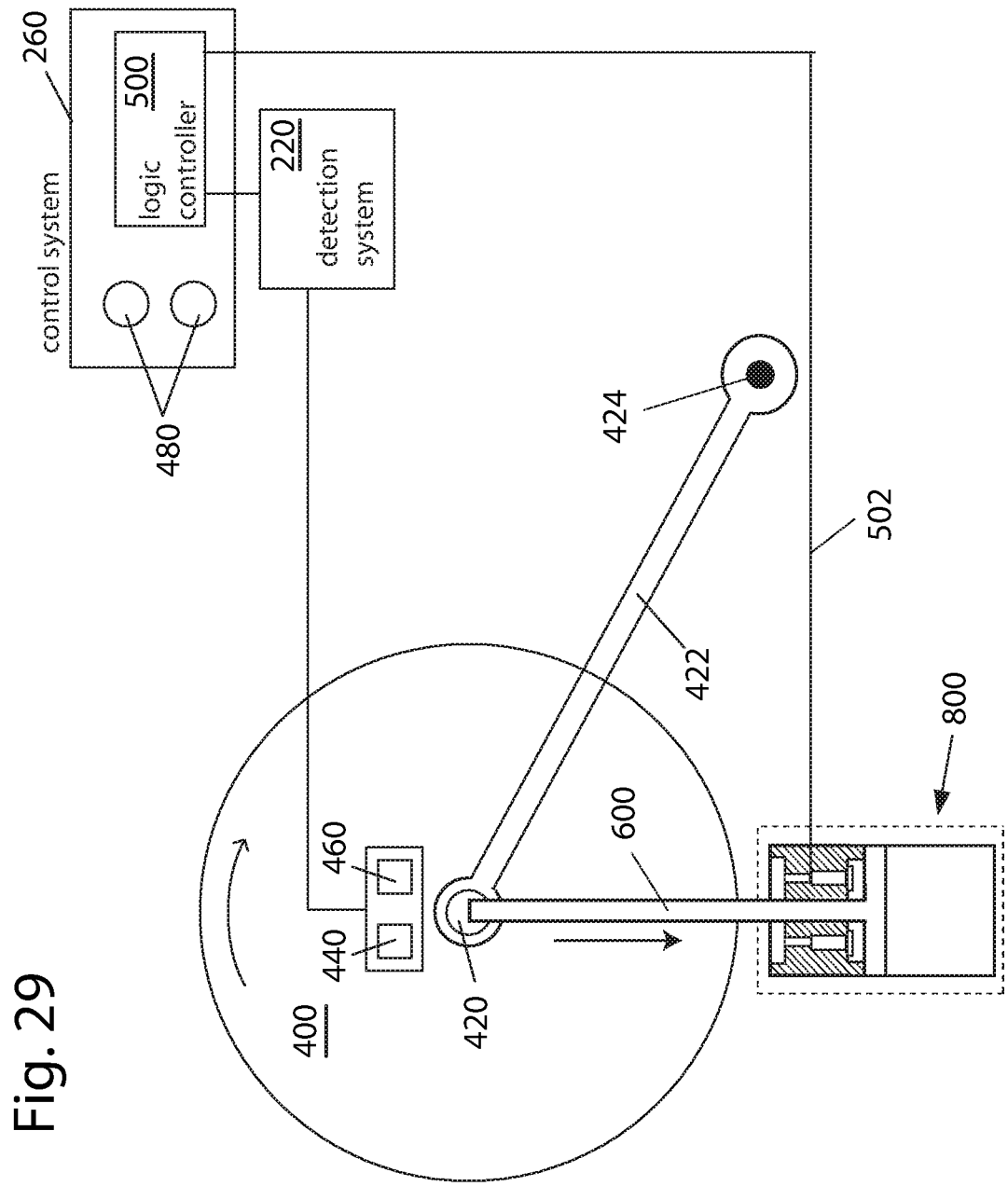
FIG. 29 is a schematic drawing of a retraction system.

FIG. 29 shows one example of how an actuator and piston assembly can be implemented to retract a spinning blade in a table saw. In FIG. 29, a circular blade 400 is mounted on a rotating shaft or arbor 420. The arbor, in turn, is supported by an arbor support 422, and the arbor support is mounted in the machine so that it can pivot around point 424. A detection system 220 is adapted to detect a user coming into contact with blade 400.

The detection system includes a sensor assembly, such as contact detection plates 440 and 460, capacitively coupled to blade 400 to detect any contact between the user's body and the blade. Typically, the blade, or some larger portion of the machine is electrically isolated and the detection system imparts an electrical signal to the blade through detection plate 440 and monitors that signal for changes indicative of contact through detection plate 460. The detection system transmits a signal to a control system 260 when contact between the user and the blade is detected.

Control system 260 includes one or more instruments 480 that are operable by a user to control the motion of blade 400. Instruments 480 may include start/stop switches, speed controls, direction controls, light-emitting diodes, etc. Control system 260 also includes a logic controller 500 connected to receive the user's inputs via instruments 480. Logic controller 500 is also connected to receive a contact detection signal from detection subsystem 220. Further, the logic controller may be configured to receive inputs from other sources (not shown) such as blade motion sensors, work piece sensors, etc. In any event, the logic controller is configured to control operation of the saw in response to the user's inputs through instruments 480. However, upon receipt of a contact detection signal from detection subsystem 220, the logic controller overrides the control inputs from the user and triggers an actuator and piston assembly to retract the blade. An exemplary control system for a fast-acting safety system is disclosed in U.S. Pat. No. 7,600,455, which is incorporated herein by reference.

In FIG. 29 an actuator and piston assembly is shown at 800 connected to logic controller 500 by line 502. A piston rod 600 is mechanically coupled to arbor support 422 so that when the actuator is fired, the piston rod pulls the arbor support downward to retract the blade. In this embodiment, two electromagnets in one actuator are used to drive the piston. Alternatively, two actuators could be used. In FIG. 29, piston rod 600 extends past two electromagnets and through a reservoir, and the actuator is configured to pull the piston rod down.

Once the actuator has fired, it can be reset by turning on the electromagnet to close the cap and re-charging the air chamber. A spring or other mechanism can be used to move the piston back against the magnet keeper and cap. A spring can also be used to bias the cap to a position where the air chamber is closed. An actuator as described herein can be cycled (i.e., triggered and reset) repeatedly. This is a significant feature because it allows a system using the actuator, such as a safety system in woodworking equipment, to be repeatedly triggered without a user having to replace parts of the safety system.

Figure 30:
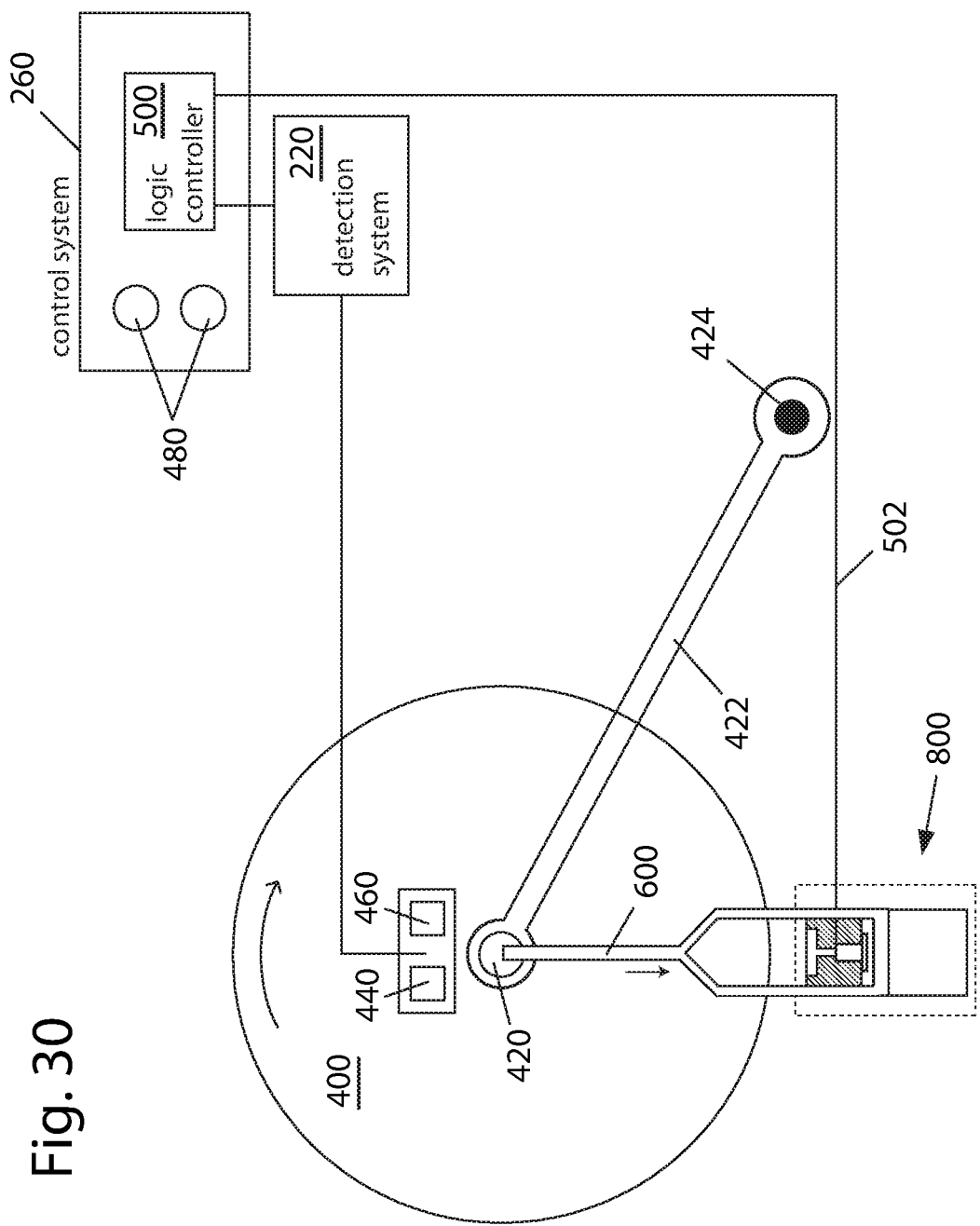
FIG. 30 is a schematic drawing of another retraction system.
Figure 31:
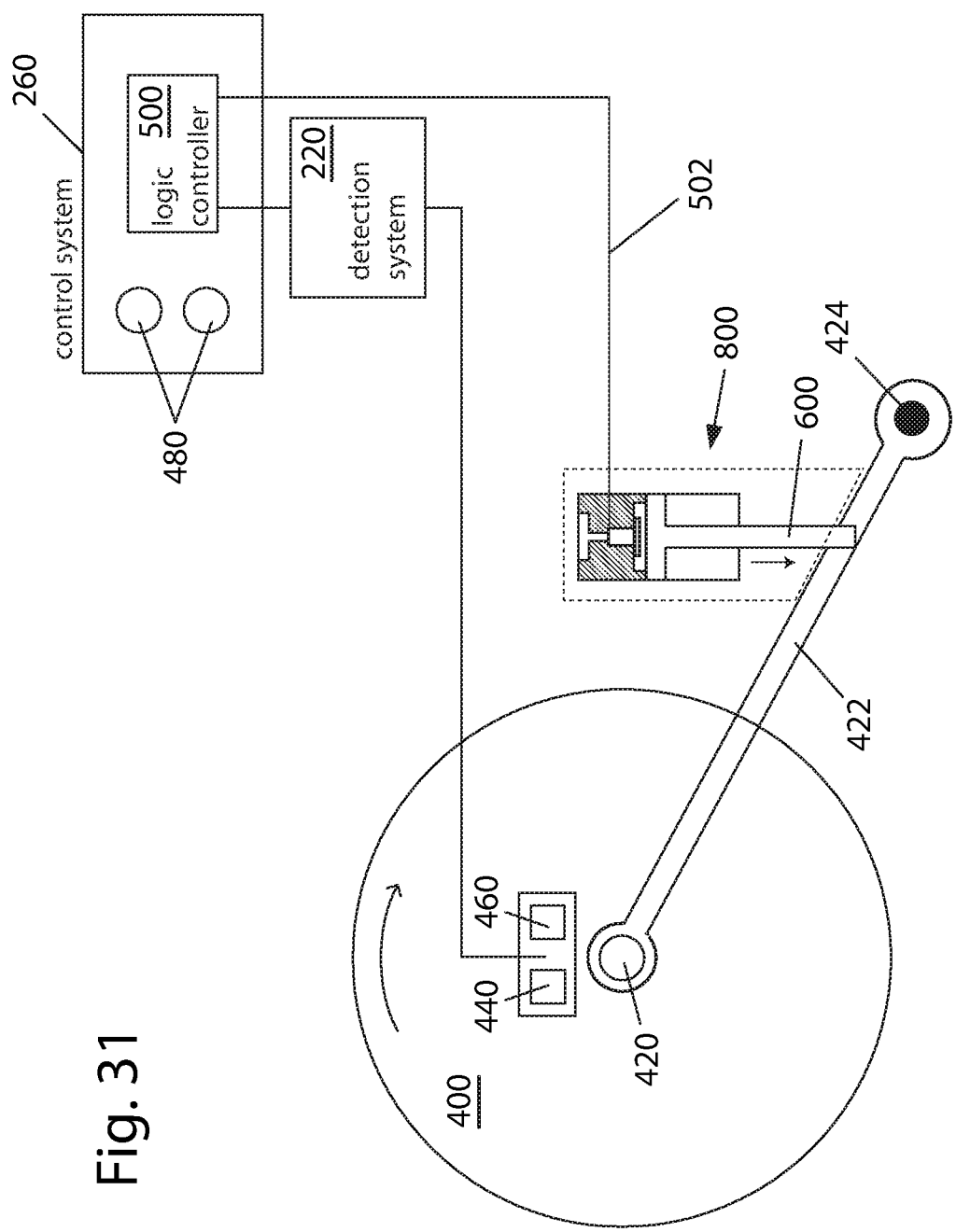
FIG. 31 is still another schematic drawing of a retraction system.
Figure 32:
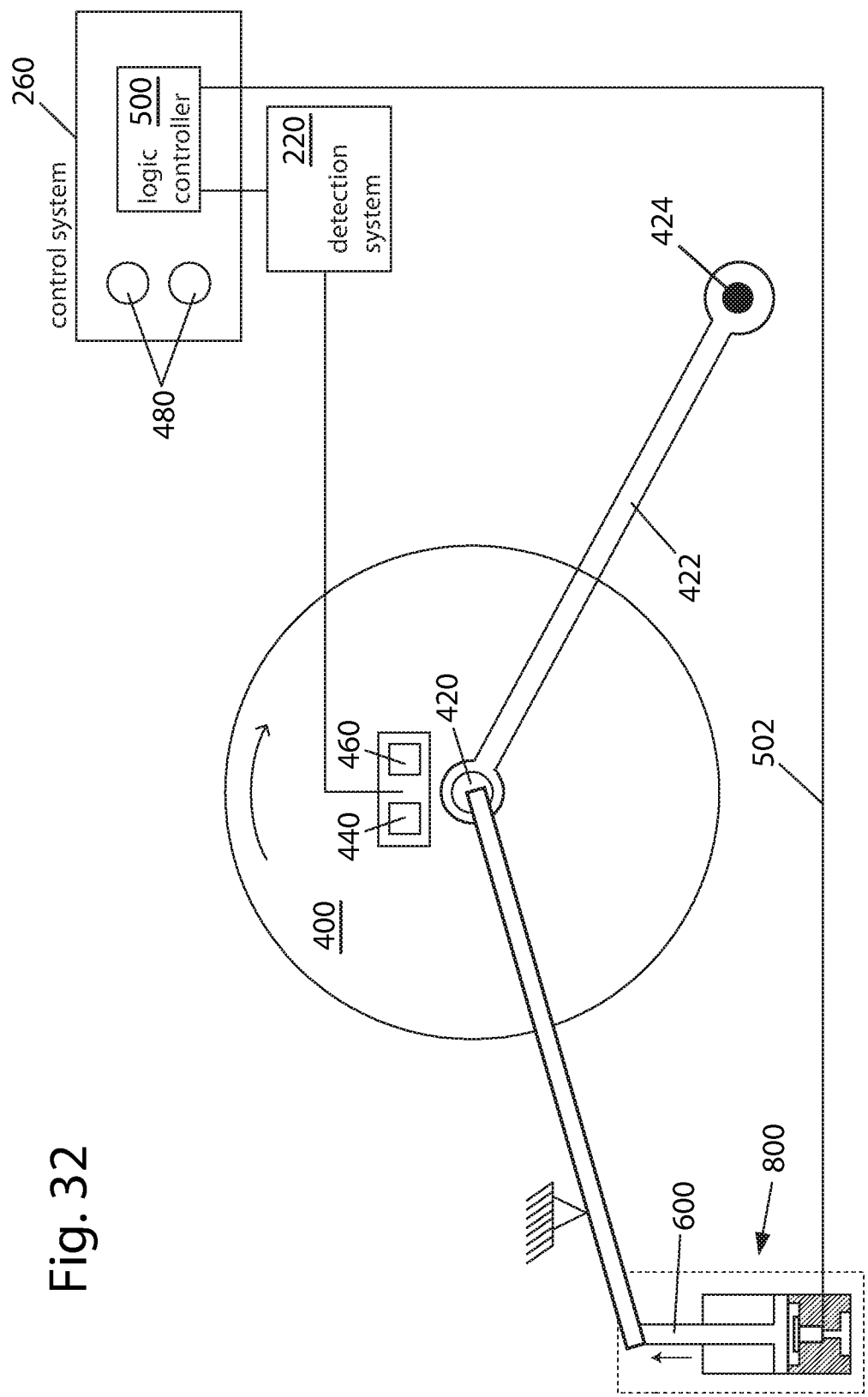
FIG. 32 is yet another schematic drawing of a retraction system.

Other examples of how an actuator and piston assembly can be implemented to retract a spinning blade in a table saw are shown in FIGS. 30-35. These figures show piston structures configured in different ways and oriented in different directions. In FIG. 30, a piston rod 600 is shaped to extend around an actuator so the actuator can pull the piston rod down. In FIGS. 31 and 32 piston rods and actuators are configured so that the piston rods are pushed away from the actuators.

Figure 33:
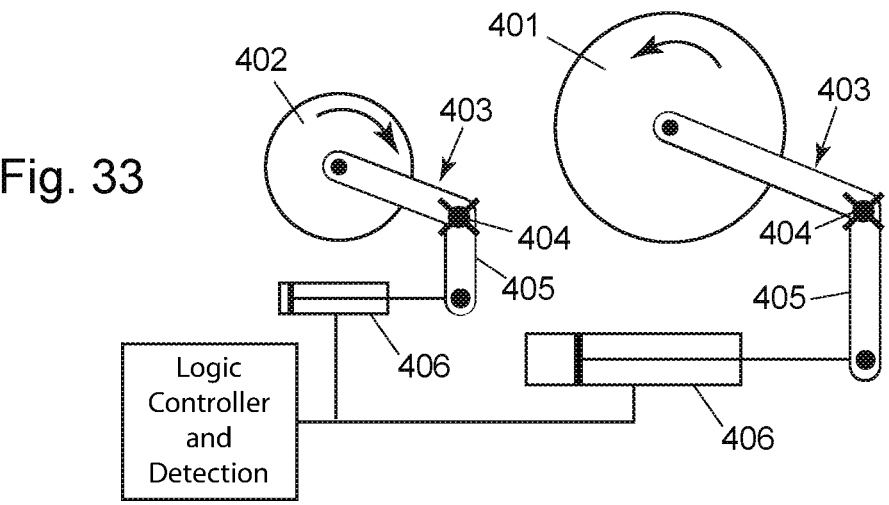
FIG. 33 is a schematic drawing of a retraction system using two actuators.

FIG. 33 shows a configuration for a table saw that has both a main blade 401 and a scoring blade 402. Each blade is supported by a somewhat "L" shaped arbor 403 mounted in a saw to pivot around point 404. Each arbor includes an arm 405 and an actuator 406 is operatively connected to arm 405 so that when the actuator fires, the piston moves out and pushes arm 405. Pushing arm 405 causes the blade to pivot down around point 404, thereby to retract the blade and minimize danger. In this embodiment, two separate actuators are used, one to retract the main blade and the other to retract the scoring blade.

Figure 34:
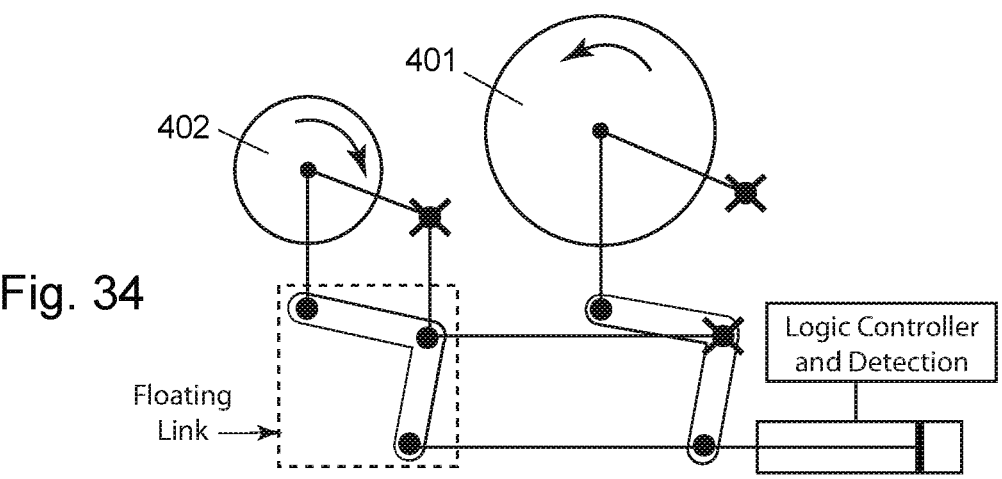
FIG. 34 is a schematic drawing of a retraction system using a 4-bar linkage.
Figure 35:
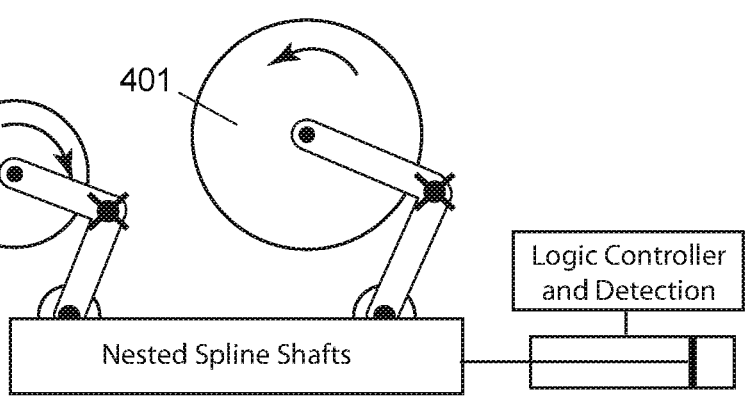
FIG. 35 is a schematic drawing of a retraction system using nested spline shafts.

FIG. 34 shows an embodiment where one actuator is used to retract both a main blade and a scoring blade. The actuator is connected to the blade through a 4-bar linkage with anchor points in the linkage identified at each "X". FIG. 35 shows an embodiment where a single actuator is connected to two blades by nested and splined shafts. The linkages between the actuators and blades in these embodiments provide a structure to retract the blades in case of danger, while allowing an elevation mechanism to raise and lower the blades to accommodate workpieces of varying thicknesses.

The fundamental idea of using an actuator and piston assembly as described herein in a safety system for table saws or other power tools is to move the blade away from the hand of a user faster than the hand can move into the blade. Typically, the speed at which a human can flinch to move a hand is around 2 meters per second. Even assuming a person's hand could move at a speed of 6 meters per second, an actuator and piston assembly as described herein can be constructed with a charge size sufficient to move the blade away faster. An actuator as described herein can accelerate a piston, blade and arbor support of around 10 kilograms at an acceleration on the order of 50 to 200 Gs or more.

One factor in maximizing the effectiveness of an acceleration on the order of 50 to 200 Gs, or even 50 to 1000 Gs or more, is to minimize the decay time of the magnetic field so that the acceleration is applied as quickly as possible. One way to minimize the decay time is to chose a magnet material of a higher bulk resistance, for example, stainless steel rather than plain steel. The higher resistance increases the ohmic loss and dissipation of eddy currents and thereby reduces the time required for the magnetic field to release the cap to allow the pressurized fluid to exit the reservoir. Although stainless steel has a higher resistance and thereby can be used to minimize the decay time of the magnetic field, plain steel can also be used.

Another way to minimize the decay time of the magnetic field is to minimize the thickness of the steel supporting and surrounding coil 52. Minimizing the thickness of the surrounding steel reduces the time required for field changes to propagate via eddy current formation and dissipation. Putting a port or channel through the center of the magnet, such as hole 44 in first steel cylinder 43, also reduces the decay time of the magnetic field by reducing the pole wall thickness while still allowing a sufficiently large pole area for the cap to seal the reservoir.

The time required to release the pressurized fluid can be shortened by minimizing the inertia associated with the cap. A cap as described herein is used instead of the piston itself to seal the pressurized chamber because the cap has significantly less inertia, and therefore, the release of the pressurized fluid can be as fast as possible. Also, minimizing the volume of the space between the cap and the piston by positioning the bottom of the piston with the top surface of the magnet keeper minimizes the volume that needs to be filled at activation so that the piston starts moving as soon as possible.

As mentioned earlier, the distance between the reservoir and the piston is minimized to thereby minimize the delay in the pressure wave of the released fluid of about 1 ms/ft due to the limitation of the speed of sound. Accordingly, a remote reservoir would release substantially more slowly.

In an actuator as disclosed herein, operating the magnet close to saturation (i.e., at a current level where an increase in the current does not produce any significantly greater magnetic force) allows the magnet to be as small as possible. Also, designing the electromagnet so that it produces a magnetic force sufficient to hold the cap in place against the pressure in the reservoir, but not significantly more, means the cap will break away from the electromagnet as soon as possible when the current to the electromagnet is turned off, thereby releasing the pressurized fluid as quickly as possible. In some embodiments, the electromagnet may be designed to produce a holding capacity approximately 25% greater than the expected pressure in the reservoir, although other amounts may be selected.

Once activated, the piston is accelerated as the pressurized fluid from the reservoir pushes against the piston head. At the same time, the air or fluid on the other side of the piston compresses and creates back pressure. The cylinder containing the piston can be sized so that there is a sufficient volume of air or fluid on the other side of the piston to slow it down smoothly. The piston will decelerate smoothly if, for example, the cylinder is long enough, for the piston to pass through the point of equilibrium where the pressure on one side of the piston head is equal to the pressure on the other side. Alternatively, as mentioned earlier, a vent can be positioned to allow air to escape after the piston has moved a certain distance so that the piston can decelerate more smoothly. A bumper can also be used to stop the piston and absorb energy.

As mentioned earlier, the actuator can be reset after activation by some mechanism such as a spring which draws the piston back to its starting position. Alternatively, a valve can be placed near one end of the piston cylinder so that low pressure air can be used to drive the piston to its original position. An optional breather vent can be installed on the side of the magnet keeper and connected to a small conduit leading into the area beyond the piston. A breather vent is a vent with a filter that keeps dust and other particles from entering the actuator from outside. The conduit and associated hole for the breather vent would be small enough so that there would be only a negligible amount of leakage through the hole as the pressurized fluid is released from the reservoir, but large enough to provide an outlet for air to escape as the piston is reset to its original position.

Figure 36:
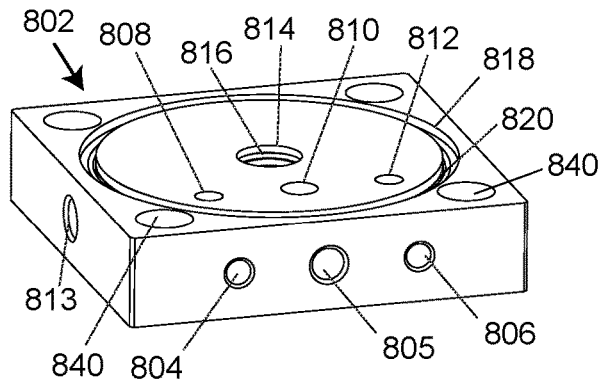
FIG. 36 shows a base of an actuator.
Figure 37:
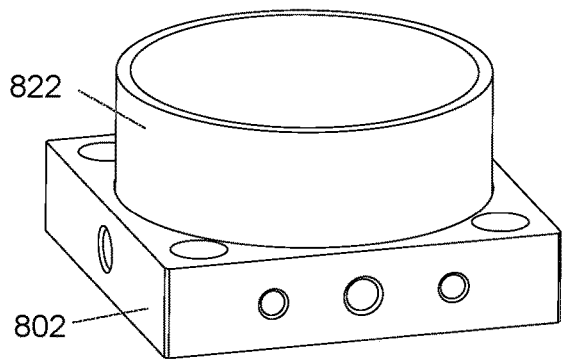
FIG. 37 also shows a base of an actuator.
Figure 38:
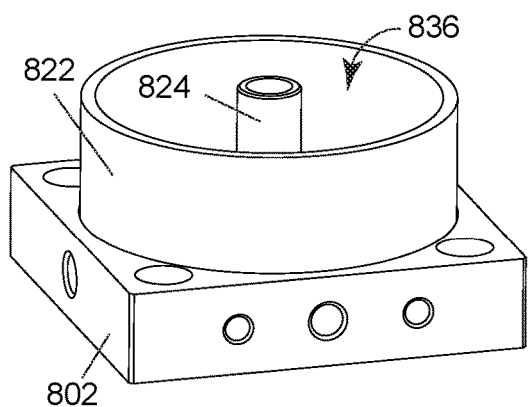
FIG. 38 shows a base of an actuator with an air chamber.

FIGS. 36 through 41 show another embodiment of an actuator. The base 802 of the actuator, shown in FIG. 36 is a square metal block about 1.5 inches thick and about six inches along each side. Three holes 804, 805 and 806 are drilled along the front side horizontally into the base, with hole 805 in the middle of the front side and one hole on either side of the middle hole. Each of the holes along the front side meets a hole drilled vertically down into the base from the top about an inch in from the front side, as shown at 808, 810 and 812, so to create three conduits from the side of the base to the top of the base. Base 802 may also include one or more holes at different locations, such as hole 813, to mount the actuator in a saw or other machine. Another hole 814 passes all the way through the center of the base and a groove is cut into the inner surface of hole 814 just below the top surface of the base within which an o-ring 816 is installed. Another circular groove 818 of a larger diameter, wider cut and concentric with hole 814 is carved into the top surface of base 802. On the bottom surface of groove 818 along the inner radius lays another groove for another o-ring 820. Seated within the larger groove 818 and over the o-ring 820 is the base of a short cylinder 822, as shown in FIG. 37. Hole 814 has an upper portion that is of larger diameter than the rest of the hole, and seated within the upper portion of hole 814 and within o-ring 816 is a smaller cylinder 824 of slightly greater length than outer cylinder 822, as shown in FIG. 38.

Figure 39:
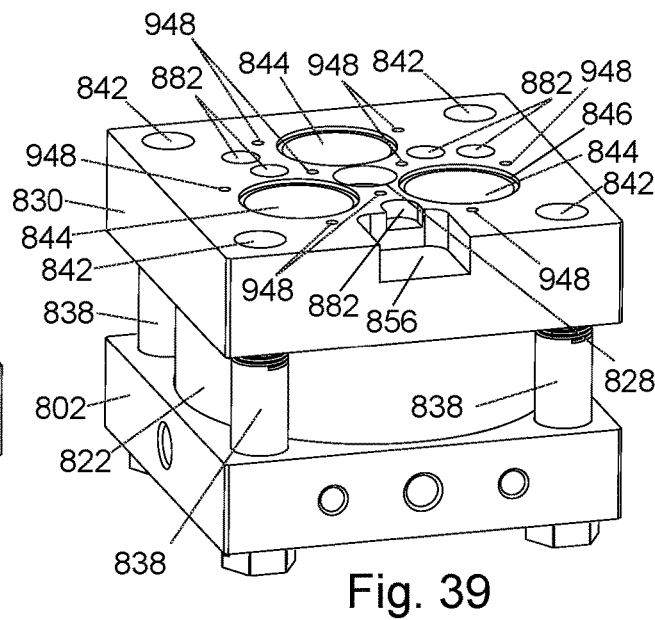
FIG. 39 shows an, actuator body.
Figure 40:
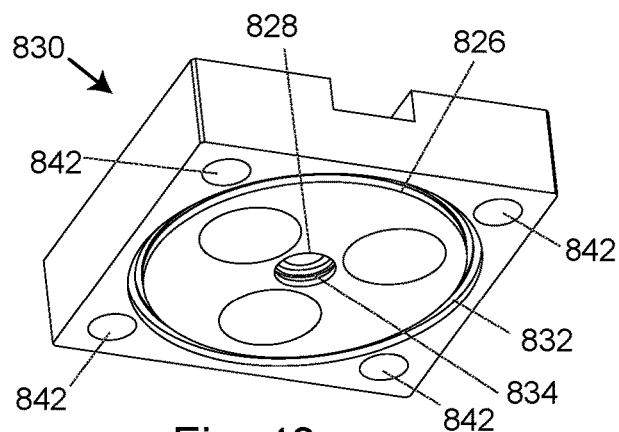
FIG. 40 shows a magnet mount of an actuator.
Figure 41:
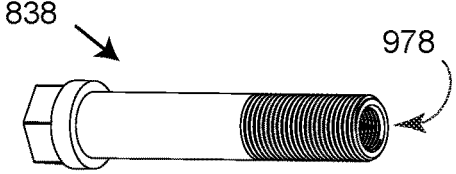
FIG. 41 shows a bolt.
Figure 42:
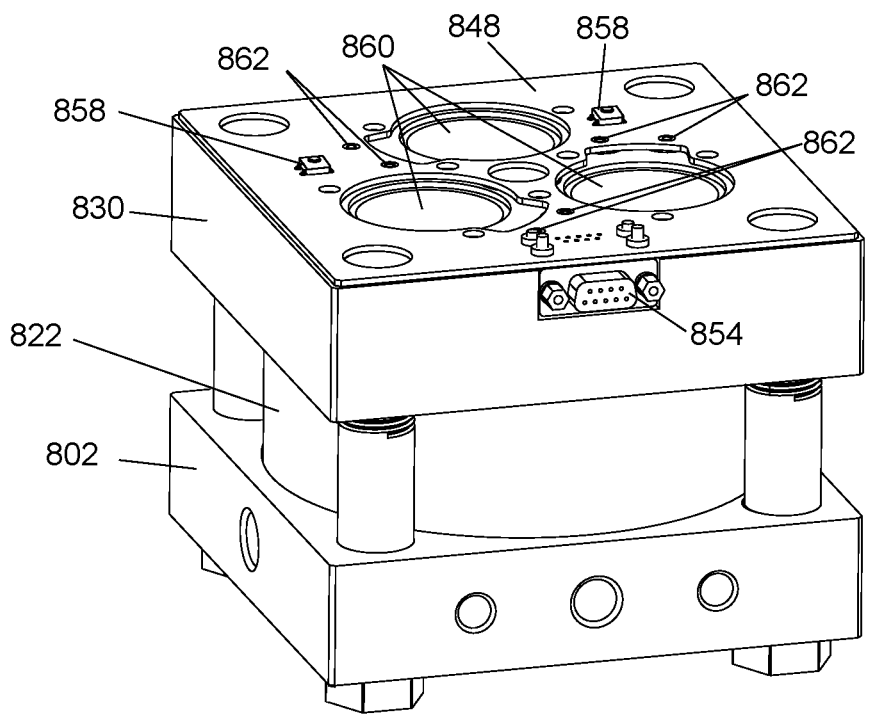
FIG. 42 shows an actuator body with a circuit board.
Figure 43:
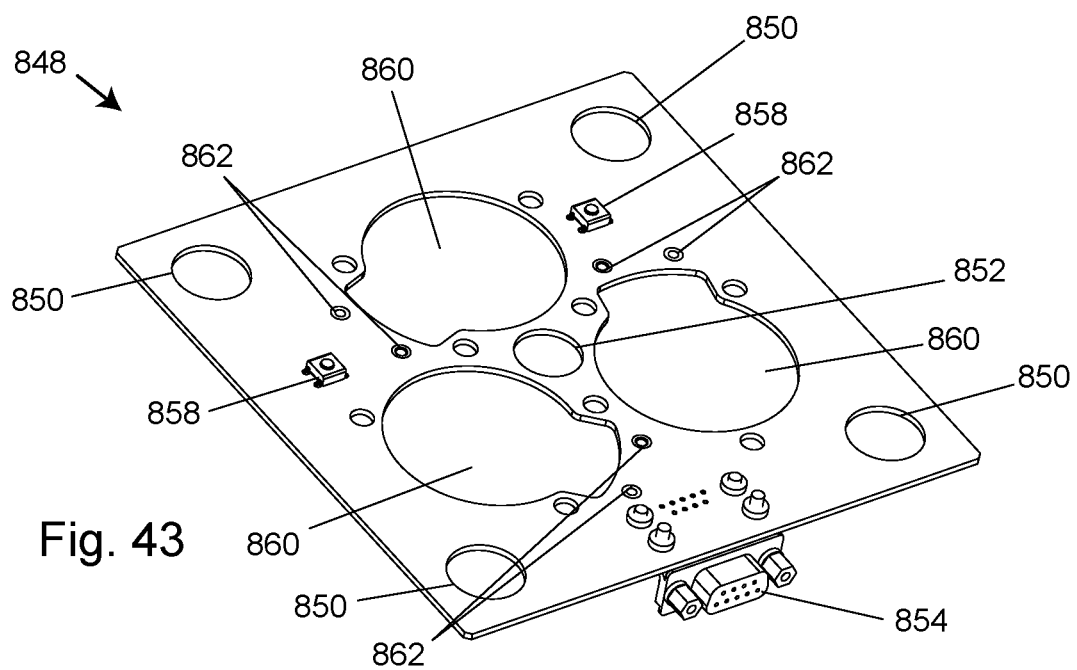
FIG. 43 shows a circuit board.

The tops of cylinders 822 and 824 fit within corresponding groove 826 and hole 828 on the underside of another metal block 830 called the magnet mount of similar dimensions to the base only thicker, as shown in FIGS. 39 and 40. Hole 828 has a lower portion of larger diameter in which inner cylinder 824 resides. Groove 826 and hole 828 are equipped with o-rings 832 and 834 in a manner similar to the o-rings in the base. The O-rings help create a seal for the volume enclosed between outer cylinder 822 and inner cylinder 824 which forms an air chamber 836 similar to air chamber 22 described earlier. Magnet mount 830 is attached to base 802 by four bolts 838, shown in FIGS. 39 and 41, which are inserted into holes 840 in the base, one hole located at each of the four corners of the base. The bolts are inserted from the underside of the base and extend vertically upward where they are then screwed into threaded holes 842 in the magnet mount. Three large holes 844 pass through the magnet mount from the top surface vertically downward opening into air chamber 836. A groove 846 is carved along the top edge of each hole 844 to hold an o-ring and to create a shelf or ledge around the perimeter of each hole to support a magnet as will be seen later. FIG. 42 shows a printed circuit board 848 placed on top of magnet mount 830. Circuit board 848 is shown isolated in FIGS. 43 and 44. Four holes 850, align above holes 842 in the magnet mount and a hole 852 located at the center of the board aligns above hole 828 in the magnet mount. A nine pin D-sub connector 854 is mounted on the bottom of the circuit board along, and at the middle, of the front edge of the board such that the connector projects out from the front edge of the board. The D-sub connector fits within an area 856 carved out along the top and front edge of the magnet mount so that the circuit board may lie flat against the top surface of the magnet mount.

Two tactile or tact switches 858 are mounted to the circuit board, one towards the right rear corner and the other towards the left rear. Electrical traces run from each tact switch to the D-sub connector, as shown in FIG. 44. The tact switches are positioned so that when a piston is fully lowered or retracted the piston compresses the tact switches. In this manner the tact switches are used to indicate to a control system the presence of a piston and that the piston is in the proper position for firing.

Circuit board 848 also has three large holes 860 that are shaped generally like a circle with a small rectangle along the side. A magnet similar to the magnet described earlier fits into each of the holes so that the actuator has three magnets, each magnet with its own cap. Two electrical contacts 862 are provided for each magnet, one for each end of the magnet coil, and traces run from each contact to pins on the D-sub connector to supply power to the magnets, as seen in FIG. 44.

As shown in FIG. 45, a piece of foam 864 is placed over the circuit board and has cutouts for the magnets, tact switches, screws and other holes so that the foam lies flat. Foam 864 is shown isolated in FIG. 46. The foam prevents dust and other contaminants from entering the actuator.

As shown in FIG. 47, adjustable plungers 866, shown isolated in FIGS. 48 and 49, are positioned over the tact switches, one sitting on top of each tact switch. The adjustable plungers provide a mechanism for the piston to depress each switch as the piston moves down. The adjustable plungers have vertically oriented set screws 868 whose height can be adjusted. The plungers are made of a material such as plastic so that when a piston retracts, the piston contacts the set screws and pushes the plunger against the tact switches. The height of each set screw is adjustable so that each screw can be set to contact its tact switch as desired. The plungers are held in position by a cap retainer described below.

Two plastic caps 870 are placed on the surface of the circuit board over the bottoms of the screws that attach the D-sub connector to the circuit board. The plastic caps protrude up above the circuit board to electrically isolate the screws so that they do not make contact with other parts of the actuator.

Figure 52:
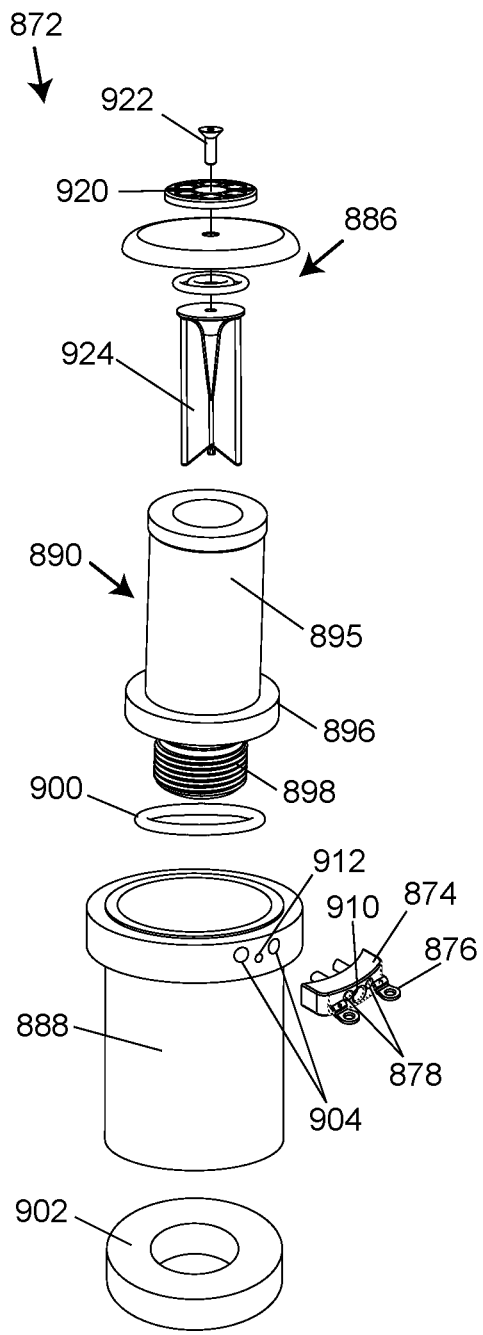
FIG. 52 shows an exploded view of an electromagnet.

Also shown in FIG. 47 are three magnets and cap assemblies 872 installed in the actuator. Magnet and cap assemblies 872 are shown connected to circuit board 848 in FIG. 50 and isolated in FIG. 51. The upper part of each magnet is of a larger diameter than the rest of the magnet and this creates a lip that sits on the shelf or ledge created by groove 846 around the top of each of the large holes 844 in the magnet mount. As shown in FIG. 51, each magnet has a plastic molded extension 874 attached along the side at the top of the magnet. Extension 874 attaches to the side of the magnet housing by a screw 908 which passes through a hole 910 along the front of extension 874 and into a hole 912 on the side of the magnet housing, as shown in FIGS. 51 and 52. Each extension, in turn, has electrical contacts 876 embedded in the plastic, and holes 878 extend through the plastic so that the two ends of the magnet coil can extend out and connect to the electrical contacts 876. The electrical contacts are then attached to the circuit board by screws 880, as shown in FIG. 50. Cavities 882, as well as cavity 856, carved down into the top surface of the magnet mount provide clearance for the ends of the screws to extend beyond the bottom of the printed circuit board without touching the magnet mount. As mentioned earlier, electrical traces or power planes connect each screw to a pin on the D-sub connector and supply power to the magnets.

Figure 53:
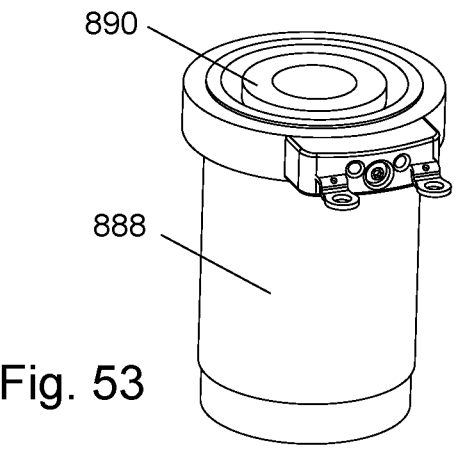
FIG. 53 shows an electromagnet.
Figure 54:
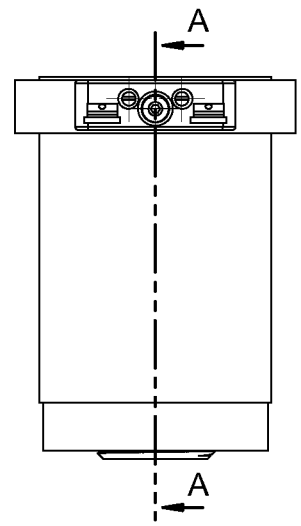
FIG. 54 also shows an electromagnet.
Figure 55:
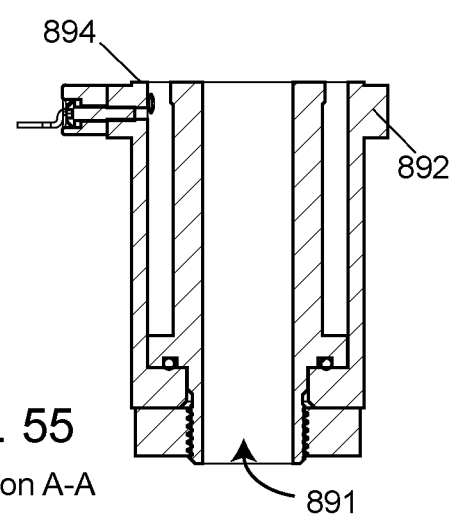
FIG. 55 shows a cross-sectional view of the electromagnet of FIG. 54.

FIG. 52 shows an exploded view of magnet and cap assembly 872. The magnet includes an outer cylindrical housing 888 and an inner cylindrical insert 890. The housing and inserts are shown together in FIGS. 53-55 and shown in cross-section in FIG. 55. Outer housing 888 is in the shape of a cylinder enclosed at the bottom except for a hole 891 in the bottom center. Near the top a section 892 of the cylinder has a larger outer diameter than the rest of the cylinder while maintaining the same inner diameter so that there is a shelf created around the top of the housing which is used to mount the magnet, as explained. Section 892 is positioned slightly below the top of the housing so that the top surface 894 of the housing is of the same radial thickness as the housing below section 892. Top surface 894 forms the magnetic pole to which the magnet cap is attracted. Keeping the radial thickness of top surface 894 the same as the housing below section 892 helps minimize the time for the magnetic field at the top surface to decay, thereby releasing the cap as quickly as possible, as explained previously.

Insert 890 is shaped like a cylinder 895 with a shoulder 896 toward the bottom. Shoulder 896 includes a groove on the underside in which an o-ring 900 is installed. A threaded section 898 extends below shoulder 896. The insert 890 is inserted into the housing 888 and then a nut 902 shaped like a threaded ring is screwed on the threaded end to hold the assembly together. A coil of wire is wound around insert 890 and housed in the gap between insert 890 and housing 888. Two holes 904 on the side of housing 888 extend through section 892 to allow each end of the coil to exit the housing. The wires pass through holds 878 in plastic molded extension 874 and connect to electrical contacts 876, as explained.

FIGS. 56 through 60 show an alternative embodiment for a magnet. In the alternative embodiment insert 890 is replaced by the insert 914 and housing 888 is replaced by housing 916. Insert 914 is similar to insert 890 except that it is not threaded at the bottom. As shown in the cross-sectional view in FIG. 59, the hole 891 at the bottom of housing 916 flares outward toward the bottom of the housing. Insert 914 is inserted into housing 916 and, once in place, a tool is used to flare the end 918 of the insert so that it matches the flare around hole 891 in the housing, as shown in FIGS. 57, 59 and 60.

FIGS. 52 and 61 show a cap 886 similar to the cap discussed earlier except cap 886 includes a contact disk 920. Contact disk 920 is shown isolated in FIG. 62. A screw 922 passes through a hole in the center of the contact disk to connect it to the top of the cap and to connect the cap to guide 924. The contact disk provides a raised surface to impact the bottom of the piston head when the actuator fires. By striking the piston head, the contact disk imparts energy to the piston to start the piston moving as quickly as possible. Additionally, transferring energy from the cap to the piston head slows the cap down so that when the cap reaches the limit of its travel by contacting fingers 102, as described earlier, the force of the contact between the cap and the fingers is lessened and the likelihood of bending the fingers or damaging the cap is decreased. Contact disk 920 is made of a hard plastic or some other hard material, although the material is softer than the piston head to prevent damage to the piston head. Holes are punched through the contact disk to minimize its mass so that the cap can accelerate as quickly as possible. In the depicted embodiment, the cap is approximately $\frac{1}{8}^{th}$ of an inch thick (~3 m) steel to provide material for the magnetic field, and the mass of the cap is approximately 23 grams. With fins, the cap is approximately 25 grams.

With the magnets installed, another metal block or plate called a cap retainer 934 is placed flat against the magnets and sits on the magnets, as shown in FIG. 63, to hold the magnets down and stop the caps. Cap retainer 934 has similar dimensions to base 802 but is thinner. Cap retainer 934 has four holes 936, one at each corner, which align with holes 842 in the magnet mount and a hole 938 in the center that aligns with hole 828 in the magnet mount. Nine socket head cap screws 940 attach the cap retainer to the magnet mount. Screws 940 pass through holes 942 in the cap retainer, shown in FIG. 64, and each hole 942 has a section of smaller diameter to catch the head of the screw. The screws then pass through corresponding holes in the foam and in the circuit board and then thread into threaded holes 948 in the magnet mount. As shown in FIG. 65, the underside of cap retainer 934 has cutouts 950 for the magnet assemblies 872 and cutouts 952 for the adjustable plungers so that the bottom surface of the cap retainer can lie flat against the magnets. Cutouts 952 are shaped around the adjustable plungers to capture the adjustable plungers and hold them in place and keep them from rotating when the screws are adjusted. Two small holes 954 in the cap retainer allow the heads of the set screws to protrude slightly above the top surface of the cap retainer, as shown in FIG. 63, so that the piston head can contact the plungers. The cap retainer has three large holes 956, one over each magnet, with six fingers 958 around the circumference of each hole. The ends of the fingers curl and extend over the outer edge of each magnet to stop the cap, as described above with fingers 102. A very small hole 960 is drilled into the cap retainer and extends down from the top surface but does not go down to the bottom surface. Instead, it meets the path of another hole 962 drilled horizontally in the side of the cap retainer in which is installed a breather vent 964, as shown in FIG. 63. The purpose of the breather vent is described below.

Figure 66:
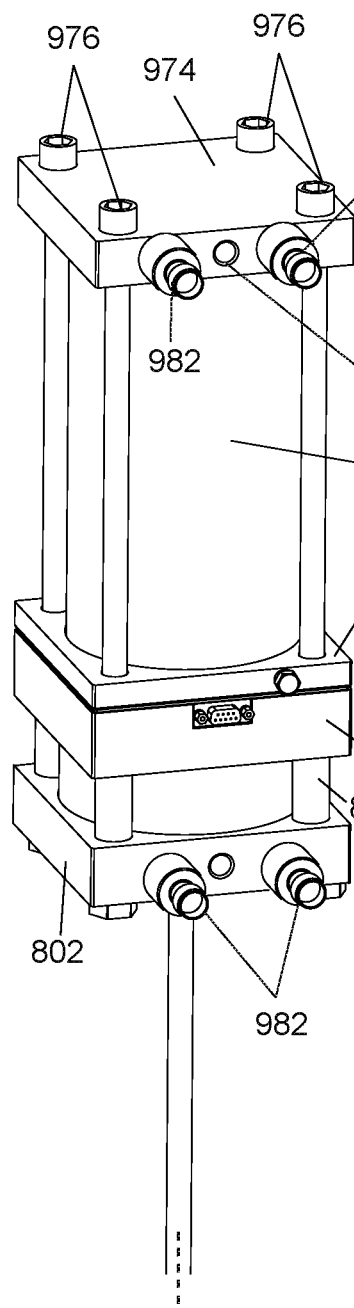
FIG. 66 shows an actuator and piston.

There is a circular groove 968 on the top surface of the cap retainer and an o-ring 970 fits in the bottom of the groove. One end of a large cylinder 972 also fits into the groove 968, as shown in FIG. 66, and on top of o-ring 970 to create an airtight seal with the cylinder.

A top metal plate 974 of similar dimension to the base only thinner and with a similar groove and O-ring fits over the top of the large cylinder. Four long bolts 976 secure the large cylinder and the rest of the assembly together. Each bolt 976 passes through a hole, one located in each corner of top plate 974, and then through holes 936 in the cap retainer, then through corresponding holes in the foam and circuit board and into holes 842 in the magnet mount. Holes 842 in the magnet mount also receive the ends of bolts 838 coming up from the base. Threaded ends of bolts 838 are hollow with additional threads on the inner surface, as shown in FIG. 41, so that the threaded ends of long bolts 976 thread into the threaded holes 978 in bolts 838. Top plate 974 also has three holes along the front side, a center hole 980 and two holes on either side of the center hole, similar to the three holes on the front side of the base. Each of the three holes is connected to holes that are drilled vertically from in the underside of the top plate thus creating three separate conduits into the area enclosed by large cylinder 972. The center hole 805 along the front side of the base and the center hole 980 along the front side of the top plate are used for connecting a hose from a high pressure fluid source. Hole 805 in the base empties into air chamber 836 and is used to fill air chamber 836 with high pressure air or fluid. Likewise, hole 980 in the top plate empties into the area in the large cylinder above the piston head and may be used to release or fill, or release at one time and fill at another, this area with air or fluid to help, for example, decelerate the piston by creating an adjustable air dampener. The two holes 806 along the front side of the base and the two holes along the front side of the top plate on either side of the center hole are used to allow a set of pressure sensors 982 to measure the pressure in air chamber 836 and in the large cylinder above the piston head. Only one pressure sensor is needed for each area but a second one is added for redundancy. Information from the pressure sensors is sent to a controller. Breather vent 964, which was mentioned earlier, is also used to help decelerate the piston smoothly by allowing air to escape from underneath the piston after the actuator has fired. The hole 960 in the cap retainer is small enough that it will provide virtually no leak at all when the high pressure air is released because the air cannot escape very quickly. But after the initial release, some air may gradually escape through the breather vent to allow the piston to return to its original or ready position.

Figure 67:
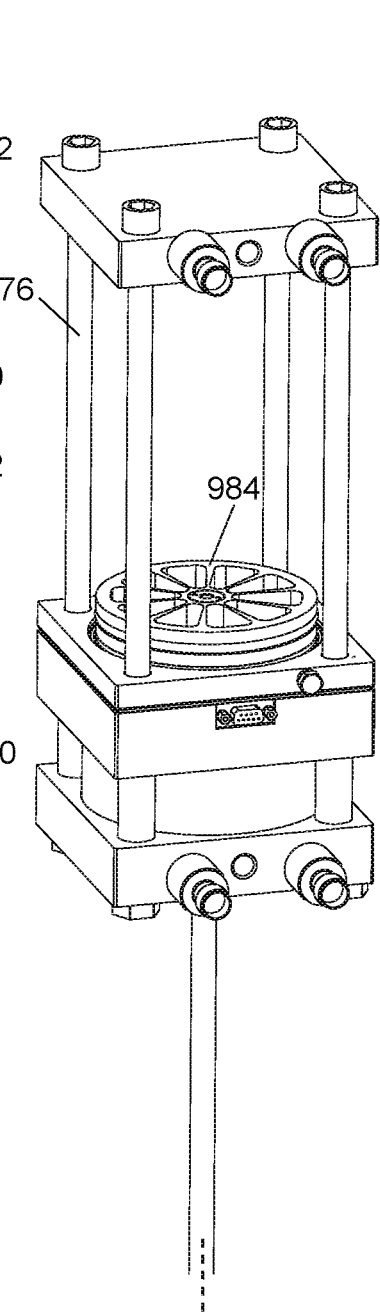
FIG. 67 shows an actuator and piston head.
Figure 68:
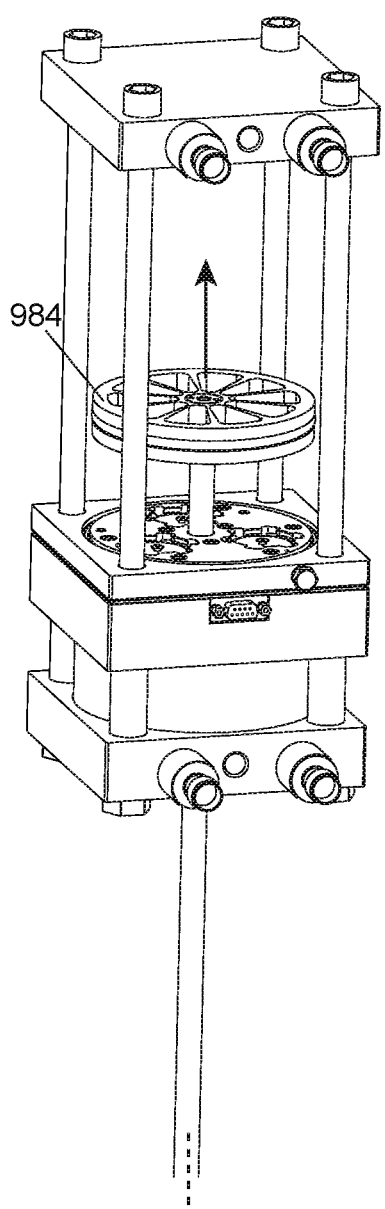
FIG. 68 also shows an actuator and piston head.
Figure 69:
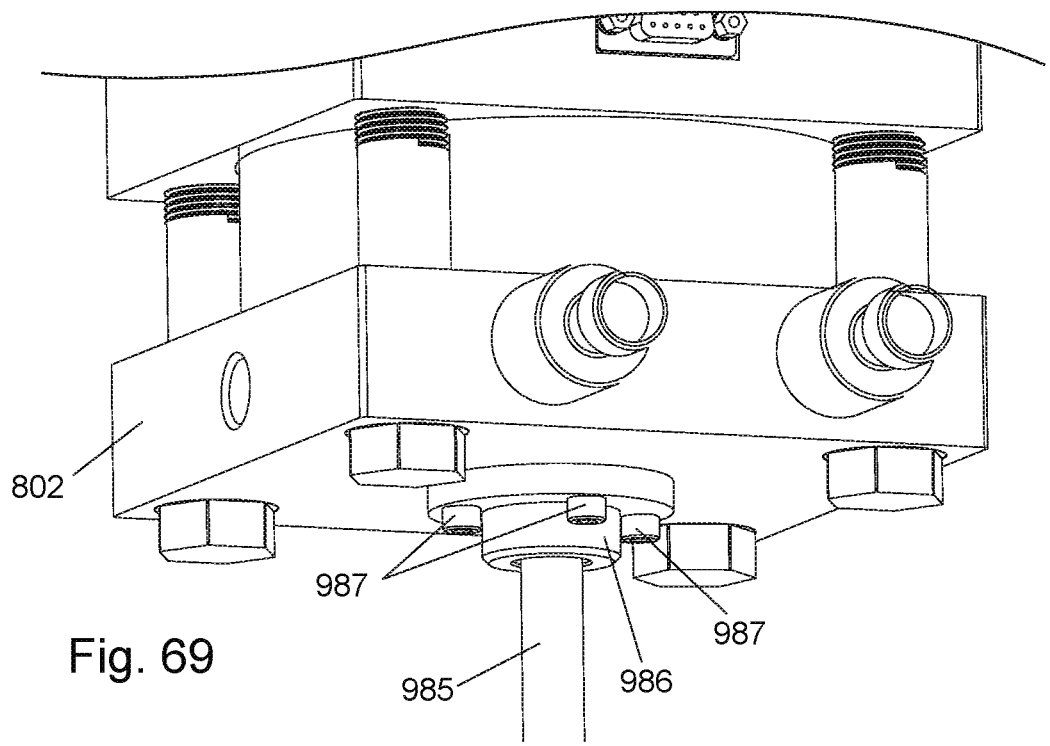
FIG. 69 shows an actuator and piston shaft.
Figure 70:
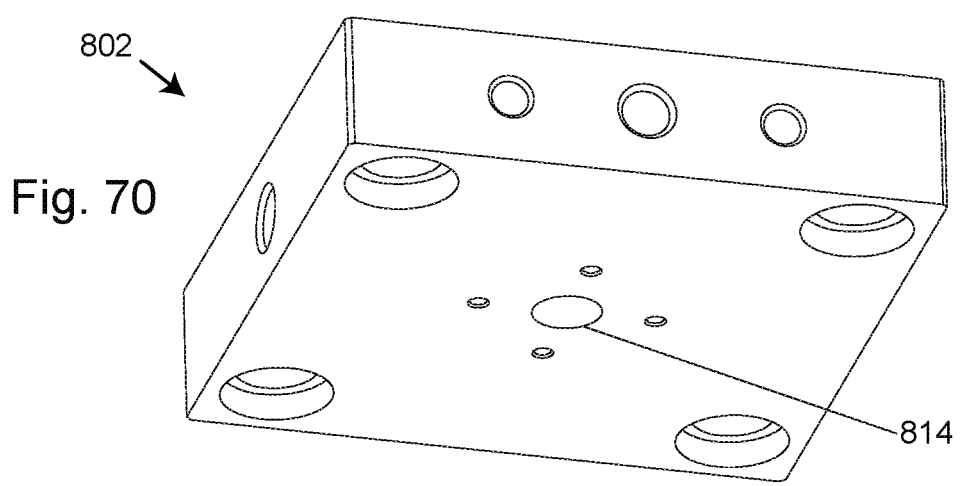
FIG. 70 shows the base of an actuator.
Figure 71:
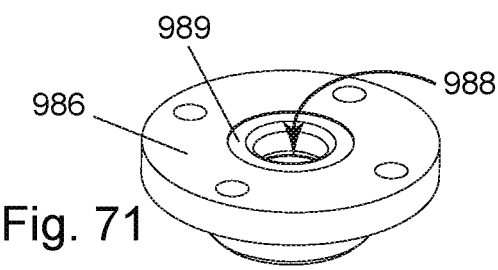
FIG. 71 shows a fitting.
Figure 72:
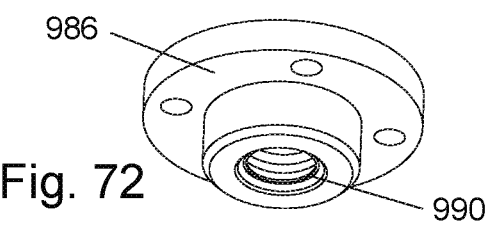
FIG. 72 also shows a fitting.

A piston 984 is shown in FIGS. 67 and 68. The shaft 985 of the piston passes through center holes in the cap retainer, the foam layer, the circuit board, the magnet mount (which is lined with an o-ring), the middle of small cylinder 824, and finally through center hole 814 in the base (which is also lined with an o-ring). As shown in FIGS. 69 through 71, piston shaft 985 then passes through a hole 988 in a fitting 986 that is attached to the bottom of base 802 by four screws 987. Fitting 986 encases a 989 which is flush with the top surface of the fitting, as shown in FIG. 71. The bushing fits around the piston shaft to reduce friction as the piston moves. (A bushing may also be used in hole 938 in the cap retainer.) Towards the bottom of fitting 986, a wiper 990 made of an elastomeric material is installed within the fitting and around the shaft of the piston, as shown in FIG. 72. The wiper extends towards the shaft at an angle to help keep dust out of the actuator by rubbing against the piston shaft as the shaft moves up and down.

Figure 73:
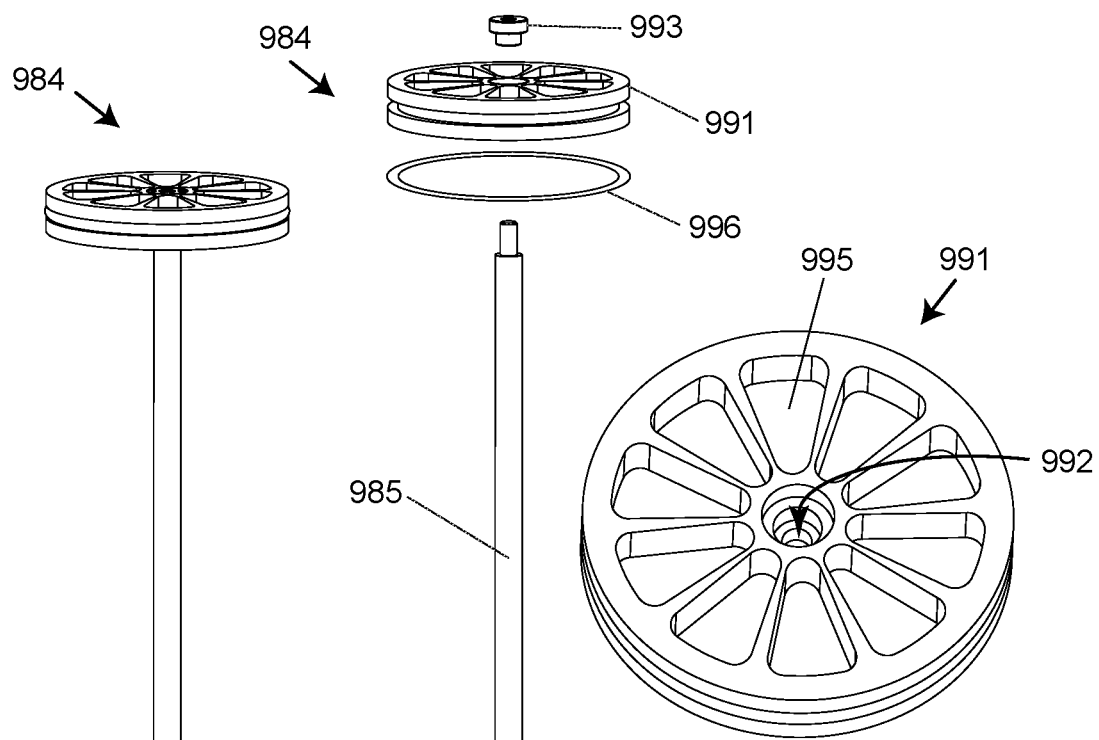
FIG. 73 shows a piston.
Figure 74:
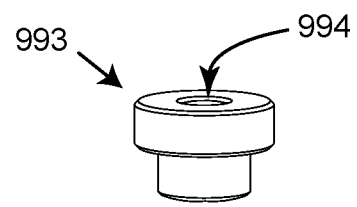
FIG. 74 shows, an exploded view of the piston of FIG. 73.

FIG. 73 shows piston 984 isolated and FIG. 74 shows an exploded view of the piston. Piston 984 consists of a shaft 985 which is attached to a piston head 991. Shaft 985 has a short section of smaller diameter at the end near the piston head which is threaded. Piston head 991 has the shape of a circular disk, as shown in FIG. 75, with a hole 992 in the center. Hole 992 has an upper section of a larger diameter, a middle section of a smaller diameter and a lower section of an even smaller diameter. A knob 993, shown in FIGS. 74 and 76, consists of an upper circular portion on top of a lower cylinder that is of a smaller diameter. A threaded hole 994 passes through both sections. Knob 993 fits into hole 992 in the center of the piston head such that the bottom surface of the upper portion of the knob rests on the surface at the bottom of the upper section of hole 992. The bottom of knob 993 rests upon the surface at the bottom of the middle section of hole 992. Shaft 985 passes through the bottom section of hole 992 and threads into hole 994 of knob 993 to hold the piston assembly together. As shown in FIG. 75, piston head 991 has generally triangular sections 995 cut out of the top surface to decrease the overall weight of the piston head without compromising structural support. An o-ring 996 fits into a groove around the outside edge of the piston.

Figure 77:
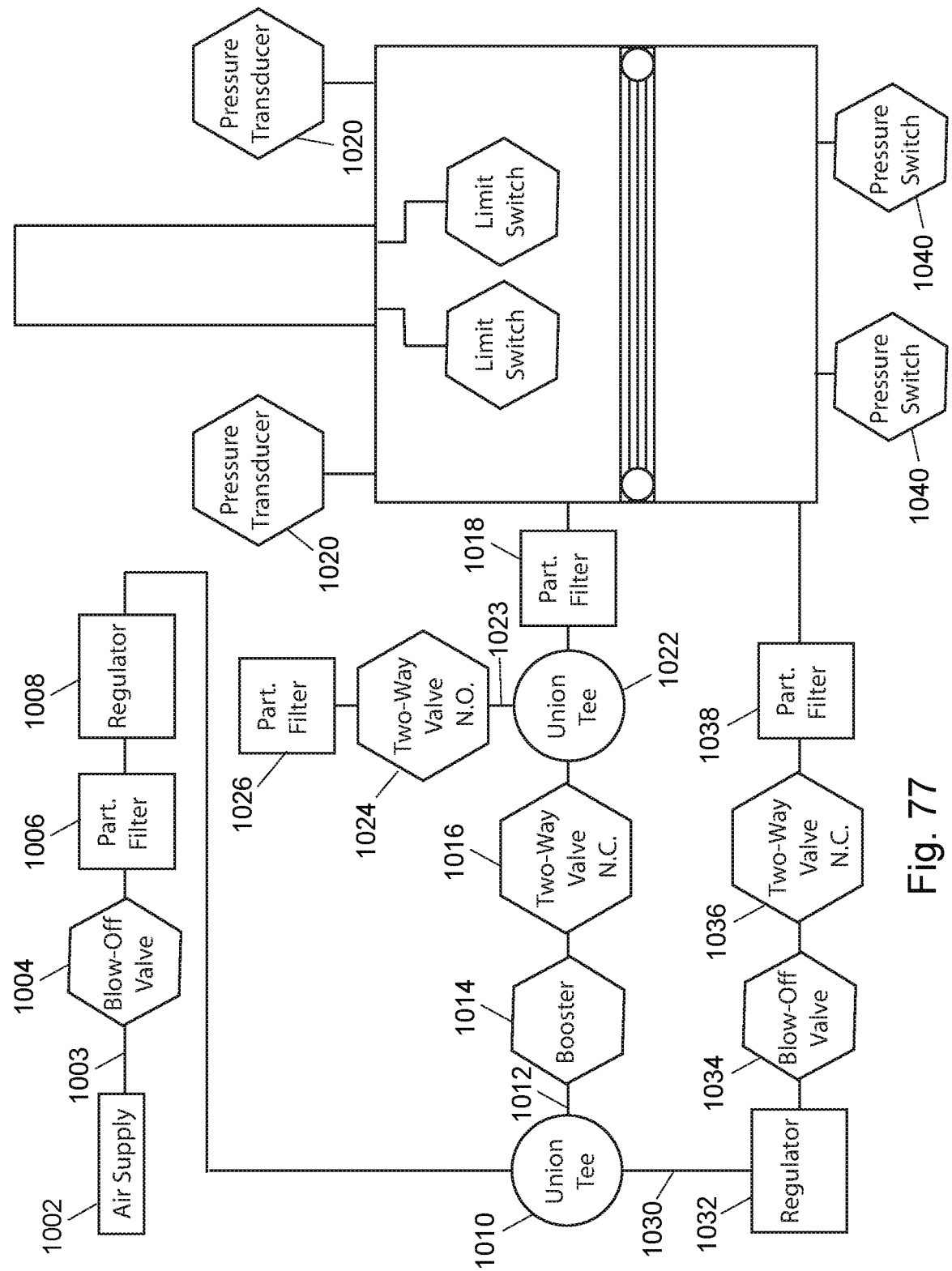
FIG. 77 shows a system to provide pressurized air to a reservoir in an actuator.

FIG. 77 shows a schematic drawing of a system to provide pressurized air to a reservoir in an actuator. An air supply is identified at 1002, and air from that supply passes through line 1003 to a blow-off valve 1004, which may be set to operate at a preselected pressure, such as 150 pounds per square inch (psi) or 1 megapascal (MPa). The air then passes through a particle filter 1006 to a pressure regulator 1008, and then to a three-way joint or tee 1010 in the line. Branch 1012 from the tee channels air to a pressure booster 1014 which boosts the pressure to the desired level, which for the actuator embodiments described herein will be around 300 psi (2 MPa), or more generally, 200 to 400 psi (1.4 to 2.8 MPa). A two-way valve 1016, which is normally closed, is downstream from the booster and that valve opens to supply pressurized air to the actuator through a particle filter 1018. Valve 1016 may be opened and closed by a control system that receives a signal from one or more pressure sensors, such as pressure transducers 1020, that measure the pressure within the actuator's reservoir.

A tee 1022 is positioned between valve 1016 and filter 1018 and branch 1023 from the tee leads to a two-way valve 1024 that is normally open and from there to a particle filter 1026 and then to atmosphere. This branch provides a path for pressurized air to exit the actuator, or in other words, provides a path to bleed-off air from the reservoir. Valve 1024 can be controlled by any appropriate control system.

A branch 1030 from tee 1010, which is upstream from booster 1014, provides air to a regulator 1032 and from there to a blow-off valve 1034, which may be set to operate at a preselected pressure, such as 100 psi (0.7 MPa). The air then passes through a two-way valve 1036 which is normally closed, and from there through a particle filter 1038 to the piston cylinder in the actuator. The air passing through valve 1036 is supplied to the cylinder on the side of the piston opposite the reservoir of pressurized gas or air. By providing air to this side of the piston head, the piston can be reset, as described previously. Valve 1036 can be controlled by any appropriate control system, and such a control system may include pressure switches, such as switches 1040.

As alternatives to the system described above in which booster 1014 provides pressurized air to the actuator, either a compressor or a cylinder or container of compressed air (or some other appropriate gas) can supply pressurized air directly to valve 1016 and also to regulator 1032. The components of the system downstream from valve 1016 and regulator 1032 would remain the same in the alternative embodiments. In embodiments using a compressor or cylinder of compressed air, a dryer can be inserted into the system between the compressor or cylinder and valve 1016 and regulator 1032 to dry the air, and other components such as blow-off valves can be used as needed.

An embodiment with a piston head having an area of 16 in$^2$ (0.01 m$^2$), and using pressurized air at 300 to 350 pounds per square inch (~2 MPa), results in 4,800 to 5,600 pounds of initial force (~21,000 to 25,000 N). Such an embodiment, therefore, will accelerate a 20 kg mass at roughly 1,000 m/s$^2$, which is on the order of 100 Gs. It is believed that with a force applied within 0 to 3 milliseconds, accelerations of 20 to 500 Gs are possible and effective.

As explained previously, actuators as described herein can be cycled repeatedly, and that, in turn, allows a retraction mechanism in a machine such as a table saw to be cycled for self-testing or for other reasons. It is conceivable that a mechanical structure such as a retraction mechanism could jam or freeze or become blocked. Accordingly, to ensure the retraction mechanism is operable (i.e., free to move), and/or to ensure the actuator is working, the actuator and retraction mechanism can be cycled after a predetermined period of time or before or after specific operations. Tests involving cycling of an actuator and/or a retraction mechanism may be performed, for example, upon power up and upon power down of a machine, before or after specific operations, or whenever a user wants to ensure that the actuator and/or any associated retraction mechanism is not frozen or jammed. A switch or other user input device may be provided to allow a user to volitionally cycle the actuator and/or retraction mechanism. A cycle of a retraction mechanism in a table saw may be considered as retracting the blade below the table and then moving the blade back up above the table, simply retracting the blade downwardly, or simply moving the blade or some part of the retraction mechanism a small distance to make sure the retraction mechanism is not jammed or frozen.

Figure 78:
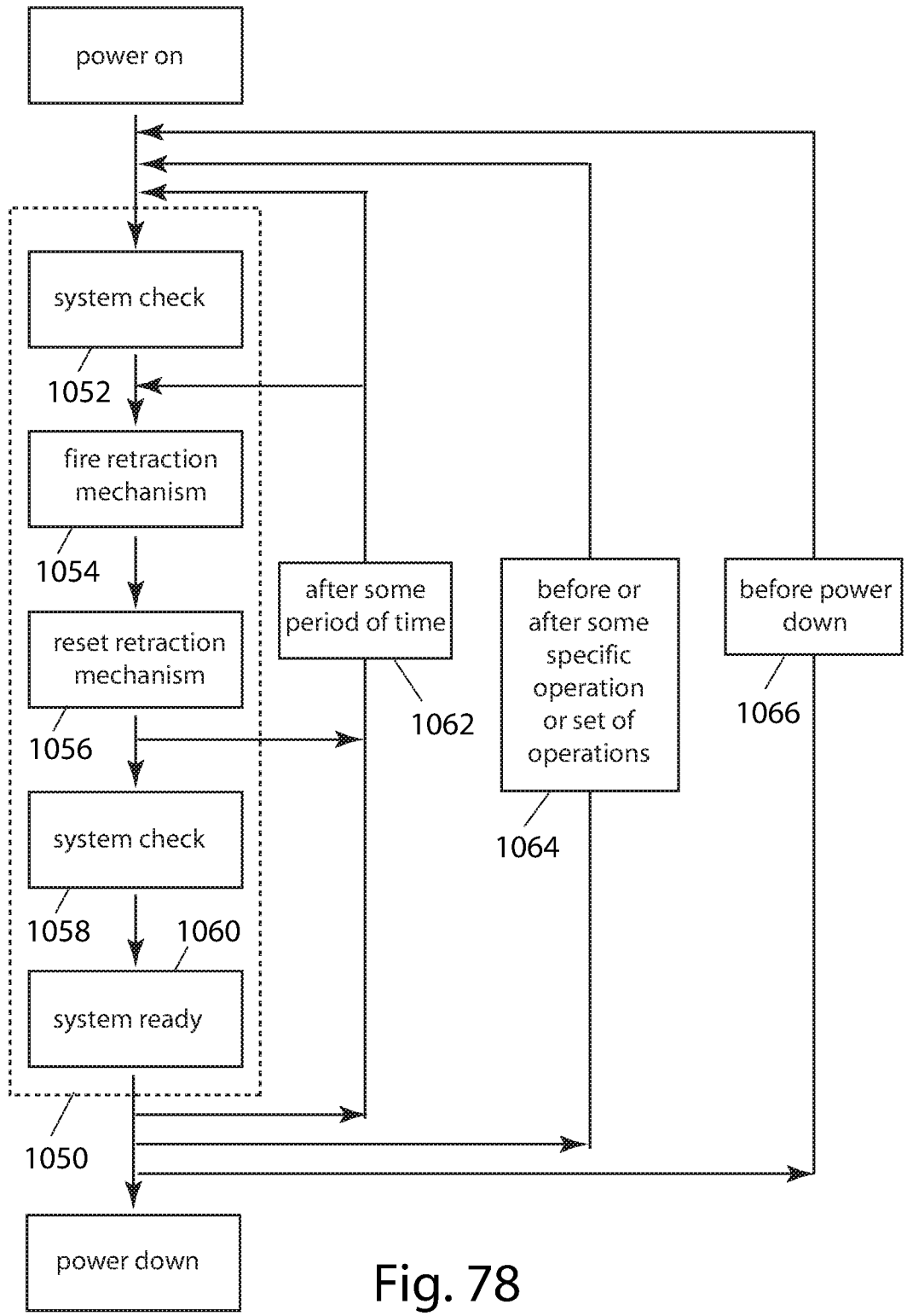
FIG. 78 shows a flowchart illustrating various paths of cycling a retraction mechanism in a woodworking machine.

FIG. 78 shows a flowchart illustrating various paths of cycling a retraction mechanism in a woodworking machine. Block 1050 represents one or more operations that may be performed in a cycle. The specific blocks within block 1050 form an example set of operations that may compose a cycle. Block 1052 represents various functions that may be performed to check the system such as gathering measurements of pressure levels, piston location, blade presence, and so on. Block 1054 represents triggering the actuator and retraction mechanism. Block 1056 represents re-setting the actuator and restoring the retraction mechanism to its normal operating position. Block 1058 represents another system check wherein the readiness of the safety system to retract the blade again is confirmed. Block 1060 represents a system ready state that the system would stay in under normal operating conditions, where the safety system, including the actuator, is ready to fire the moment a safety hazard is detected. Blocks 1062, 1064 and 1066 represent different conditions that may trigger a cycle to be preformed such as a period of time that the system may wait before cycling, a set of operations that might be performed before cycling or a command to power down that might trigger a cycling to occur. The cycling paths in FIG. 78 are only examples and the system is not limited to the possibilities shown.

Testing to see if the retraction mechanism is frozen or jammed could also be accomplished by moving at least a portion of the retraction mechanism by hand, by triggering a single use actuator that is replaceable (such as an explosive charge), by moving an elevation control wheel or handle that is or can be linked to the retraction mechanism, or by some other method. For example, a machine may include a control system with a sensor or switch to detect motion of the retraction mechanism or a part thereof. The control system may require that the sensor or switch detect motion of the retraction mechanism periodically or at predetermined times, and if not, then the control system could prevent the machine from operating or being turned on. A user could move the retraction method by hand or by turning a handwheel when required by the control system.

Whether the retraction mechanism is tested by cycling an actuator or by moving at least a part of the retraction mechanism by hand or in some other way, what is important is to make sure the retraction mechanism is functional and able to move to retract the blade in the event of an accident.

As discussed previously, one of the fundamental ideas of using an actuator and piston assembly as described herein in a safety system for table saws or other power tools is to move the blade away from the hand of a user faster than the hand can move into the blade. As stated, typically the speed at which a human can flinch to move a hand is around 2 meters per second, and even assuming a person's hand could move at a speed of 6 meters per second, an actuator and piston assembly as described herein can be constructed to move the blade away faster. For example, an actuator as described herein can apply at least 4,000 pounds of force within less than 600 microseconds and easily within 1 millisecond after the electromagnet in the actuator is triggered.

Figure 79:
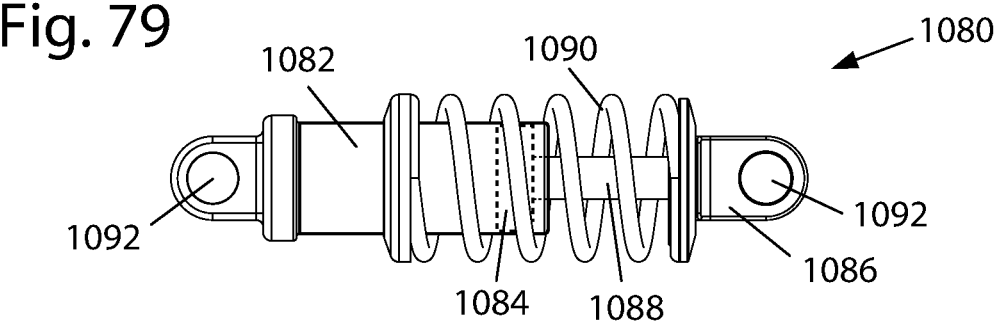
FIG. 79 shows an oil cylinder catch.

The force applied by the actuator will quickly accelerate the piston assembly and blade and cause the blade to retract, as explained. Once the blade is retracted, however, the blade's movement must be brought to a stop. The blade will develop significant energy as it is accelerated by the actuator, and that energy must be dissipated to stop the blade. As explained previously, a bumper can be used to stop the piston and absorb energy; however some bumpers, such as rubber bumpers, might cause or allow the blade to rebound or bounce back up. Another way of stopping the blade while avoiding rebound is to use a stopping mechanism such as a cylinder filled with oil or other fluid that operates like a damper or catch. FIG. 79 shows an oil cylinder catch 1080 composed of a cylinder 1082 filled with oil and a piston 1084 encased in the cylinder. A movable top 1086 is attached to one end of rod 1088 connected to piston 1084 and the top is biased away from the cylinder by a spring 1090. Spring 1090 functions to extend piston 1084 and rod 1088 after a retraction so that the catch is ready for a subsequent retraction; the spring is not strong enough to cause a rebound of the blade and supporting structure during a retraction. Mounting holes 1092, one located in the movable top and one at the other end of the cylinder, allow the device to be mounted in a machine, as shown symbolically in FIG. 80, where one end is mounted to the saw and the other to an impact block 1094.

As blade 400 retracts, structure supporting the blade strikes impact block 1094, forcing piston 1084 to move downward against the volume of oil in cylinder 1082. Orifices, which may be located on the piston or in an inner cylinder, allow the oil to move out of the region below the piston and are sized and positioned according to the desired deceleration. The oil slows the downward movement of piston 1084 and generates an upward force on impact block 1094 to decelerate the blade, as shown by the arrow labeled "F" in FIG. 80. In this manner, the cylinder and piston counteract the downward movement of the blade and inelastically absorb the energy associated with the blade's downward movement to stop the blade without rebound.

An advantage of an oil cylinder catch is that it can provide a generally constant or level deceleration as the piston moves down against the fluid; in other words, the force decelerating the blade does not vary substantially during deceleration as it would with a spring or other non constant force applicator. The force that the oil cylinder catch or other stopping mechanism needs to withstand depends on the mass, velocity and deceleration of the blade and associated support structure, such as an arbor support. By way of example, an oil cylinder catch as depicted may provide a level 4,500 pounds of force (~20,000 Newtons) over a piston movement of around 1 to 6 inches to decelerate a 20 kg mass moving at a velocity on the order of 10 m/s. An oil cylinder catch provides a compact solution that can withstand a large force of impact and that reduces or eliminates rebound. Additionally, an oil cylinder catch could decelerate the blade arbor support over a longer distance than a rubber stop, thereby reducing the stress on the structure supporting the blade. This is important because stopping a relatively heavy, fast moving blade and support structure over a relatively short distance could damage bearings and/or bend shafts or other parts used in the support structure. Additionally, providing a substantially constant or level deceleration allows for the maximum acceptable deceleration force (i.e., the maximum force that will not damage machine components such as bearings and shafts) to be applied over the longest time possible. Of course, although a generally constant or level deceleration has advantages, it is not required and a piston and cylinder can be designed to provide an increasing or decreasing force.

Figure 80:
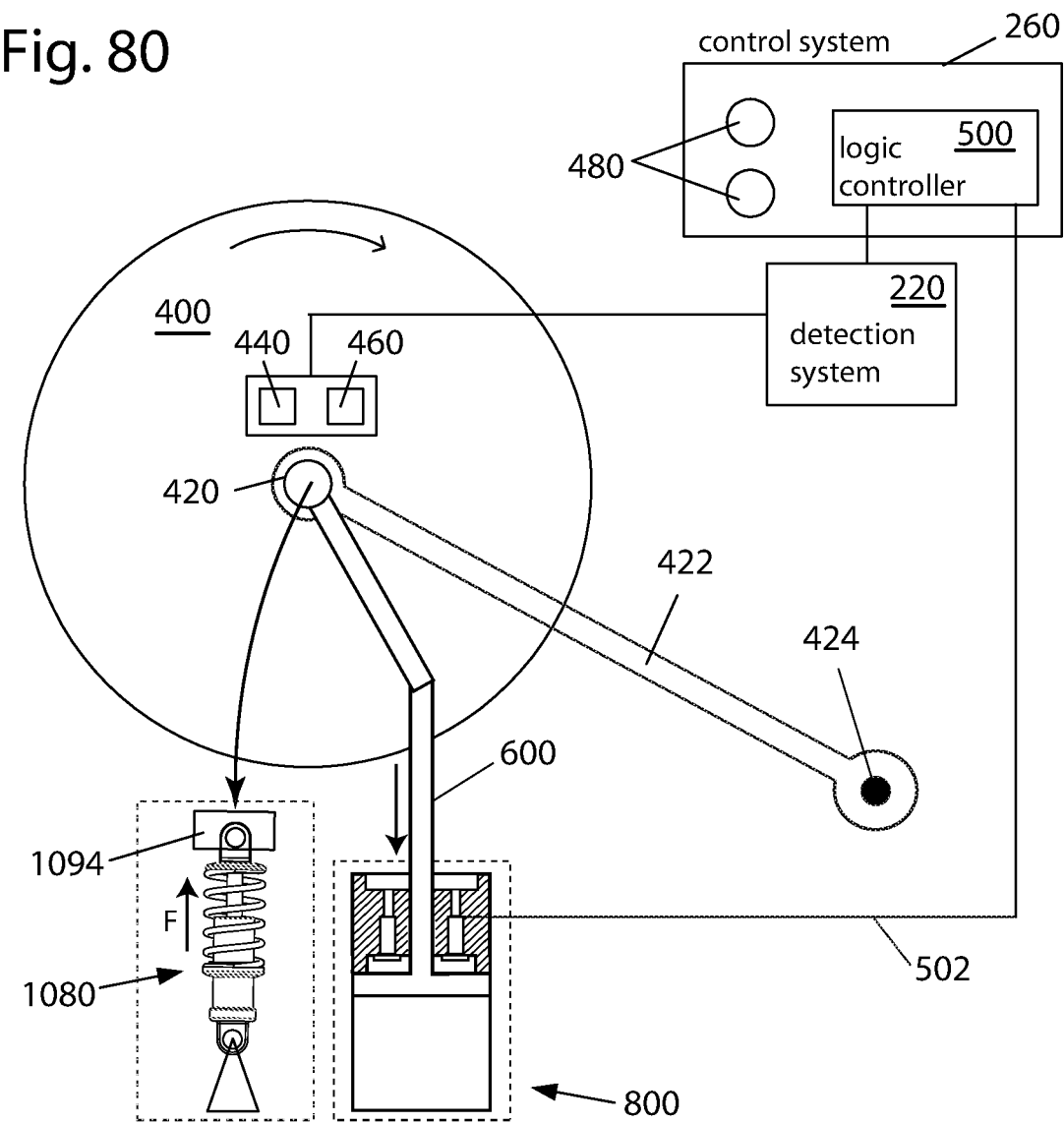
FIG. 80 shows an oil cylinder catch positioned adjacent a blade.

FIG. 80 shows the oil cylinder catch oriented vertically but it may have various orientations and linkages. FIG. 80 also shows the oil cylinder catch used with an actuator that pulls blade 400 down, but the oil cylinder catch can be used equally effectively with an actuator that pushes or otherwise moves the blade.

Figure 81:
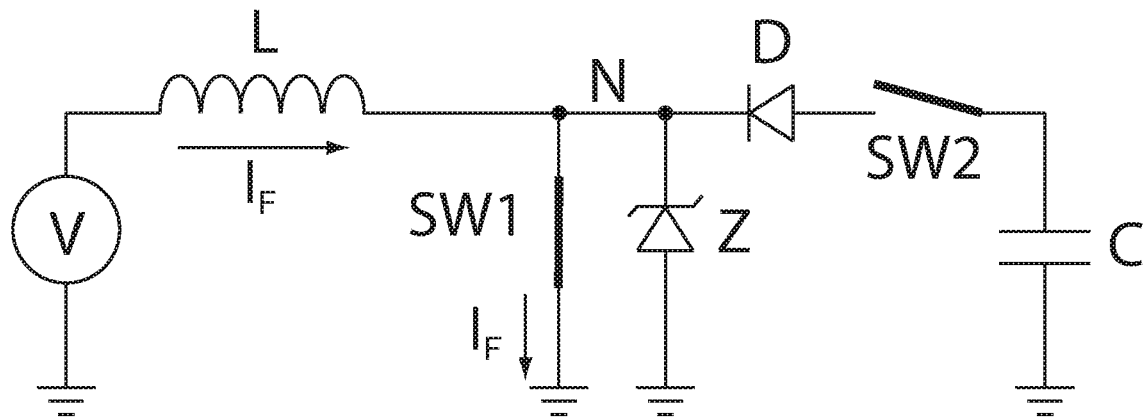
FIG. 81 shows a schematic circuit.
Figure 82:
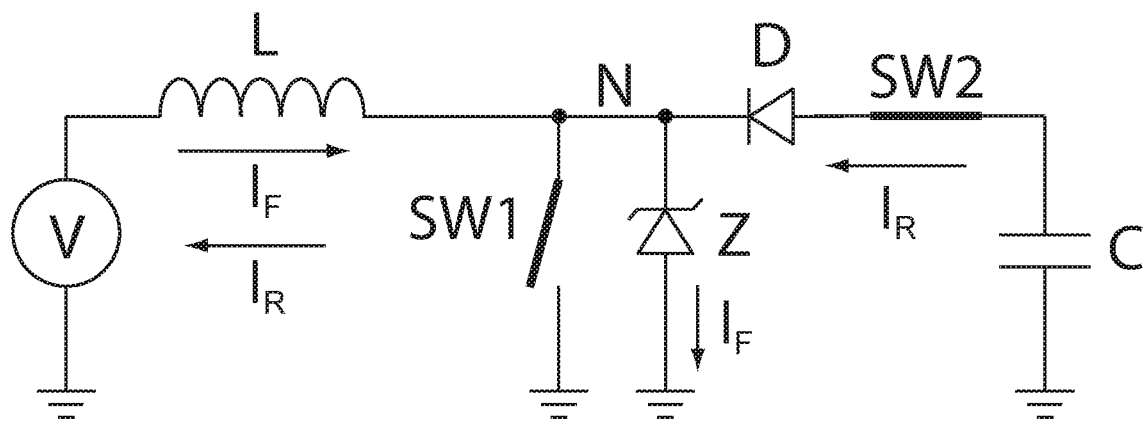
FIG. 82 shows the schematic circuit of FIG. 81 with a switch open.

FIGS. 81 and 82 show a circuit similar to the circuit discussed previously in connection with FIG. 23. The circuit shown in FIGS. 81 and 82 may be used to control the current through the coil of an electromagnet. In this circuit a voltage source V is connected to the coil L which is in turn connected to a switch labeled SW1 at the node labeled N. The other side of switch SW1 is connected to ground. A zener diode Z is connected between ground and node N with the cathode at node N. The cathode of a diode D is connected at node N and the anode of diode D is connected to the terminal of another switch SW2. The other terminal of switch SW2 is connected to a capacitor C the other side of which is connected to ground. To turn the electromagnet on, that is, to energize coil L, switch SW1 is closed while switch SW2 is left open so that the coil L is connected to the voltage source V at one end and to ground at the other end which establishes a current IF through the coil. Diode D prevents current from flowing towards the capacitor. Current passing through a coil creates a magnetic field about the coil and in metal within or surrounding the coil, thus turning the electromagnet on. To turn off the electromagnet, switch SW1 is opened, which causes a very high back emf voltage spike that is limited or clamped by the zener diode Z. The zener diode limits the voltage enough to protect the circuit from damage but still allows the voltage to be very high. There is a direct relationship between how fast the current changes and how high the voltage will spike. Theoretically, the voltage spike would be infinite if the circuit is broken instantaneously. Creating a high back emf voltage generates large eddy currents in the surrounding metal which will dissipate the energy in the magnetic field more quickly due to maximizing ohmic losses from eddy currents. After switch SW1 in opened, current passing through the coil flows into the cathode of the zener diode Z to ground. In addition to using a high back emf voltage to enable the magnet to turn off quickly, a reverse pulse is applied to the coil L by capacitor C which is charged to a high voltage no higher than the voltage limit set by the zener diode Z so that the current from the capacitor flows into the coil L and not into the zener diode Z. The reverse pulse works to collapse the magnetic field more quickly due to the larger eddy currents that will occur in the surrounding metal to try and oppose changes in the magnetic field. To apply the reverse pulse, switch SW2 is closed just after switch SW1 is opened, as shown in FIG. 82, and a reverse current IR flows through the coil L which helps to collapse the magnetic field as rapidly as possible.

Figure 83:
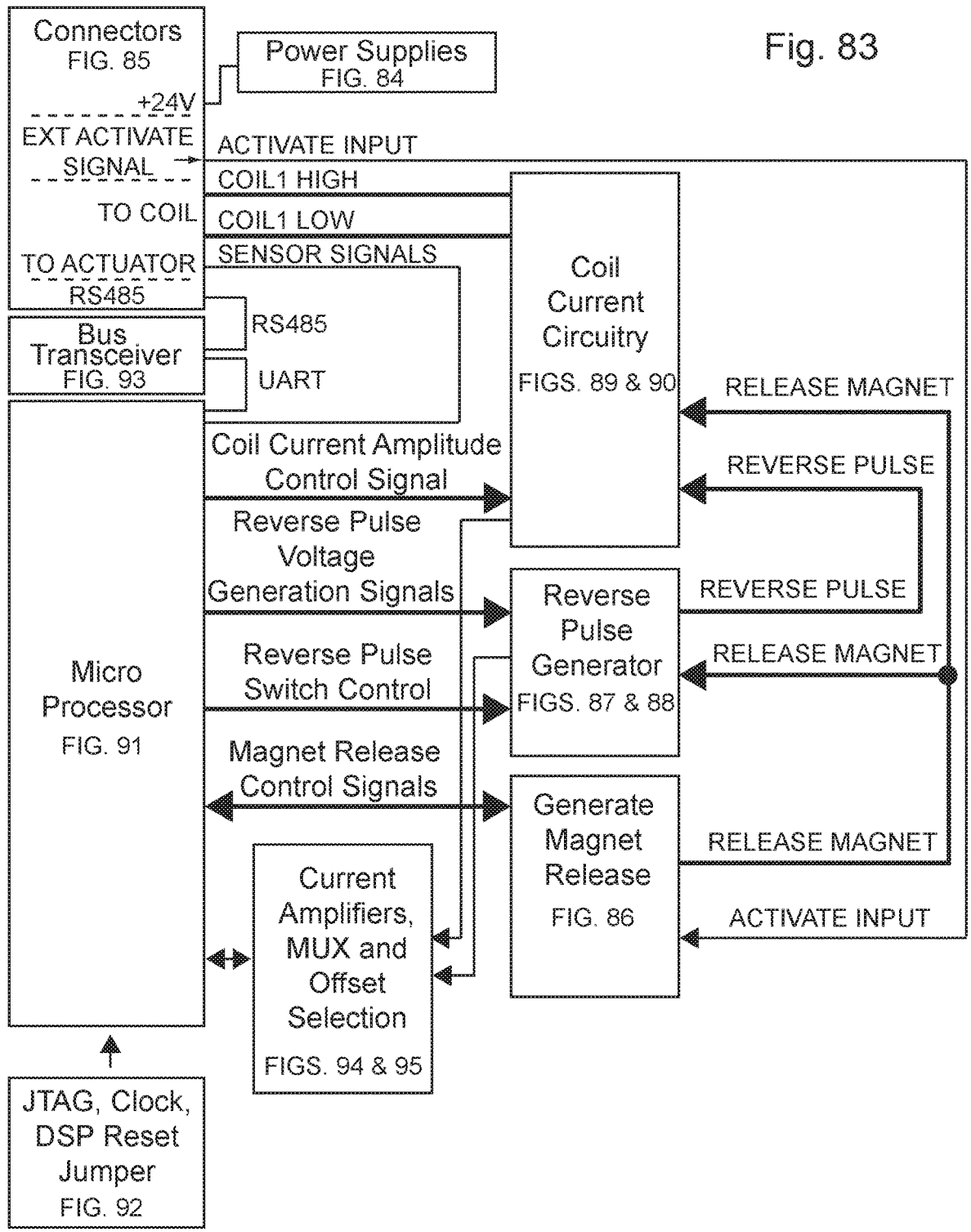
FIG. 83 shows a map illustrating how the circuitry shown in FIGS. 84-95 fits together.
Figure 84:
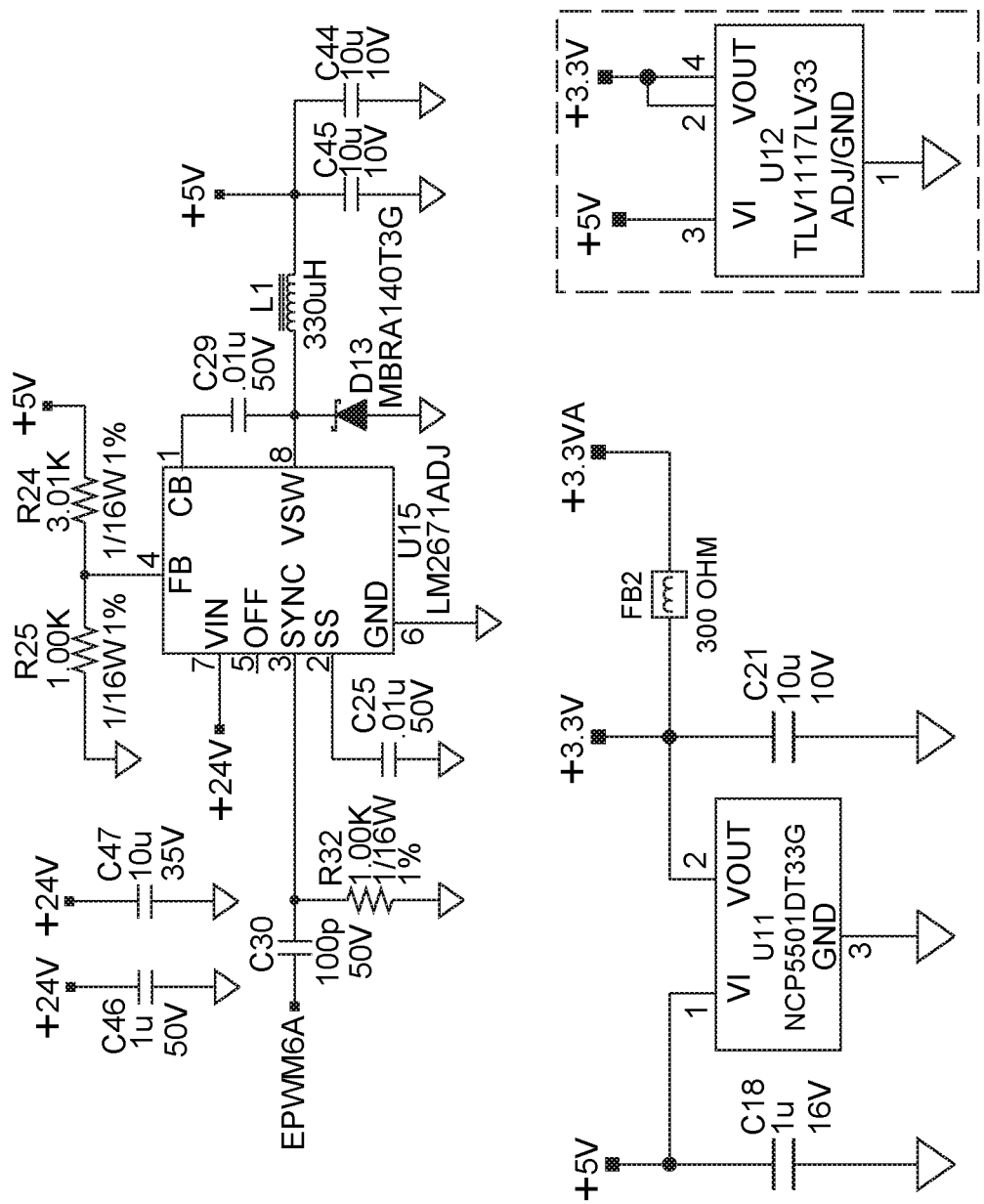
FIG. 84 shows part of a circuit for controlling an electromagnet.
Figure 85:
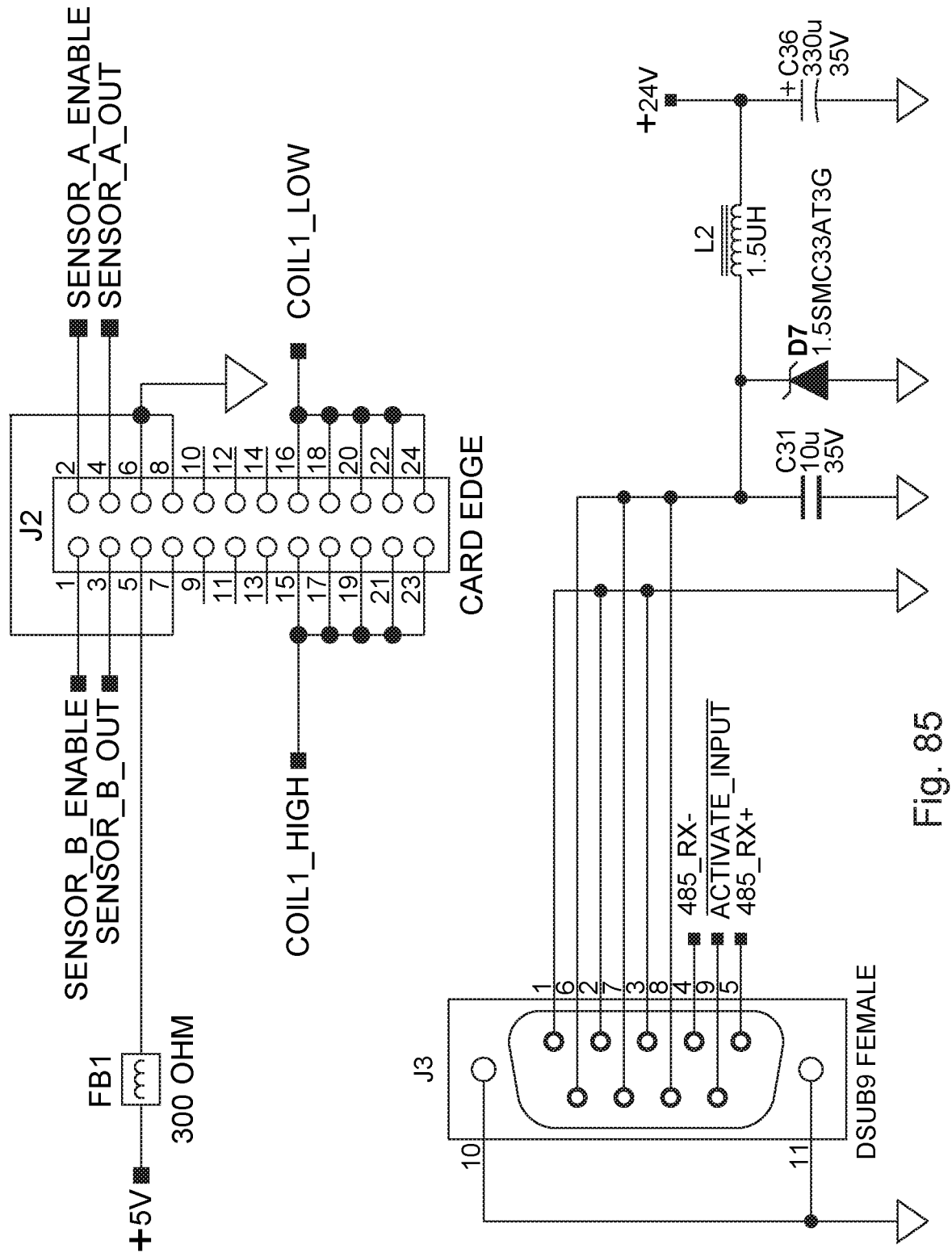
FIG. 85 shows another part of a circuit for controlling an electromagnet.
Figure 86:
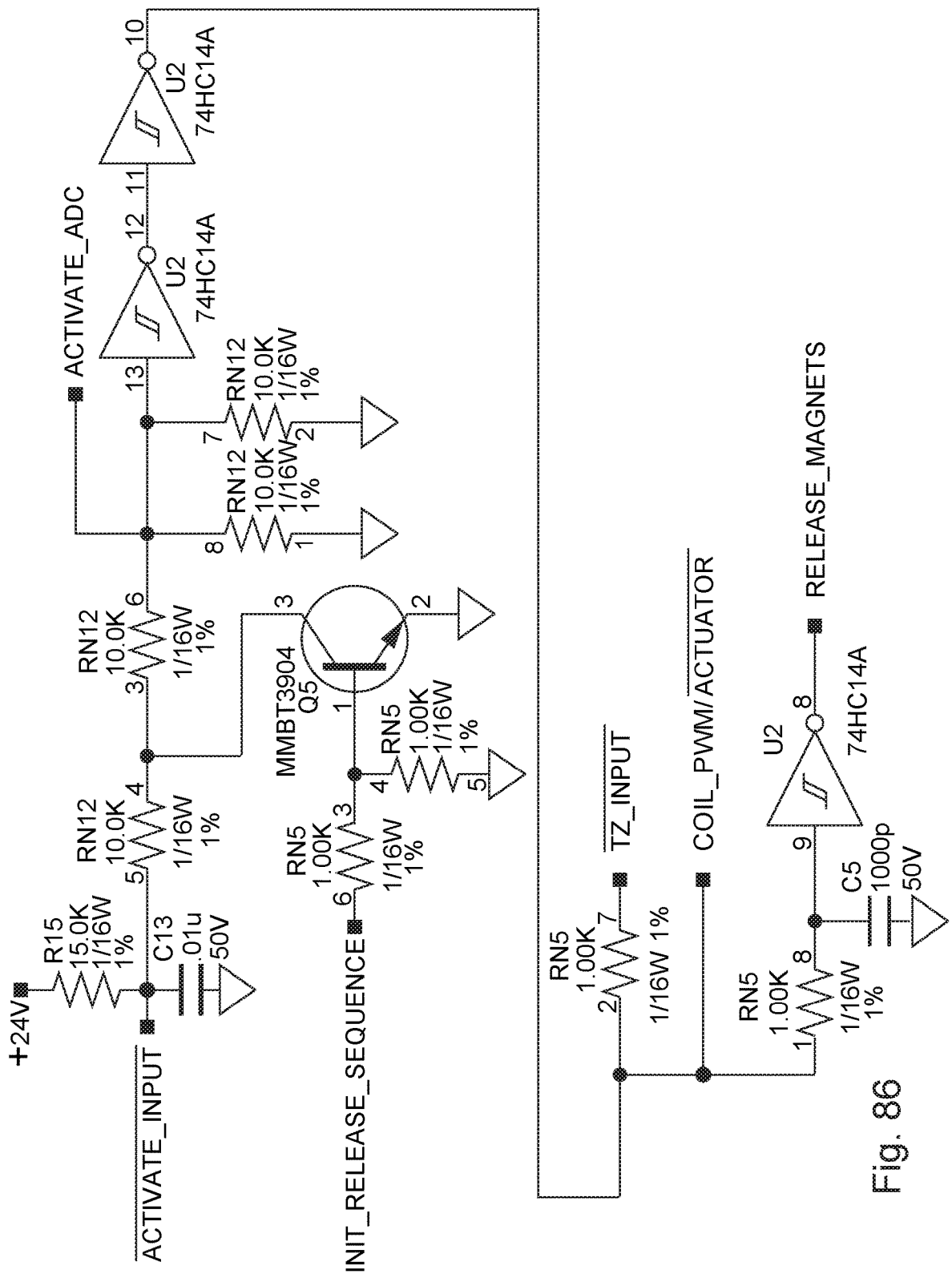
FIG. 86 shows still another part of a circuit for controlling an electromagnet.
Figure 87:
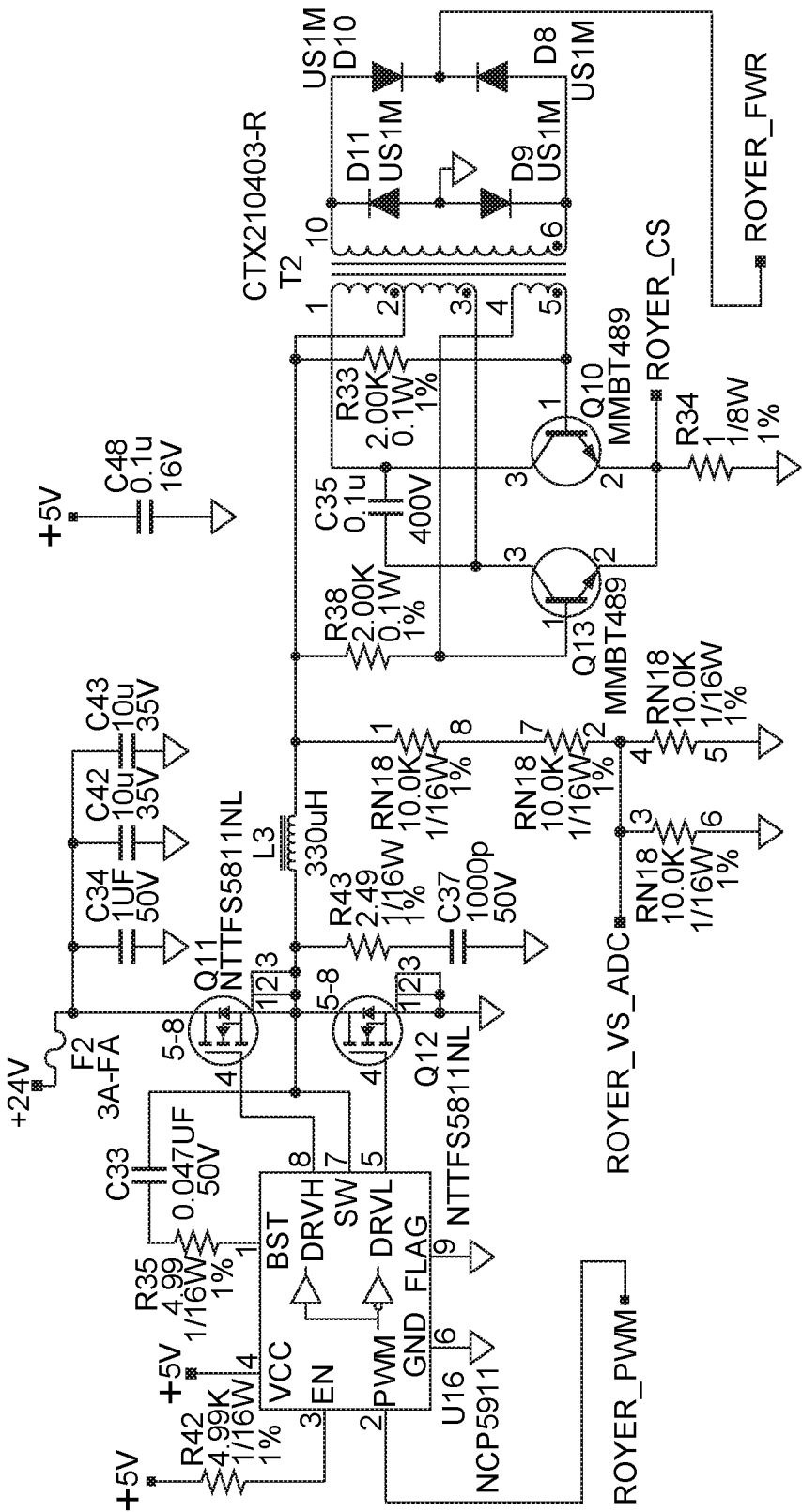
FIG. 87 shows yet another part of a circuit for controlling an electromagnet.
Figure 88:
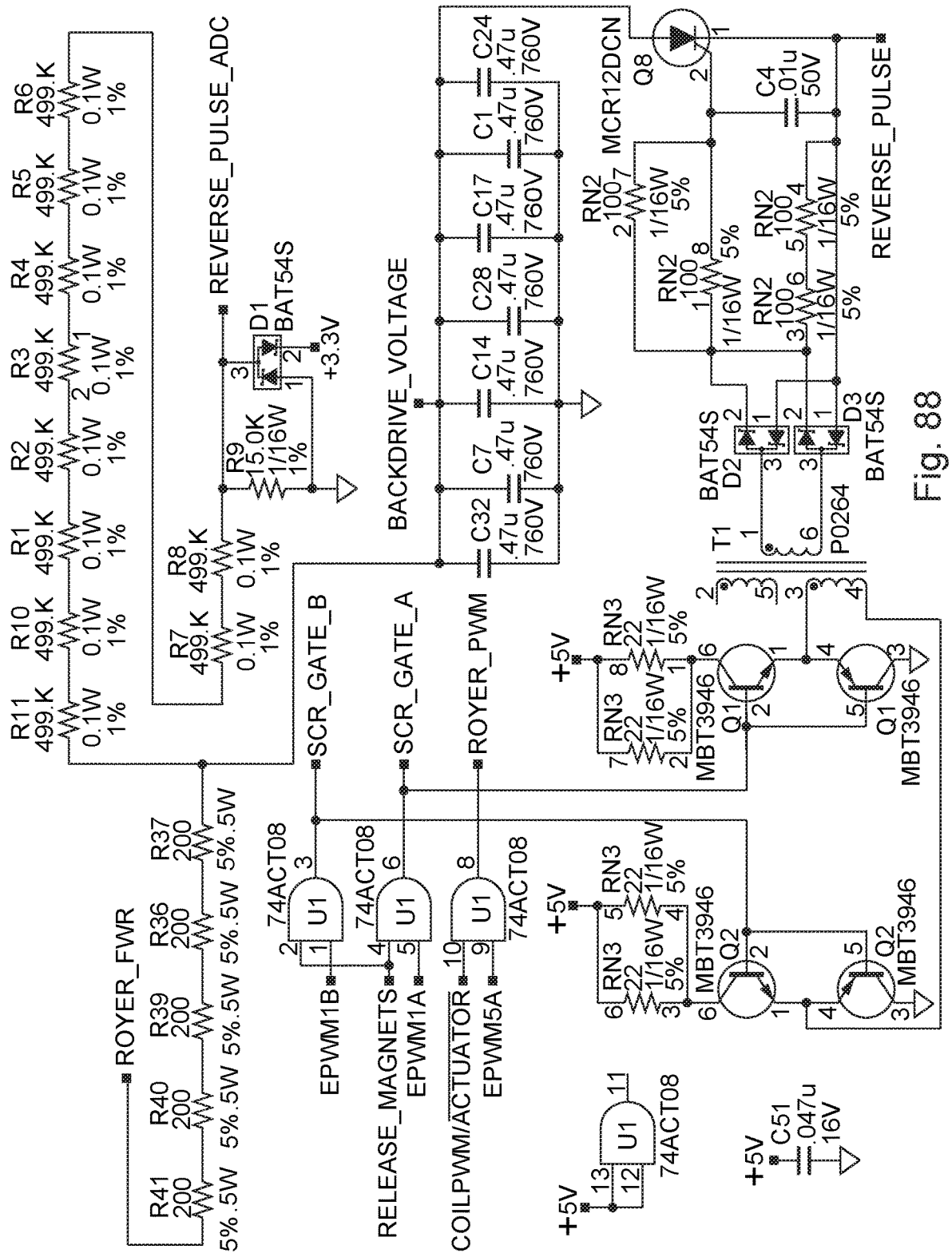
FIG. 88 shows a further part of a circuit for controlling an electromagnet.
Figure 89:
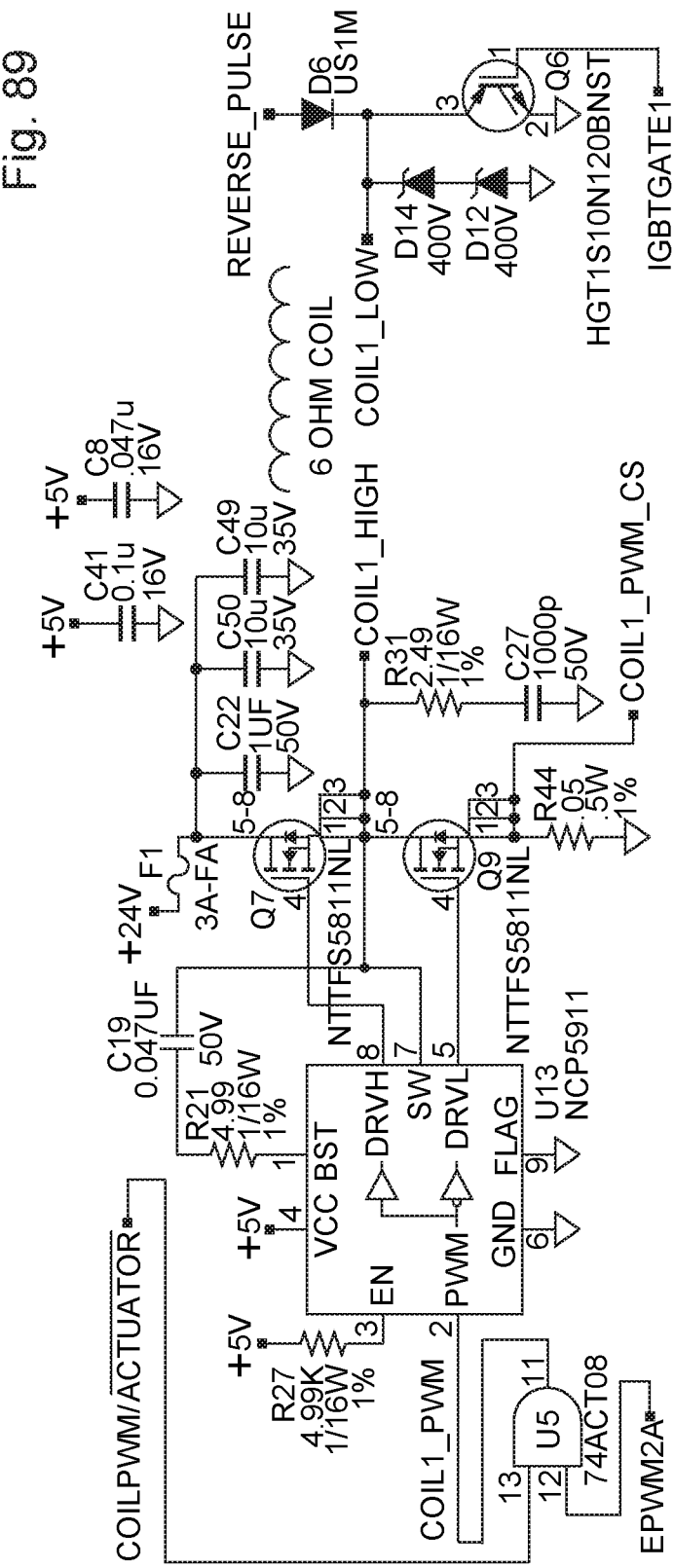
FIG. 89 shows more of a circuit for controlling an electromagnet.
Figure 90:
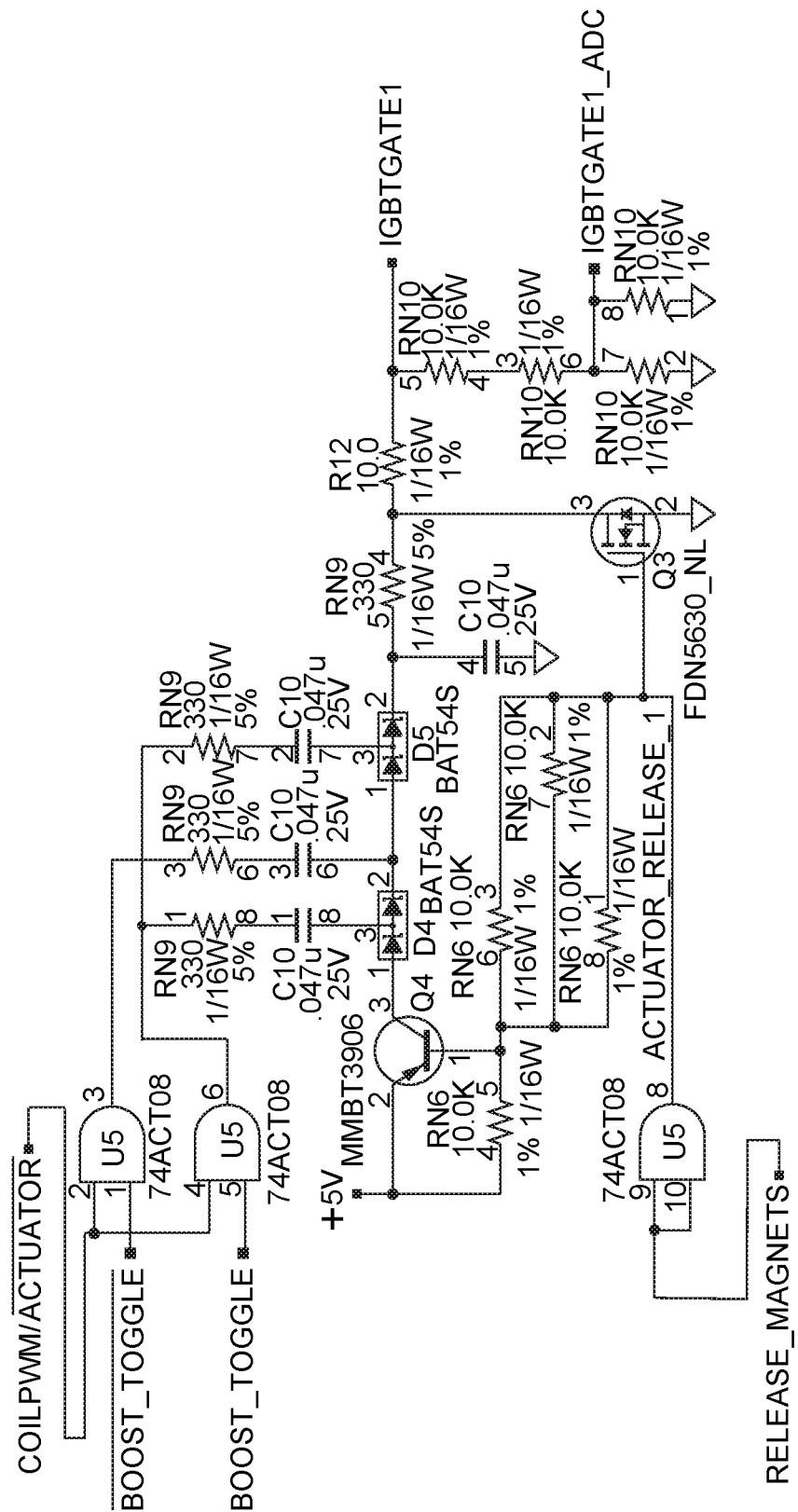
FIG. 90 shows still more of a circuit for controlling an electromagnet.
Figure 91:
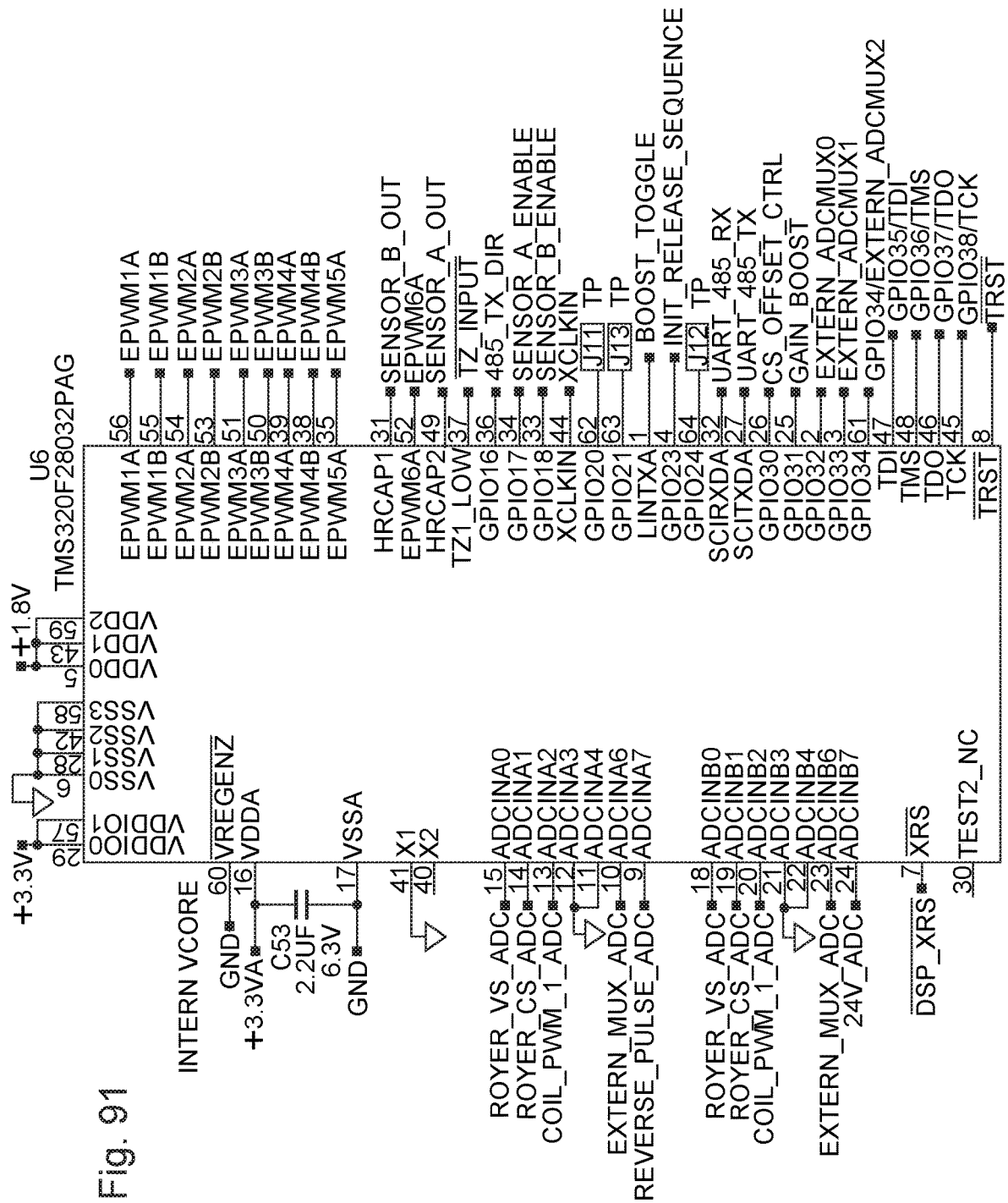
FIG. 91 shows yet more of a circuit for controlling an electromagnet.
Figure 92:
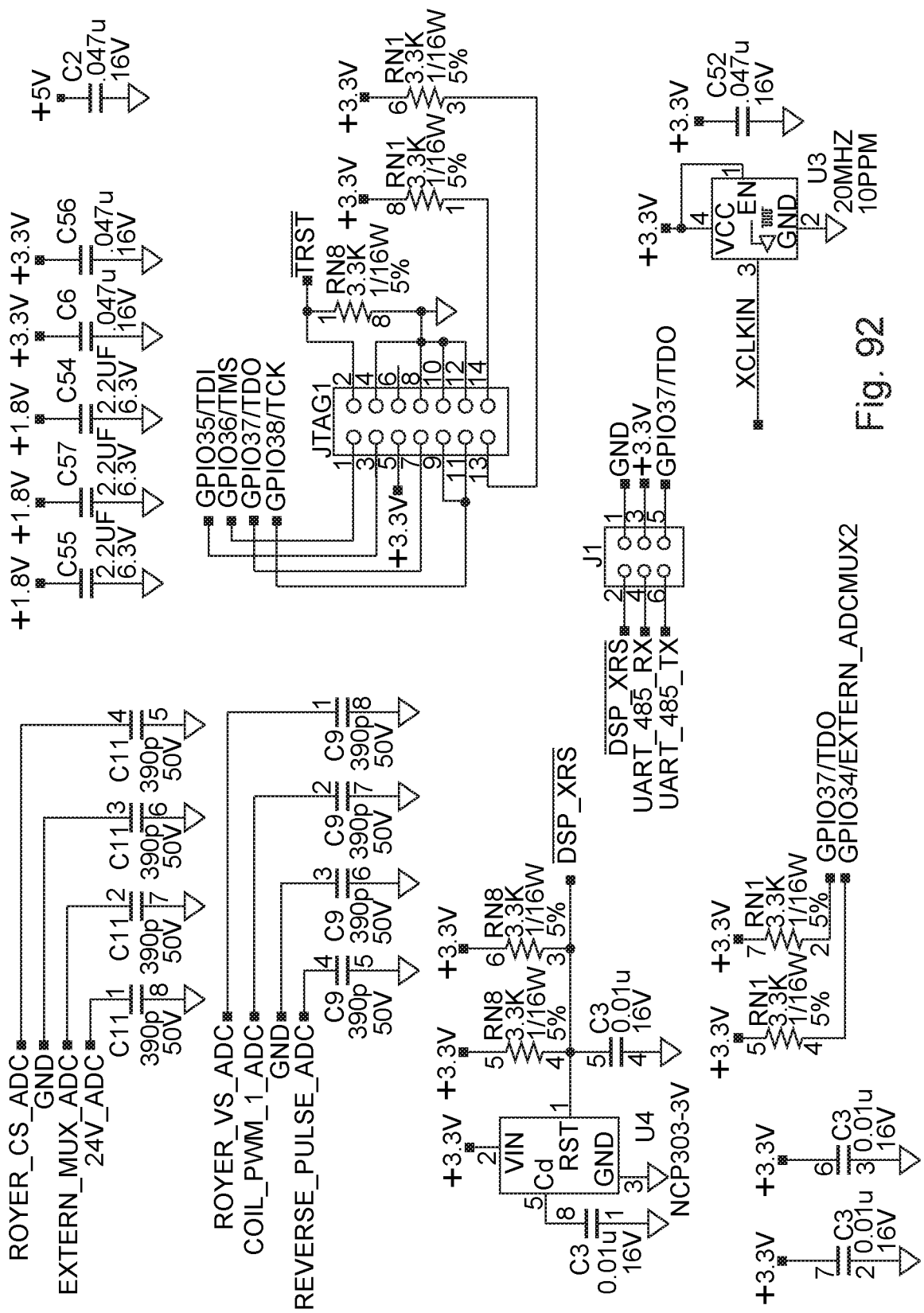
FIG. 92 shows an additional part of a circuit for controlling an electromagnet.
Figure 93:
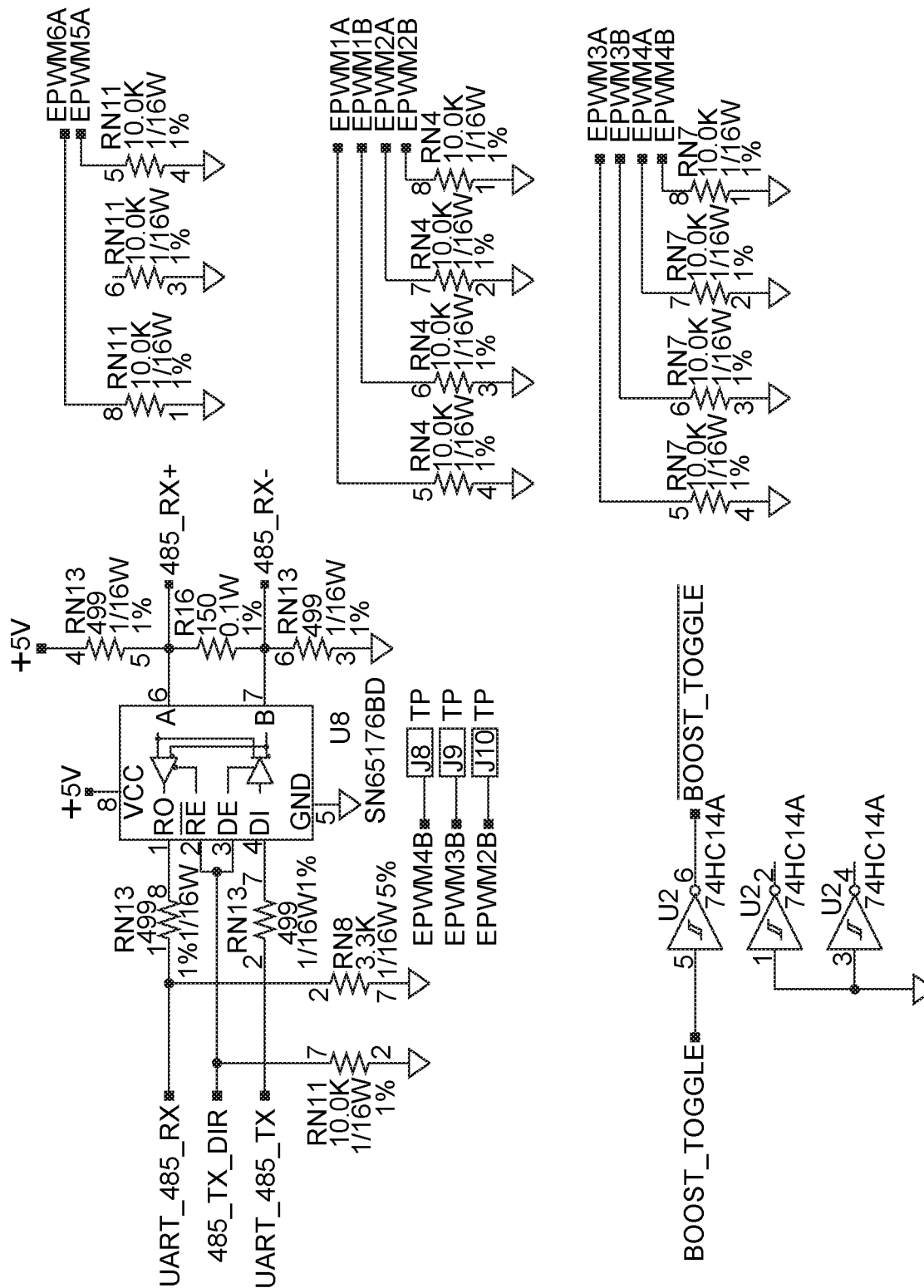
FIG. 93 shows another additional part of a circuit for controlling an electromagnet.
Figure 94:
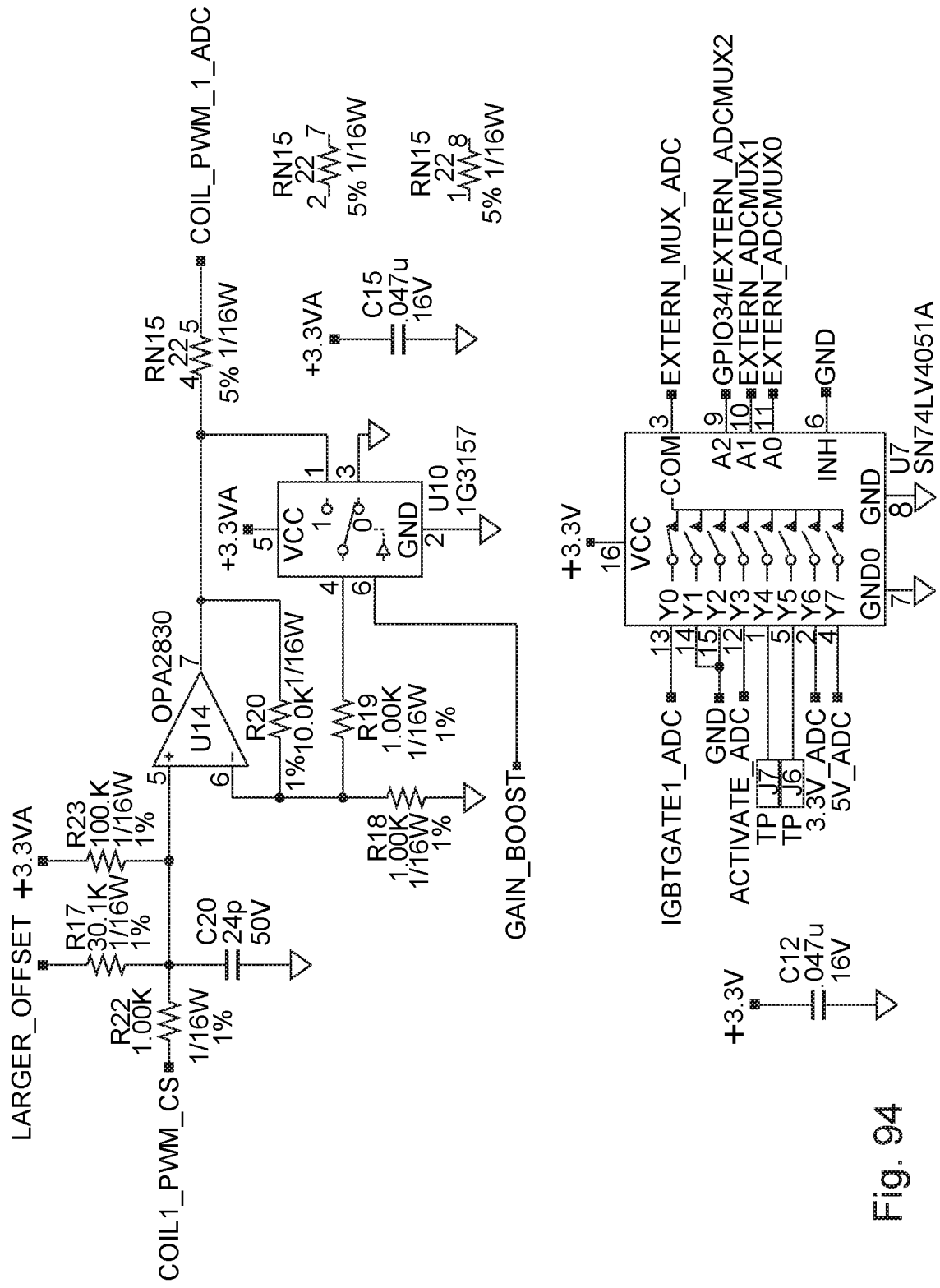
FIG. 94 shows yet another additional part of a circuit for controlling an electromagnet.
Figure 95:
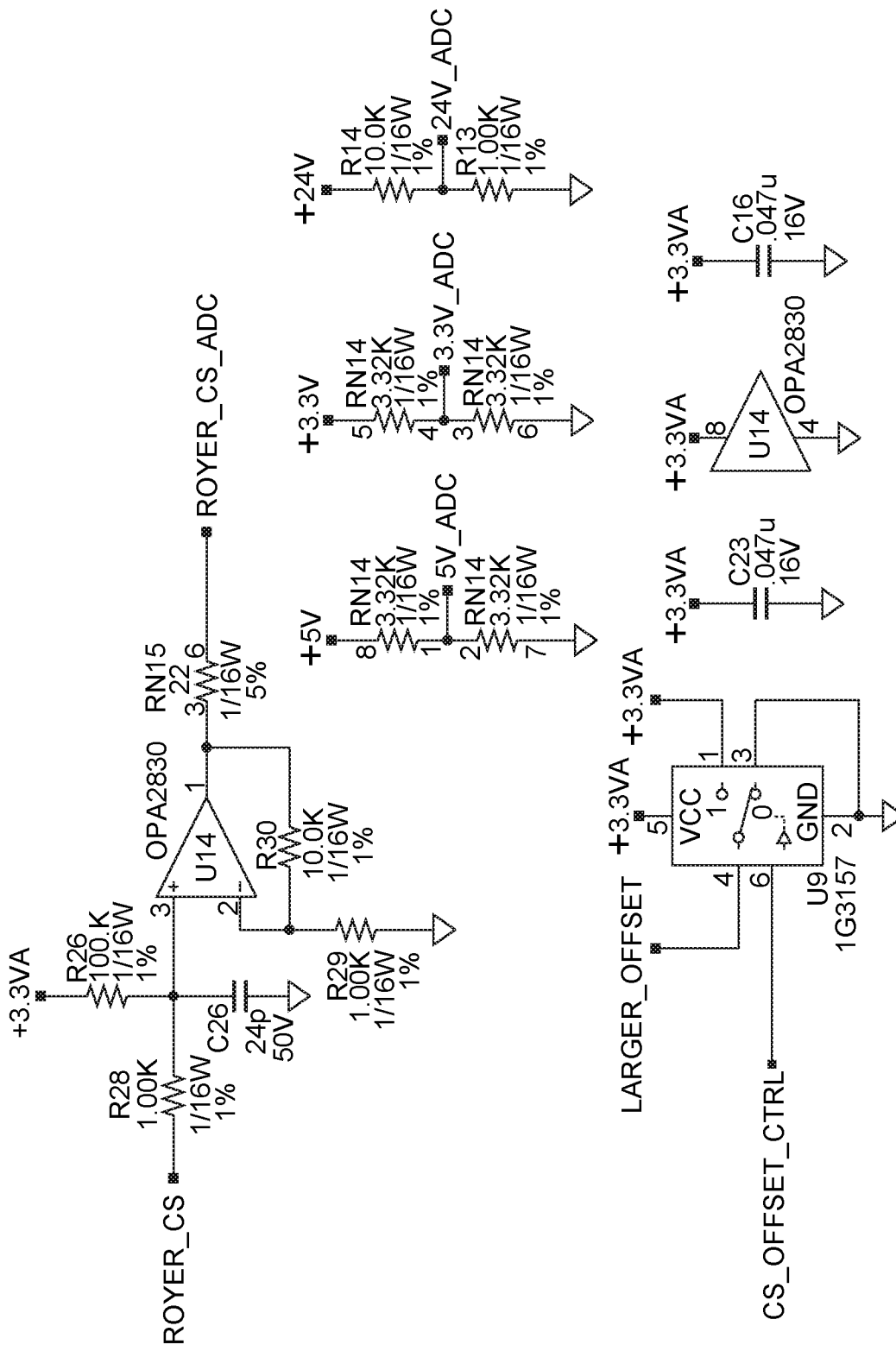
FIG. 95 shows still another additional part of a circuit for controlling an electromagnet.

FIGS. 84 through 95 show an embodiment of a circuit for controlling an electromagnet with a microprocessor. FIG. 83 gives a high-level view of the circuit showing how the circuit portions shown in FIGS. 84 through 95 fit together. FIG. 84 shows power supply circuits, FIG. 85 shows connectors, FIG. 86 shows circuitry involved with releasing or turning off the electromagnet, FIGS. 87 and 88 show circuitry involved with generating a reverse pulse, FIGS. 89 and 90 show circuitry involved with the current through the coil, FIG. 91 shows a microprocessor, FIG. 92 shows microprocessor support circuitry. FIG. 93 shows bus transceiver circuitry, and FIGS. 94 and 95 show current amplifier circuitry.

Figure 96:
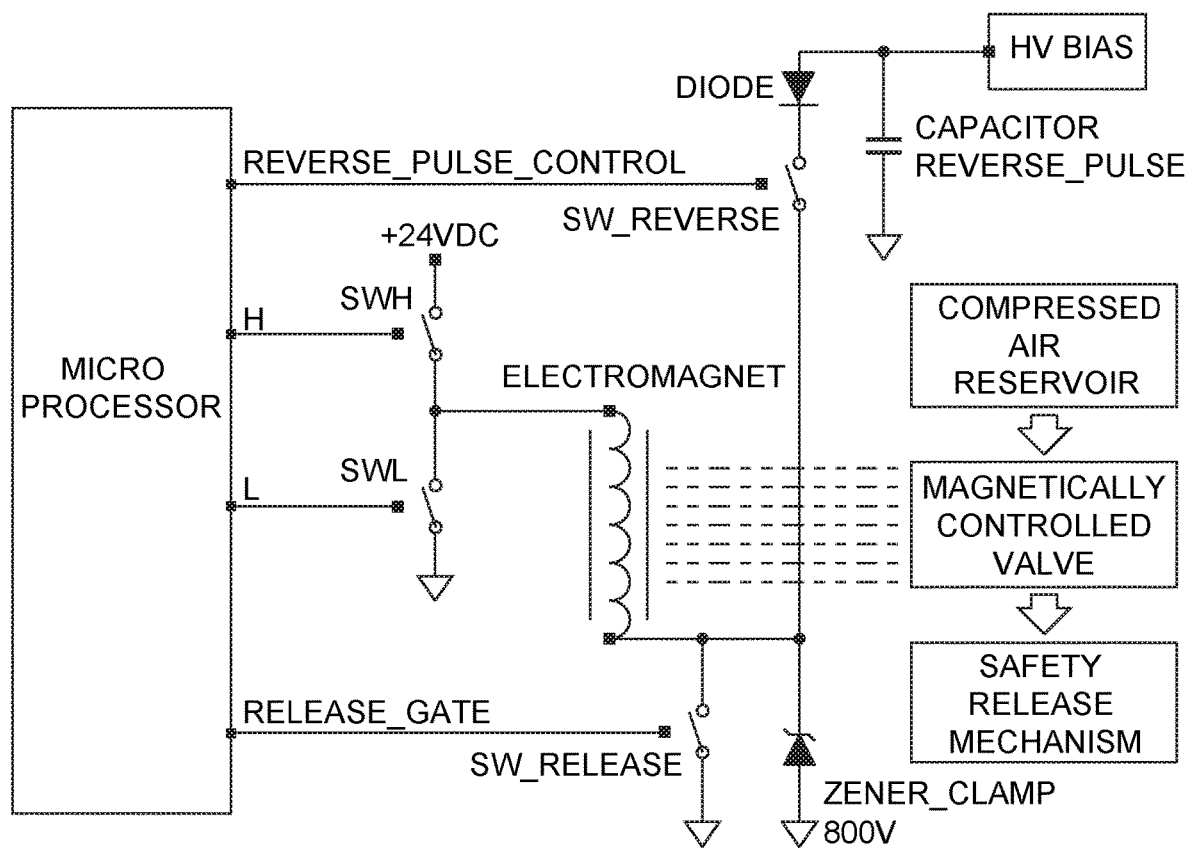
FIG. 96 shows a simplified diagram of a circuit controlling one electromagnet.

FIG. 96 shows a simplified diagram of the portion of the circuit shown in detail in FIGS. 88, 89 and 91 that controls the current through the coil of an electromagnet. The microprocessor turns on the coil by closing switch SW_RELEASE with switch SW_REVERSE left open, which connects one end of the coil to ground and closes switch SWH which connects the other end of the coil to twenty four volts thereby establishing a current through the coil. To turn off the magnet, the microprocessor opens switch SW_RELEASE which causes a back emf voltage that is limited to a high voltage by the zener diode ZENER CLAMP through which the current through the coil flows to ground. Diode DIODE prevents current from the back emf spike from flowing toward the capacitor. The microprocessor closes switch SW_REVERSE which allows the capacitor CAPACITOR RELEASE_PULSE which is charged to a high voltage to discharge through diode DIODE and switch SW_REVERSE. The microprocessor also closes switch SWL to open a path for the current to ground, although the current may be allowed to flow back through the twenty four volt power supply if the power supply is equipped to handle the current.

Figure 97:
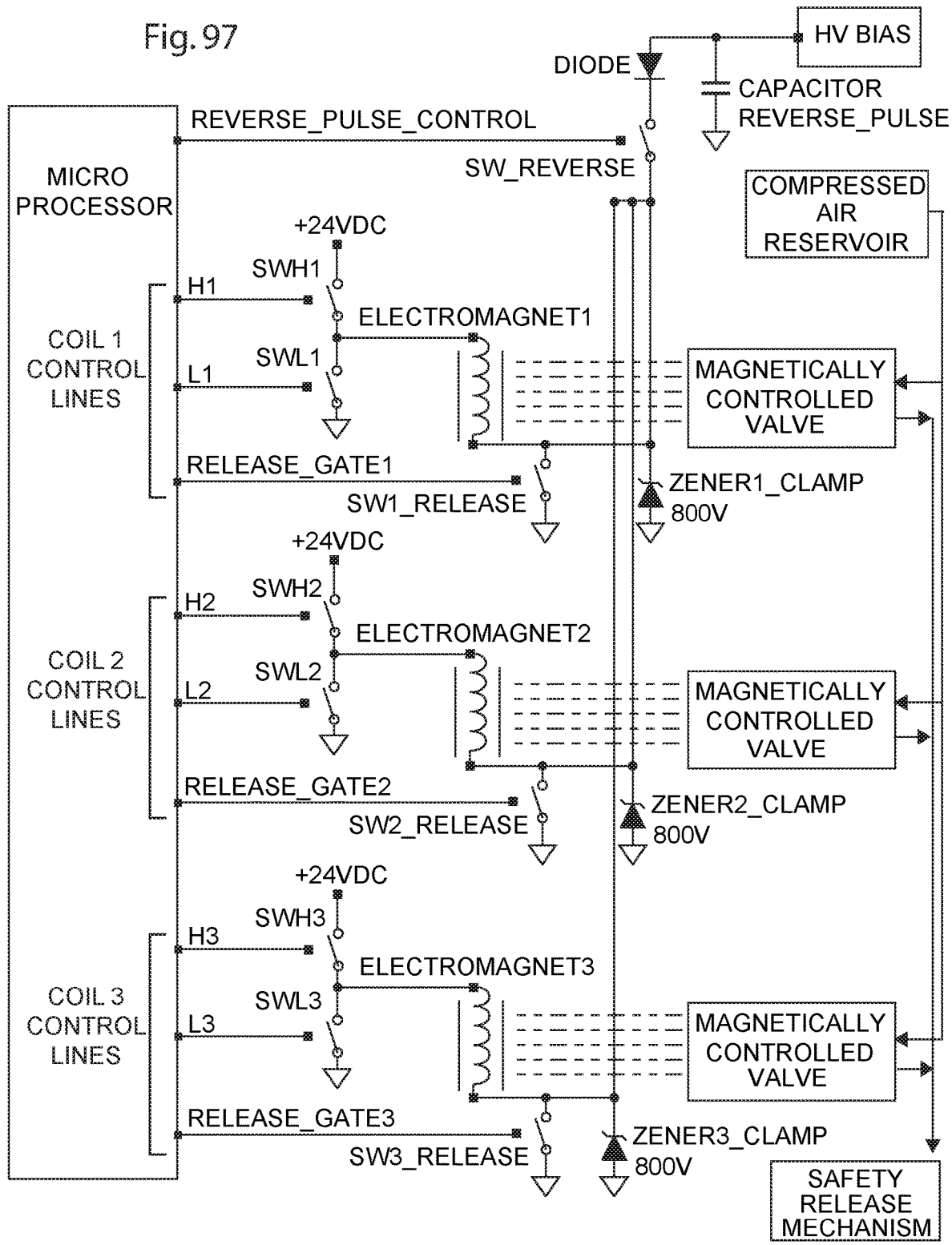
FIG. 97 shows a simplified diagram of a circuit controlling three electromagnets.

FIG. 96 illustrates a circuit used to control one electromagnet, but it can easily be expanded to service more electromagnets, as shown in FIG. 97. In the circuit shown in FIG. 97, the microprocessor has three sets of control lines to service three separate electromagnet coils for three electromagnets. Although there are three release switches, one for each coil, there is only one switch, SW_REVERSE, to activate the reverse voltage from the capacitor. That switch, which may be implemented by a silicon controlled rectifier, is chosen by the amount of current to be handled, which is greater in the circuit with three coils than in the circuit with one coil.

INDUSTRIAL APPLICABILITY

The present disclosure is applicable to fast-acting and low-inertia actuators which may be useable in various applications where a high force must be applied very quickly, such as in safety systems for power tools. The present disclosure is particularly applicable to the power tool industry and to woodworking machines and other similar machines.

It is believed that this disclosure encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and sub-combinations that are directed to one or more of the disclosed inventions. Inventions embodied in other combinations and sub-combinations of features, functions, elements and/or properties may be claimed through amendment of the present claims or through presentation of new claims. Such amended or new claims, whether they are directed to different inventions or directed to the same inventions, whether different, broader, narrower or equal in scope to the original claims are also regarded as included within the subject matter of the inventions of the present disclosure.

The invention claimed is:
1. A power tool comprising:
  a cutting tool for cutting workpieces;
  a motor configured to drive the cutting tool;
  a detection system configured to detect a dangerous condition between a person and the cutting tool;
  a support structure associated with the cutting tool and configured to allow the cutting tool to retract; and
  an actuator configured to produce at least 4,000 Newtons of force within 0 to 3 milliseconds after detection of the dangerous condition by the detection system, where the actuator is further configured to be triggered and reset a plurality of times without a user having to replace a part of the power tool.

2. The power tool of claim 1, where the force produced by the actuator causes the cutting tool to retract and to reach a peak acceleration of at least 20 to 500 Gs during retraction.

* * * * *